United States Patent
Queen et al.

(10) Patent No.: US 12,523,408 B2
(45) Date of Patent: *Jan. 13, 2026

(54) RECHARGEABLE THERMAL BATTERY SYSTEMS FOR USE IN TRANSPORTING OR STORING PERISHABLE ITEMS

(71) Applicant: PHASESTOR LLC, Asheboro, NC (US)

(72) Inventors: Alfred Scott Queen, Asheboro, NC (US); Byron C. Owens, Asheboro, NC (US)

(73) Assignee: PHASESTOR LLC, Asheboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/011,187

(22) Filed: Jan. 6, 2025

(65) Prior Publication Data

US 2025/0137703 A1    May 1, 2025

Related U.S. Application Data

(63) Continuation of application No. 18/736,706, filed on Jun. 7, 2024.

(Continued)

(51) Int. Cl.
*F25D 16/00* (2006.01)
*B60H 1/00* (2006.01)
*F25D 11/02* (2006.01)

(52) U.S. Cl.
CPC ......... *F25D 16/00* (2013.01); *B60H 1/00264* (2013.01); *F25D 11/02* (2013.01)

(58) Field of Classification Search
CPC ...... Y02E 60/14; F25D 11/003; F25D 11/006; B60H 1/00492; B60H 1/00278; B60H 1/00014; F25B 2400/24
See application file for complete search history.

(56) References Cited

U.S. PATENT DOCUMENTS 3,528,260 A    9/1970    Binder
5,520,237 A    5/1996    Finkelstein
(Continued)

FOREIGN PATENT DOCUMENTS

KR    102041202 B1 * 11/2019

*Primary Examiner* — Ana M Vazquez
(74) *Attorney, Agent, or Firm* — TILLMAN WRIGHT, PLLC; Chad D. Tillman

(57) ABSTRACT

An apparatus includes a cargo area with a heat exchanger; a thermal battery system having a phase change material (PCM) with first and second heat exchangers embedded in the PCM; fluid conduits defining fluid passageways interconnecting the cargo area heat exchanger and the first PCM-embedded heat exchanger; and a pump creating a fluid flow through the fluid conduits between the cargo area heat exchanger and the first PCM-embedded heat exchanger. The apparatus also includes external ports configured for connecting to an external charging source for charging the PCM; and fluid conduits defining fluid passageways interconnecting the external ports and the second PCM-embedded heat exchanger. The first PCM-embedded heat exchanger, pump, and cargo area heat exchanger form part of a first closed-loop circuit for transferring heat between the cargo area and the thermal battery system. The second PCM-embedded heat exchanger and external ports do not part of the first closed-loop circuit.

1 Claim, 48 Drawing Sheets

Related U.S. Application Data

(60) Provisional application No. 63/542,409, filed on Oct. 4, 2023, provisional application No. 63/536,433, filed on Sep. 3, 2023, provisional application No. 63/471,759, filed on Jun. 7, 2023.

(56) References Cited

U.S. PATENT DOCUMENTS

| | | | |
|---|---|---|---|
| 5,975,202 | A | 11/1999 | Grandi |
| 6,105,659 | A | 8/2000 | Pocol et al. |
| 6,308,518 | B1 | 10/2001 | Hunter |
| 6,877,342 | B2 | 4/2005 | Weng |
| 10,752,434 | B2 | 8/2020 | Sonoco |
| 2007/0209383 | A1 | 9/2007 | Hutton |
| 2008/0022713 | A1 | 1/2008 | Jacobi |
| 2011/0067852 | A1* | 3/2011 | Farrar .................. B65D 88/74 165/59 |
| 2016/0109186 | A1 | 4/2016 | Kolda et al. |
| 2016/0201931 | A1 | 7/2016 | Ma et al. |
| 2016/0243000 | A1 | 8/2016 | Gray et al. |
| 2018/0245822 | A1 | 8/2018 | Punuru |
| 2021/0045265 | A1 | 2/2021 | Sun et al. |
| 2021/0139151 | A1 | 5/2021 | Lu |
| 2022/0186963 | A1 | 6/2022 | Zhou |

\* cited by examiner

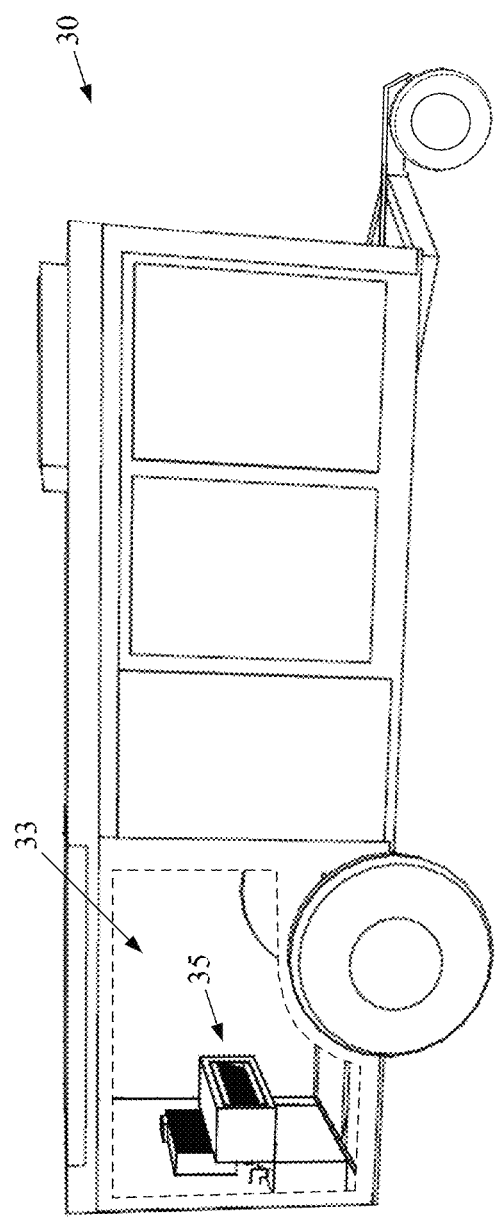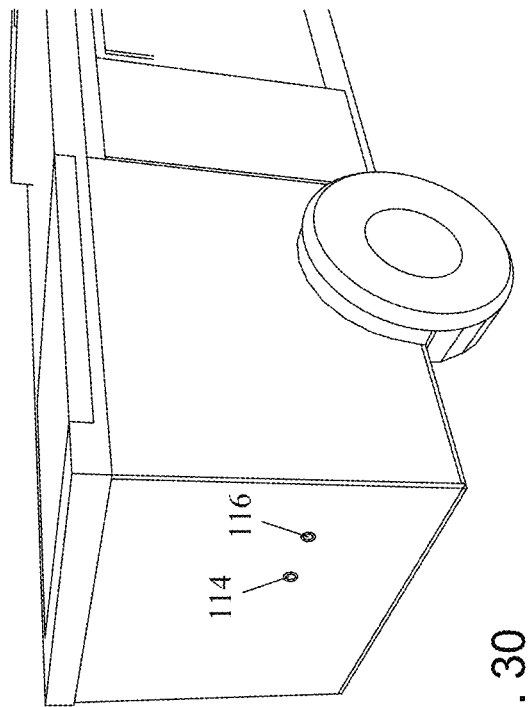

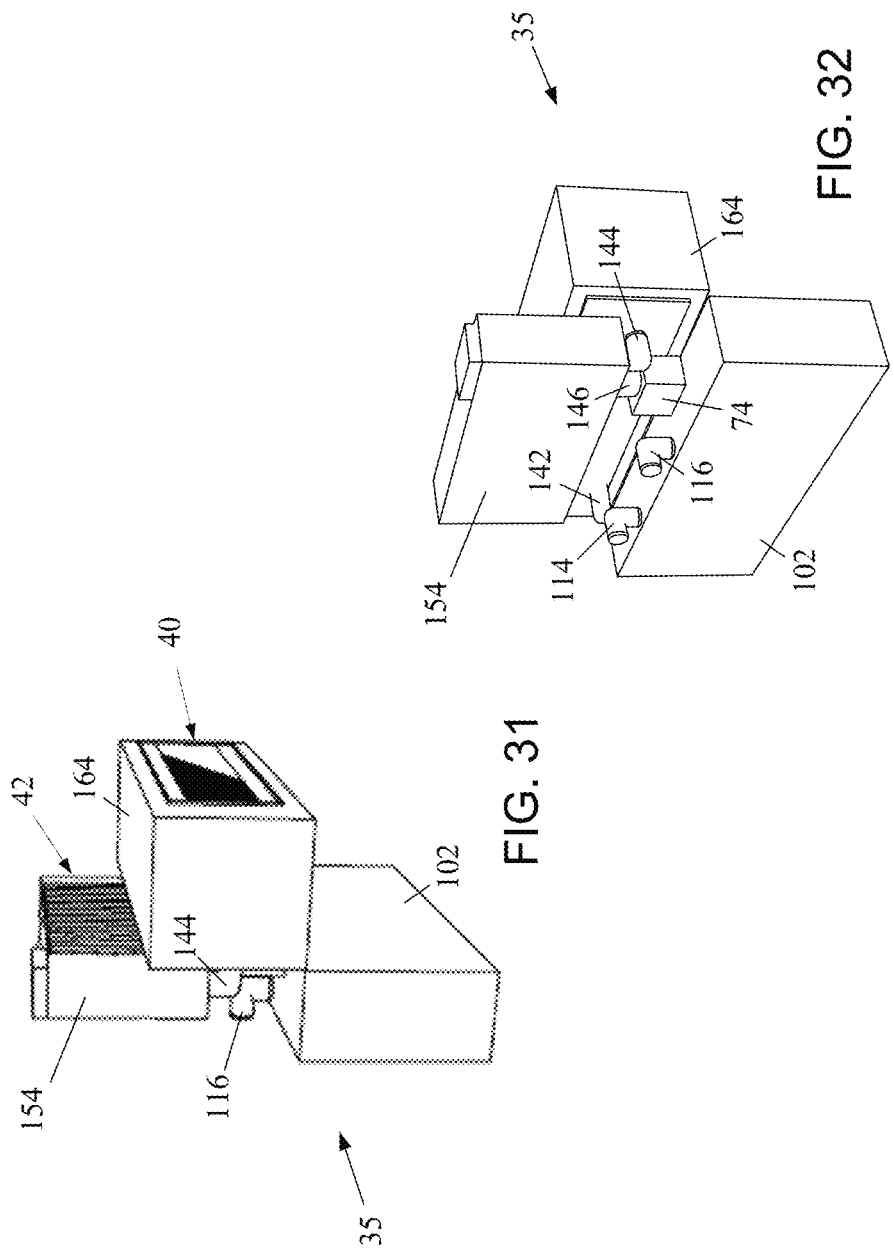

RECHARGEABLE THERMAL BATTERY SYSTEMS FOR USE IN TRANSPORTING OR STORING PERISHABLE ITEMS

COPYRIGHT STATEMENT

Any new and original work of authorship in this document is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The invention generally relates to heating or cooling of a storage used to store or transport items and, especially, to cooling of a cargo area used to store or transport perishable items including food or medicines.

FIG. 1 is a schematic view of a transportation vehicle 50 for transporting items within an enclosed cargo area 52 having a temperature that is maintained by a refrigeration unit 54 in accordance with the prior art. The transportation vehicle 50 comprises a cab 56 and a box-shaped cargo compartment 58 with insulated walls 60 defining the cargo area 52. The refrigerator unit 54 is located outside of the cargo compartment 58 on the box-shaped cargo compartment 58 (as shown in FIG. 1) or on the cab 56 (not shown). The refrigerator unit 54 is configured to extract heat from a heat-transfer fluid, e.g., a gas or a liquid, at heat exchanger 62 and expel the extracted heat into the ambient environment. A cooling unit 64 located inside of the cargo area 52 comprises a heat exchanger 66 that extracts heat from the cargo area 52 and a fan 68 that creates an airflow 70 past the heat exchanger 66 into the cargo area 52 for circulating air and cooling the cargo area 52. A closed-loop circuit indicated generally at 72 extends between and includes the heat exchangers 62,66 and a pump 74 for circulating the heat-transfer fluid through the closed-loop circuit. The heat-transfer fluid of the closed-loop circuit 72 absorbs heat from the cargo area 52 via the heat exchanger 66 and releases the heat to the ambient environment via heat exchanger 62. The refrigerator system 54 is electrically powered by a battery that is charged by the motor of the vehicle 50, directly by the motor of the vehicle 50, or by a combination of a battery and the motor of the vehicle 50. The battery may be the main battery of the vehicle or another battery.

FIG. 2 is a schematic view of a transportation trailer 80 for transporting items within a cargo area having a temperature that is maintained by a refrigeration unit in accordance with the prior art that is similar in structure and operation to the refrigerator unit 54 of FIG. 1. In contrast to the transportation vehicle 50, the transportation trailer includes a hitch 82 for connection to a cab and additional wheels 84, whereby the trailer may be detached from a cab and left free standing. The transportation trailer also is representative of a manually operated cart insofar as a cart may not include a hitch and may be smaller in size, but otherwise may include the same or similar structure and components.

While such transportation vehicles and trailers including carts for cooling are believed suitable for their intended purposes, it is believed that improvements in such transportation vehicles and trailers including carts can be made that will provide advantages and benefits over those provided in accordance with the prior art. Such advantages and benefits include the ability to cool for longer, to cool more efficiently, and to cool even when a transportation vehicle or trailer including cart is otherwise inoperable for transportation. One or more such advantages and benefits, as well as others, are believed to be provided by one or more embodiments in accordance with one or more aspects and features of the present invention.

The invention also generally relates to the simultaneous charging of thermal batteries of multiple vessels of the invention that are disclosed herein and, more particularly, to such charging using a thermal battery. While large industrial chillers may be used, large industrial chillers typically are much more expensive to purchase and operate than smaller industrial chillers. It therefore is believed that a need exists for an improved way of charging the thermal batteries of multiple vessels simultaneously without the need for large industrial chillers. Moreover, while aspects and features of the invention is described herein in the context of vessels, it will be understood that at least some aspects and features of the invention are equally applicable in other contexts in which multiple thermal batteries are simultaneously charged, and the scope of this disclosure is not limited to just the vessel charging context.

SUMMARY OF THE INVENTION

The invention includes many aspects and features which are disclosed in the following discussion with reference to the drawings. Moreover, additional aspects and features are disclosed in the further embodiments shown and described in the appendices to the specification, which are hereby incorporated herein by reference.

In an aspect, an apparatus having a cargo area for receiving and maintaining items at one or more temperatures comprises: a cargo area heat exchanger located in air communication with the cargo area; a thermal battery system comprising a phase change material (PCM) with first and second heat exchangers embedded in the PCM; a first plurality of fluid conduits defining fluid passageways interconnecting in fluid communication the cargo area heat exchanger and the first PCM-embedded heat exchanger; an onboard pump arranged in fluid communication with the fluid conduits and configured to create a fluid flow through the first plurality of fluid conduits between the cargo area heat exchanger and the first PCM-embedded heat exchanger; a pair of external ports configured for connecting to an external charging source for charging the PCM of the thermal battery system; and a second plurality of fluid conduits defining fluid passageways interconnecting in fluid communication the external ports and the second PCM-embedded heat exchanger.

In accordance with this aspect, the first PCM-embedded heat exchanger, pump, cargo area heat exchanger, and fluid conduits are part of a first closed-loop circuit for transferring heat between the cargo area and the thermal battery system; and the second PCM-embedded heat exchanger, external ports, and second fluid conduits are not part of the first closed-loop circuit.

In a feature, the apparatus further comprises a fan for creating an airflow across the cargo area heat exchanger and into the cargo area.

In a feature, each of the pair of external ports comprises a quick-connect adapter for attachment of a hose in fluid communication therewith.

In a feature, the thermal battery system further comprises a tank containing the phase change material and the first and second PCM-embedded heat exchangers.

In a feature, the PCM has a phase change temperature that is below each of the one or more temperatures at which items in the cargo area are to be maintained, whereby heat is transferred from the cargo area to the thermal battery system, the heat-transfer fluid of the first closed-loop circuit absorbing heat from the cargo area through the cargo area heat exchanger and releasing the heat to the PCM of the thermal battery system through the first PCM-embedded heat exchanger.

In a feature, the PCM has a phase change temperature that is above each of the one or more temperatures at which items in the cargo area are to be maintained, whereby heat is transferred from the thermal battery system to the cargo area, the heat-transfer fluid of the first closed-loop circuit absorbing to alternatively heat from the PCM of the thermal battery system through the first PCM-embedded heat exchanger and releasing the heat to cargo area through the cargo area heat exchanger.

In a feature, the apparatus further comprises a charging unit configured to charge the PCM of the thermal battery system. In some embodiments, the charging unit comprises thermoelectric cooling elements. In some embodiments, the charging unit comprises resistive heating elements.

In a feature, the apparatus further comprises a refrigeration unit that is part of the first closed-loop circuit. In some embodiments, the refrigeration unit is located downstream of the thermal battery system and upstream of the cargo area heat exchanger and is utilized to cool the cargo area via the cargo area heat exchanger. In some embodiments, the refrigeration unit is located upstream of the thermal battery system and downstream of the cargo area heat exchanger and is utilized to charge the PCM of the thermal battery system.

In a feature, the apparatus comprises a storage cooler.

In a feature, the apparatus comprises a transportation vessel.

In a feature, the apparatus comprises a transportation vessel comprising a cart.

In a feature, the apparatus comprises a transportation vessel comprising a trailer.

In a feature, the apparatus comprises a transportation vessel comprising a vehicle. In some embodiments, the vehicle comprises a cab and a box-shaped cargo compartment defining the cargo area, and the thermal battery system is located on a top of the cab.

In a feature, the thermal battery system is located on a top of the cargo area.

In a feature, the thermal battery system is located on a side wall of the cargo area.

In a feature, the thermal battery system is located under a floor of the cargo area.

In a feature, the thermal battery system comprises a flooring surface serving as the floor of the cargo area for supporting items placed in the cargo area for storage.

In a feature, the cargo area is divided into a plurality of areas that are partitioned by dividers such that different temperature zones are established within the cargo area. The dividers may comprise uninsulated walls with strip-curtain doors.

In another aspect, a thermal charger for charging a thermal battery system of a vessel comprises a charging hose and a return hose each configured to connect to ports of the vessel for fluid flow to and from a PCM-charging circuit of the vessel; an onboard pump; a phase change material; and a heat exchanger embedded in the phase change material. The hoses, the pump, and the heat exchanger define a PCM-discharging circuit of the thermal charger. The thermal charger further comprises an electric battery for powering the pump, by which a heat-transfer fluid is circulated through PCM-discharging circuit of the thermal charger and the PCM-charging circuit of the vessel.

In a feature, the thermal charger is portable. Furthermore, the thermal charger preferably comprises wheels and is transportable. The PCM-discharging circuit of the thermal charger also may serve as the PCM-charging circuit of the thermal charger.

In another aspect, a method of charging the thermal battery system of the apparatus of the first aspect comprises connecting an external charging source to the pair of external ports of said apparatus.

In some embodiments, the external charging source is portable; in some embodiments, the external charging source comprises a portable thermal battery system; in some embodiments, the external charging source is portable; in some embodiments, the external charging source is not portable; and in some embodiments, the external charging source comprises an industrial chiller.

In another aspect, a method of cooling perishable items during transportation or storage using the apparatus of the first aspect comprises placing the perishable items in the cargo area of said apparatus for transportation or storage and using the thermal battery system to cool the cargo area.

Another aspect of the invention relates to an apparatus for simultaneously charging a plurality of thermal batteries and comprises a thermal storage reservoir and an industrial chiller. The thermal storage reservoir is connected to charging circuits of the thermal batteries for charging the thermal batteries. The industrial chiller is connected to a charging circuit of the thermal storage reservoir for charging the thermal storage reservoir. The charging of the thermal storage reservoir is carried out over an extended period of time relative to the period of time of simultaneously charging the plurality of thermal batteries. Each of the thermal batteries preferably is part of a transportation vessel, such as a truck, a trailer, or a cart, in which items are maintained at temperatures other than ambient temperature.

In particular, an apparatus for simultaneously charging a plurality of thermal batteries includes a thermal storage reservoir and an industrial chiller. The thermal storage reservoir is connected to charging circuits of the thermal batteries for charging the thermal batteries. The industrial chiller is connected to a charging circuit of the thermal storage reservoir for charging the thermal storage reservoir.

In feature of this aspect, the charging of the thermal storage reservoir is carried out over an extended period of time relative to the period of time of simultaneously charging the plurality of thermal batteries.

In another feature of this aspect, each of thermal batteries preferably is part of a transportation vessel, such as a truck, a trailer, or a cart, in which items are maintained at temperatures other than ambient temperature.

It is contemplated that in some embodiments of this aspect, the thermal battery that is used for the simultaneous charging of the thermal batteries of the multiple vehicles is portable. For example, the thermal energy reservoir may be transported on a truck or a trailer.

Additionally, one or more aspects and features are disclosed in the drawings and following detailed descriptions thereof, and one or more aspects and features are disclosed in the disclosures of the incorporated patent applications including publications and patents thereof, and in any appendix hereto which also is incorporated herein by reference. In addition to the aforementioned aspects and features of the invention, the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings, wherein the same elements are referred to with the same reference numerals.

FIG. 29 is a perspective view of another embodiment of a transportation trailer for transporting items within a cargo area that is cooled by a thermal battery system arranged in combination with a refrigeration unit in accordance with one or more aspects and features of the invention.

FIG. 30 is another perspective view of the transportation trailer of FIG. 30.

FIG. 31 is a perspective view of an arrangement of a thermal battery, charging unit, pump, and cooling unit of the transportation trailer of FIG. 29.

FIG. 32 is another perspective view of the arrangement of FIG. 31.

DETAILED DESCRIPTION

Figure 1:
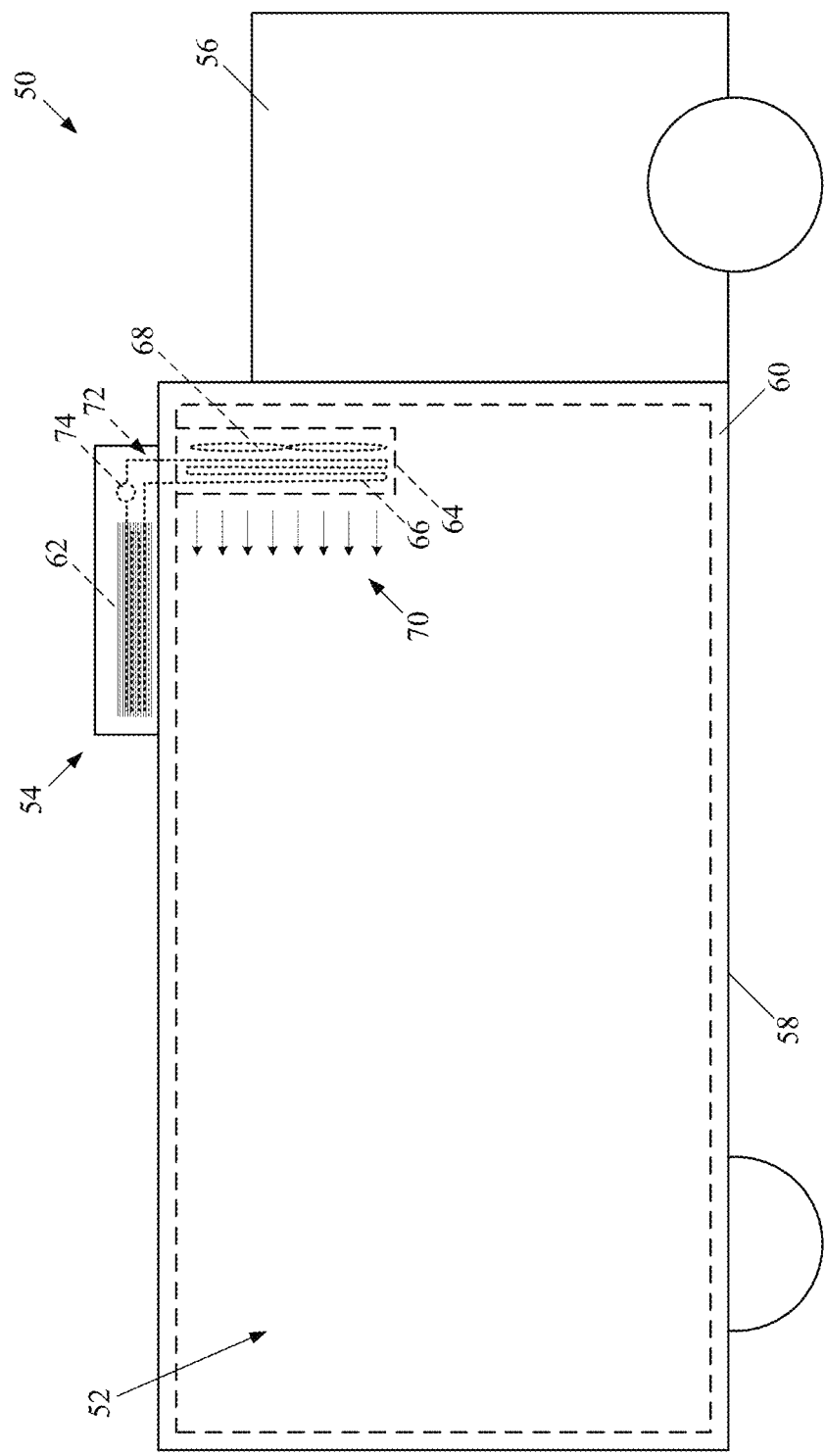
FIG. 1 is a schematic view of a transportation vehicle for transporting items within a cargo area having a temperature that is maintained by a refrigeration unit in accordance with the prior art.
Figure 2:
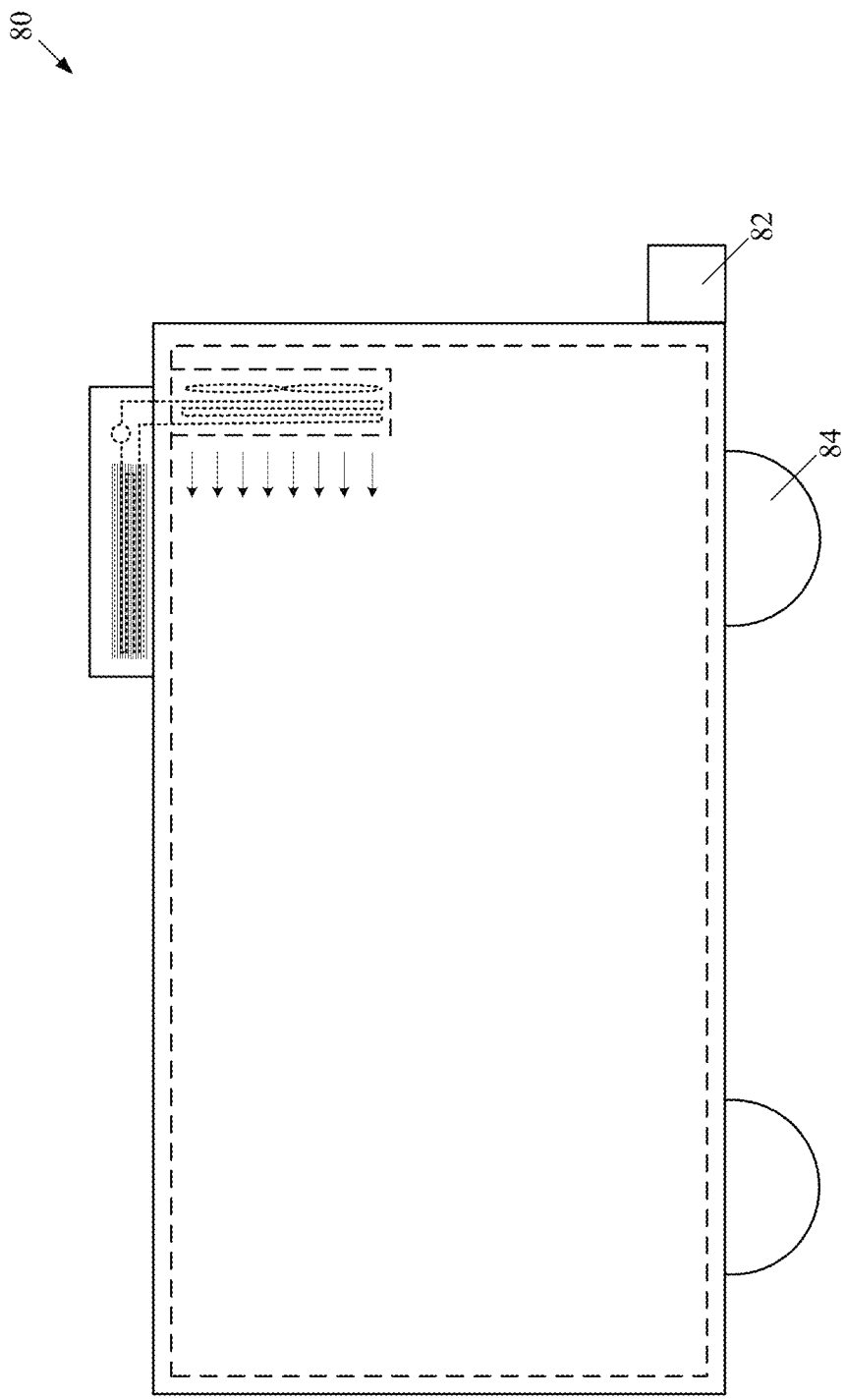
FIG. 2 is a schematic view of a transportation trailer for transporting items within a cargo area having a temperature that is maintained by a refrigeration unit in accordance with the prior art.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112 (f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple;" the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers," "a picnic basket having crackers without cheese", and "a picnic basket having both cheese and crackers"; the picnic basket further may contain one or more other items beside cheese and crackers.

When used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and."

Additionally, as used herein "PCM" means a phase change material. Also, "thermal battery" is intended to be interchangeable with "thermal energy battery" and "thermal storage battery".

Referring now to the drawings, one or more preferred embodiments of the invention are next described. The following description of one or more preferred embodiments is merely exemplary in nature and is in no way intended to limit the invention, its implementations, or uses.

Figure 3:
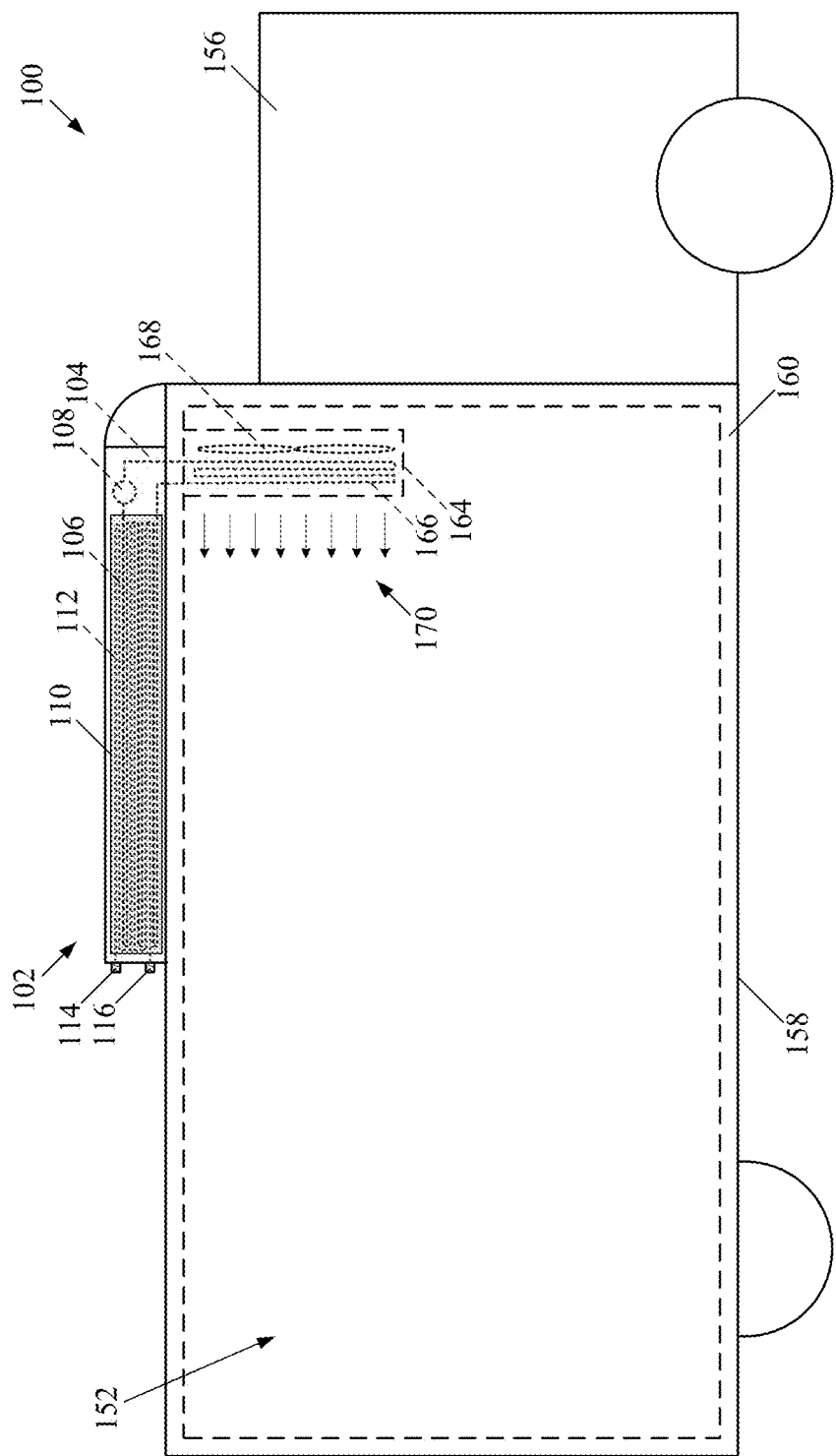
FIG. 3 is a schematic view of an embodiment of a transportation vehicle for transporting items within a cargo area having a temperature that is maintained by a thermal battery system in accordance with one or more aspects and features of the invention.
Figure 3A:
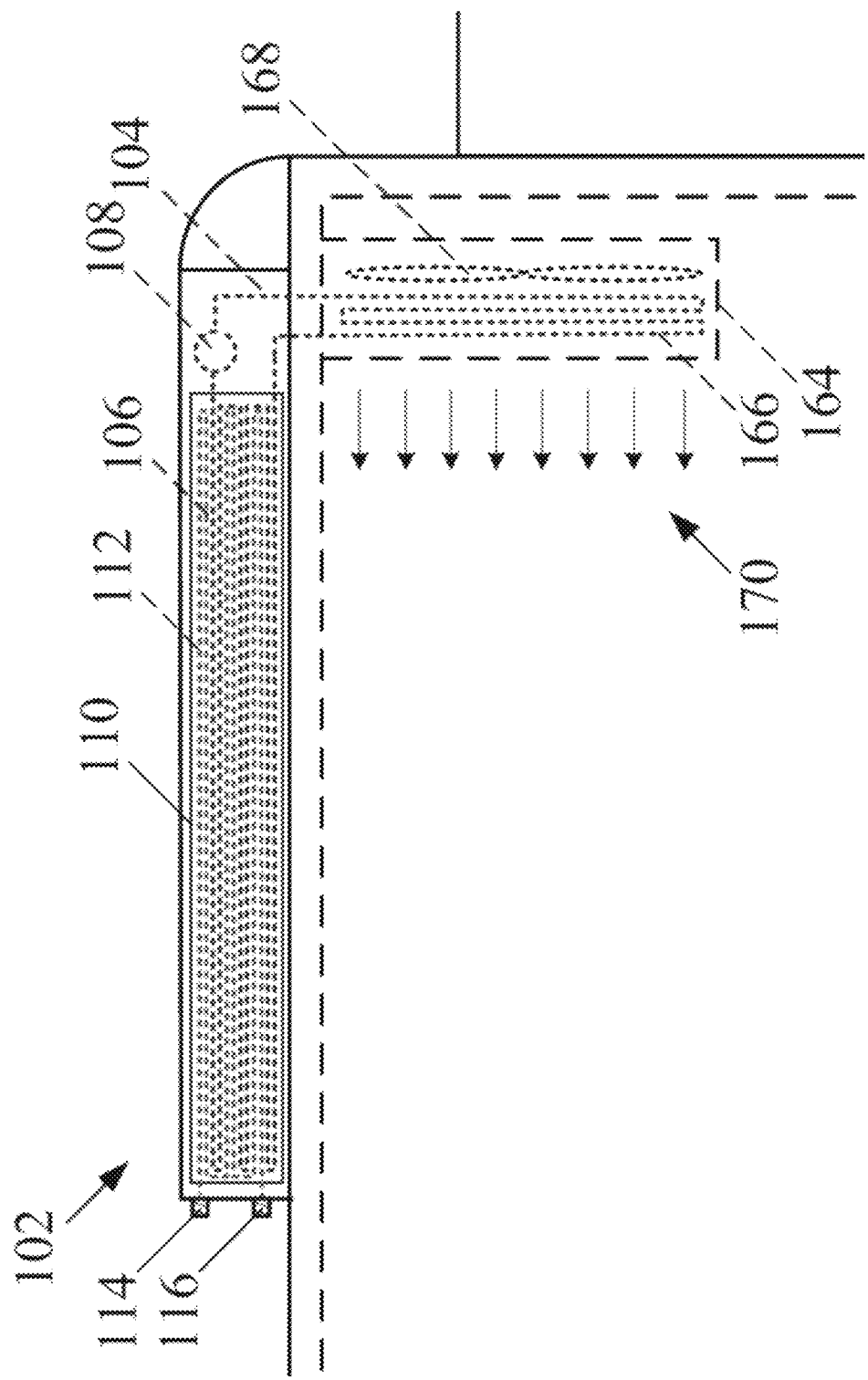
FIG. 3A is an enlarged view of a portion of the transportation vehicle of FIG. 3.

FIG. 3 is a schematic view of an embodiment of a transportation vehicle 100 for transporting items within an interior cargo area 152 that is cooled by a thermal battery system 102 in accordance with one or more aspects and features of the invention. FIG. 3A is an enlarged view of a portion of the transportation vehicle of FIG. 3.

The transportation vehicle 100 comprises a cab 156 and a box-shaped cargo compartment 158 with insulated walls 160 defining the cargo area 152. The thermal battery system 102 is located on a roof of the cargo compartment 158. A cooling unit 164 is located inside of the cargo area 152 and comprises a heat exchanger 166 that extracts heat from the cargo area 152 and a fan 168 (shown in brown) that creates an airflow 170 across the heat exchanger 166 into the cargo area 152 for cooling the cargo area 152.

A closed-loop circuit 104 extends between and includes the heat exchanger 166 and a first heat exchanger 106 of the thermal battery system 102. The closed-loop circuit 104 also comprises a pump 108 for circulating a heat-transfer fluid through the closed-loop circuit 104.

The thermal battery system 102 further comprises a tank 110 containing a phase change material (PCM) in which the first heat exchanger 106 is embedded; and a second heat exchanger 112 that also is embedded in the PCM of the tank 110. The second heat exchanger 112 includes a port 114 having a quick-connect adapter for attachment of a hose, and a port 116 having a quick-connect adapter for attachment of a hose. The ports 114,116 enable connection of the thermal battery system 102 to a thermal charger for charging of the PCM in the tank 112.

Figures 42, 43:
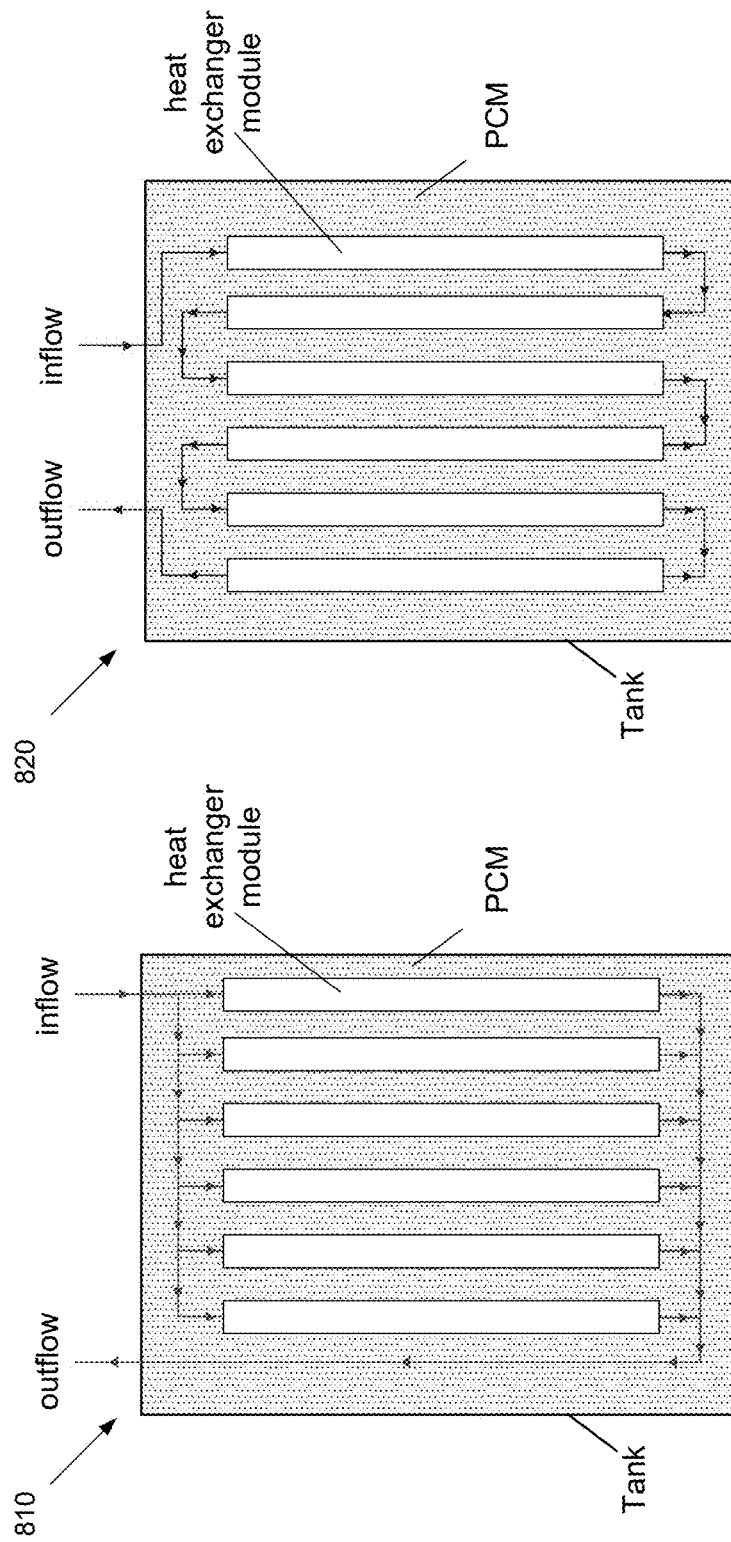
FIG. 42 is a schematic illustration of a preferred charging circuit for charging the PCM of a thermal battery system of one or more embodiments in accordance with one or more aspects and features of the invention, wherein heat exchanger modules are arranged in parallel.
FIG. 43 is a schematic illustration of a preferred discharging circuit for discharging the PCM of a thermal battery system of one or more embodiments in accordance with one or more aspects and features of the invention, wherein heat exchanger modules are arranged in series.

Within the current context of cooling, "charging of the PCM" refers to the extraction of heat from the PCM such that the PCM is at or below a phase change temperature of the PCM. Skipping ahead in the drawings, a preferred thermal battery PCM charging circuit 810 is schematically illustrated in FIG. 42 and the heat exchanger is shown to have a plurality of heat exchanger modules arranged in parallel. Such an arrangement is preferred because it is believed to result in a quicker charging of the PCM than an arrangement in parallel when using a thermal charger. In contrast, a preferred thermal battery PCM discharging circuit 820 is schematically illustrated in FIG. 43 and the heat exchanger is shown to have a plurality of heat exchanger modules arranged in series. Preferred thermal batteries including such charging and discharging circuits are disclosed in U.S. Pat. No. 11,913,728, which is incorporated by reference herein; and in the disclosure of Appendix B to this specification, which is incorporated by reference herein.

Figure 44:
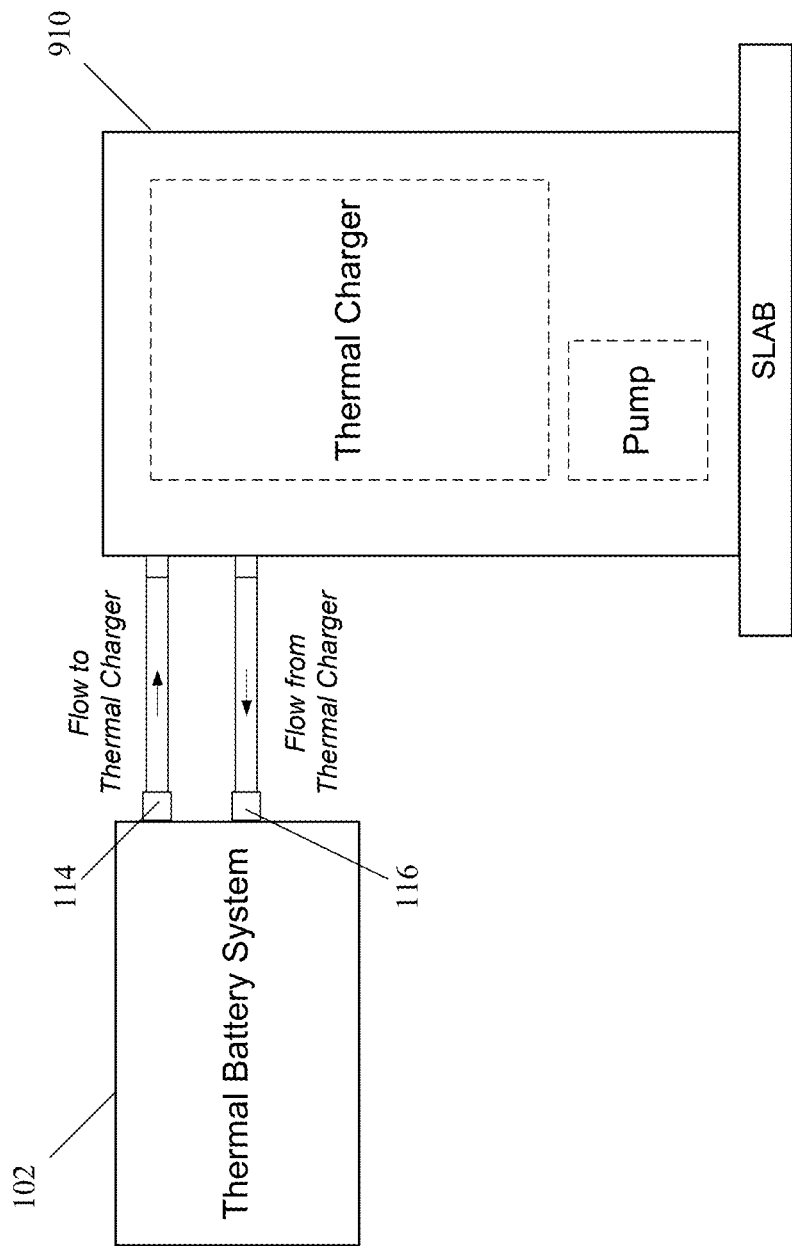
FIG. 44 is a schematic illustration of a thermal charger for charging a thermal battery system of one or more embodiments in accordance with one or more aspects and features of the invention, wherein the thermal charger is mounted on a concrete slab or other fixed structure. The thermal charger is sometimes referred to herein as a thermal reservoir.

A thermal charger preferably comprising one or more thermal batteries is used to charge the PCM of the tank 100. FIG. 44 is a schematic illustration of a thermal charger for charging a thermal battery system of one or more embodiments in accordance with one or more aspects and features of the invention. With reference to FIG. 44, such a thermal charger may be mounted on a concrete slab or other fixed structure, and a plurality of such thermal chargers may be arranged at a location similar to pumps at a gas station, whereby transportation vehicles or transportation trailers each having a thermal battery system may be pulled up alongside the thermal charger and hooked up to the thermal battery system via external ports 114,116 for charging of the PCM. Thermal batteries of thermal chargers at such a "PCM charging station" may themselves be charged using, for example, an industrial chiller. A pump also preferably is provided at the location with the thermal charger for circulating the heat-transfer fluid between the thermal charger and the heat exchanger of a thermal battery system being charged. Alternatively, an industrial chiller may be mounted on the concrete slab or other fixed structure in lieu of the thermal charger for direct charging of the PCM of the thermal battery systems by the industrial chiller.

Figure 45:
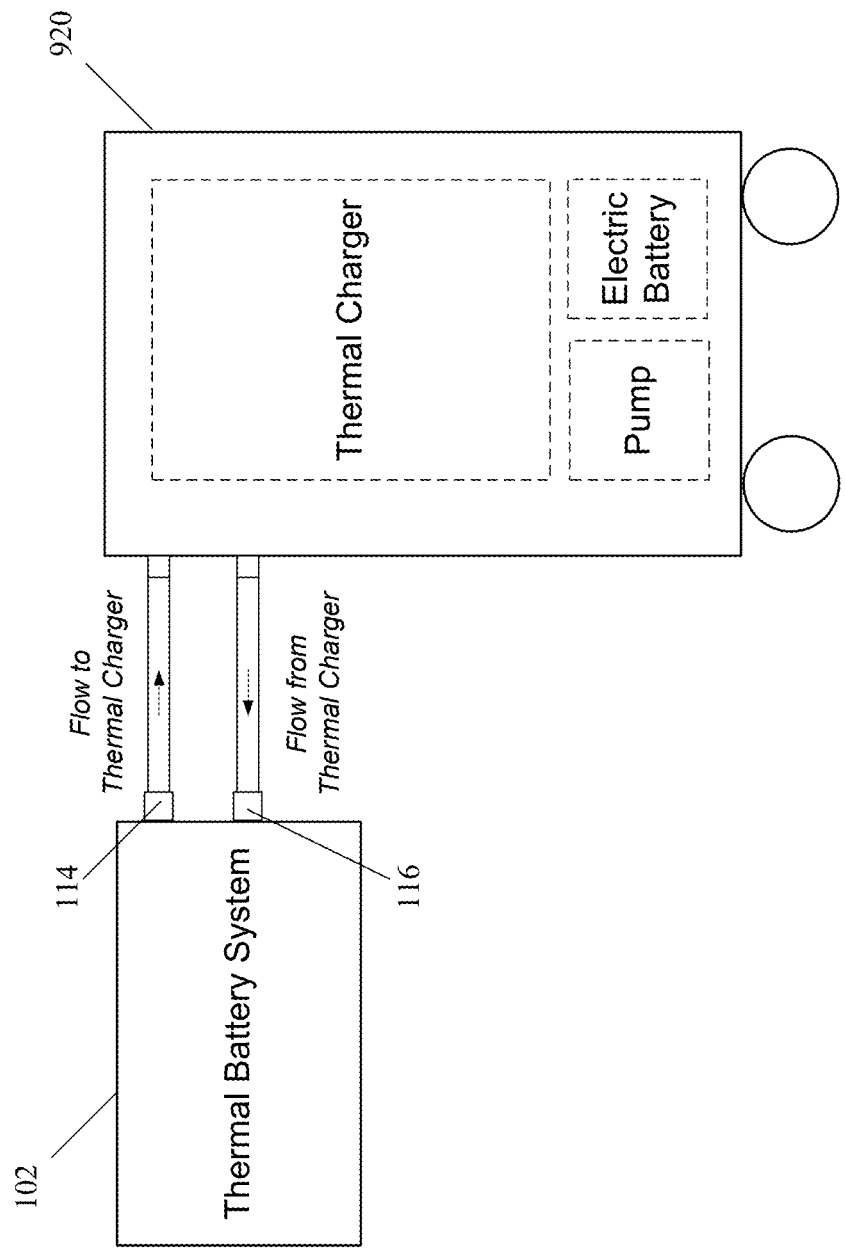
FIG. 45 is a schematic illustration of a thermal charger for charging a thermal battery system of one or more embodiments in accordance with one or more aspects and features of the invention, wherein the thermal charger is on wheels and portable.

A thermal charger also may be portable. FIG. 45 is a schematic illustration of a thermal charger for charging a thermal battery system of one or more embodiments in accordance with one or more aspects and features of the invention. In FIG. 45, the thermal charger 920 is shown to have wheels and is portable. In this scenario, the thermal charger is charged remotely using, for example, an industrial chiller, and transported to a transportation vehicle or trailer and connected to the thermal battery system of the vehicle or trailer for charging of the PCM. The portable thermal charger in such an embodiment preferably comprises an onboard pump and electric battery by which the heat-transfer fluid is circulated between the portable thermal charger and the heat exchanger of a thermal battery system being charged.

Referring back to FIG. 3, the PCM material preferably is selected so as to have a phase change temperature that is below a temperature at which the cargo area 152 is to be maintained. As a consequence, the heat-transfer fluid of the closed-loop circuit 104 absorbs heat from the cargo area 152 via the heat exchanger 166 and releases the heat to the PCM of the tank 110 via the first heat exchanger 106.

Compared to the refrigerator unit of the prior art, and with the possible exception of an internal pump, the thermal battery system 102 is not electrically powered and, therefore, the thermal battery system 102 is not dependent on either operation of the motor or presence of an electric battery. Moreover, the thermal battery system 102 is believed to provide a substantially longer period of effective cooling of the cargo area than a refrigerator unit operating solely on a battery. Consequently, because cooling of the cargo area 152 is not dependent on operation of the motor of the transportation vehicle 100, it is believed that a breakdown of the vehicle 100 will not jeopardize cooling of the cargo area 152 during a period of time required to correct the breakdown. Furthermore, in the event of a critical failure of the transportation vehicle, the thermal battery system 102 can be charged using a portable thermal charger, thereby even extending the period of effective cooling of the cargo area until such time as an unfortunate situation can be addressed and remedied.

Figure 4:
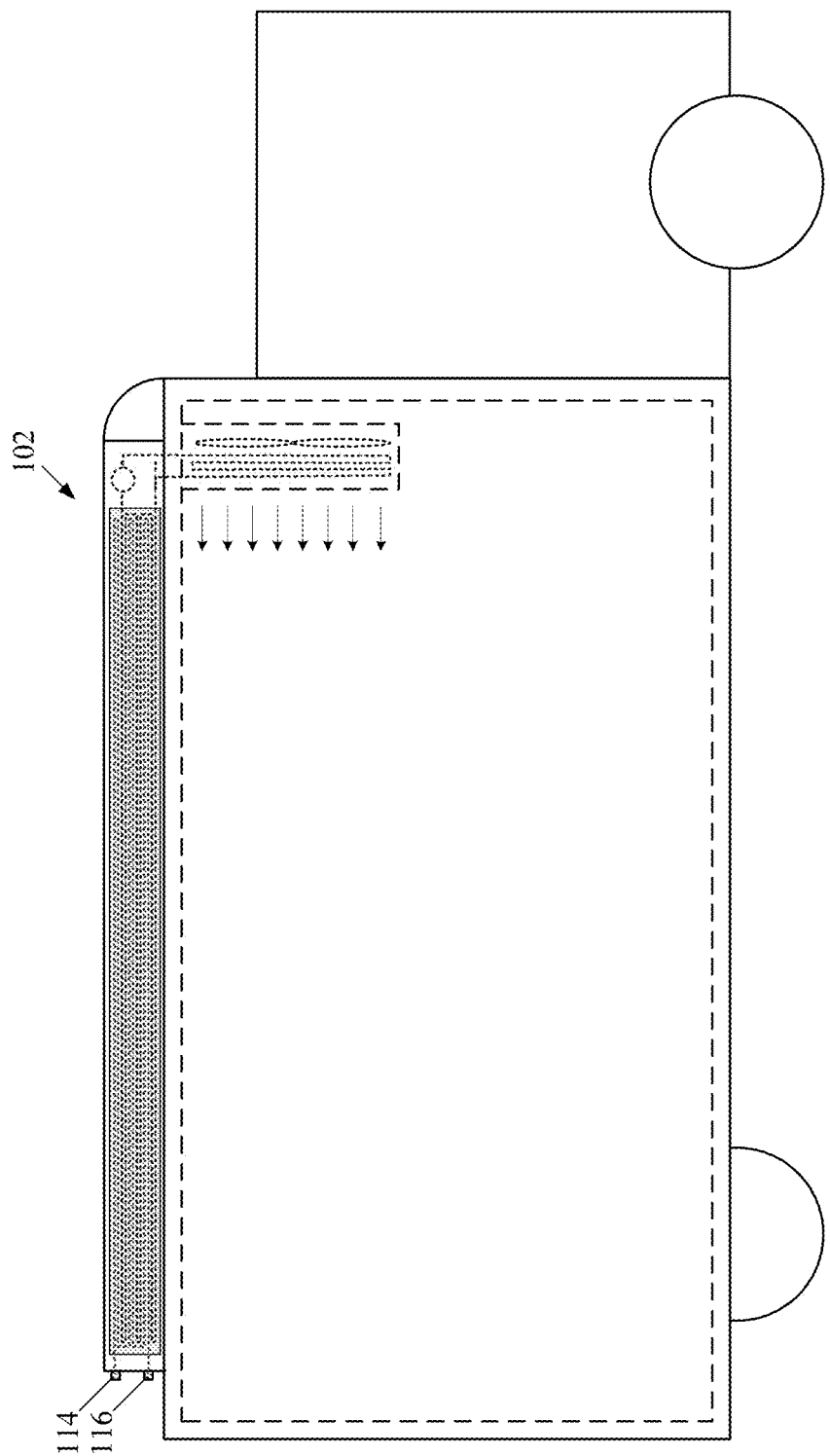
FIG. 4 is a schematic view of another embodiment of a transportation vehicle for transporting items within a cargo area similar to that of FIG. 3 but having a thermal battery system with a cooling capacity that is greater than that of the thermal battery system of FIG. 3 in accordance with one or more aspects and features of the invention.

FIG. 4 illustrates a variation of the transportation vehicle 102 shown in FIG. 3. Specifically, FIG. 4 is a schematic view of another embodiment of a transportation vehicle for transporting items within a cargo area similar to that of FIG. 3 but having a thermal battery system with a cooling capacity that is greater than that of the thermal battery system of FIG. 3. In particular, the thermal battery system has a much larger tank containing more PCM than that of the thermal battery system of FIG. 3, and thus has a greater cooling capacity.

Figure 5:
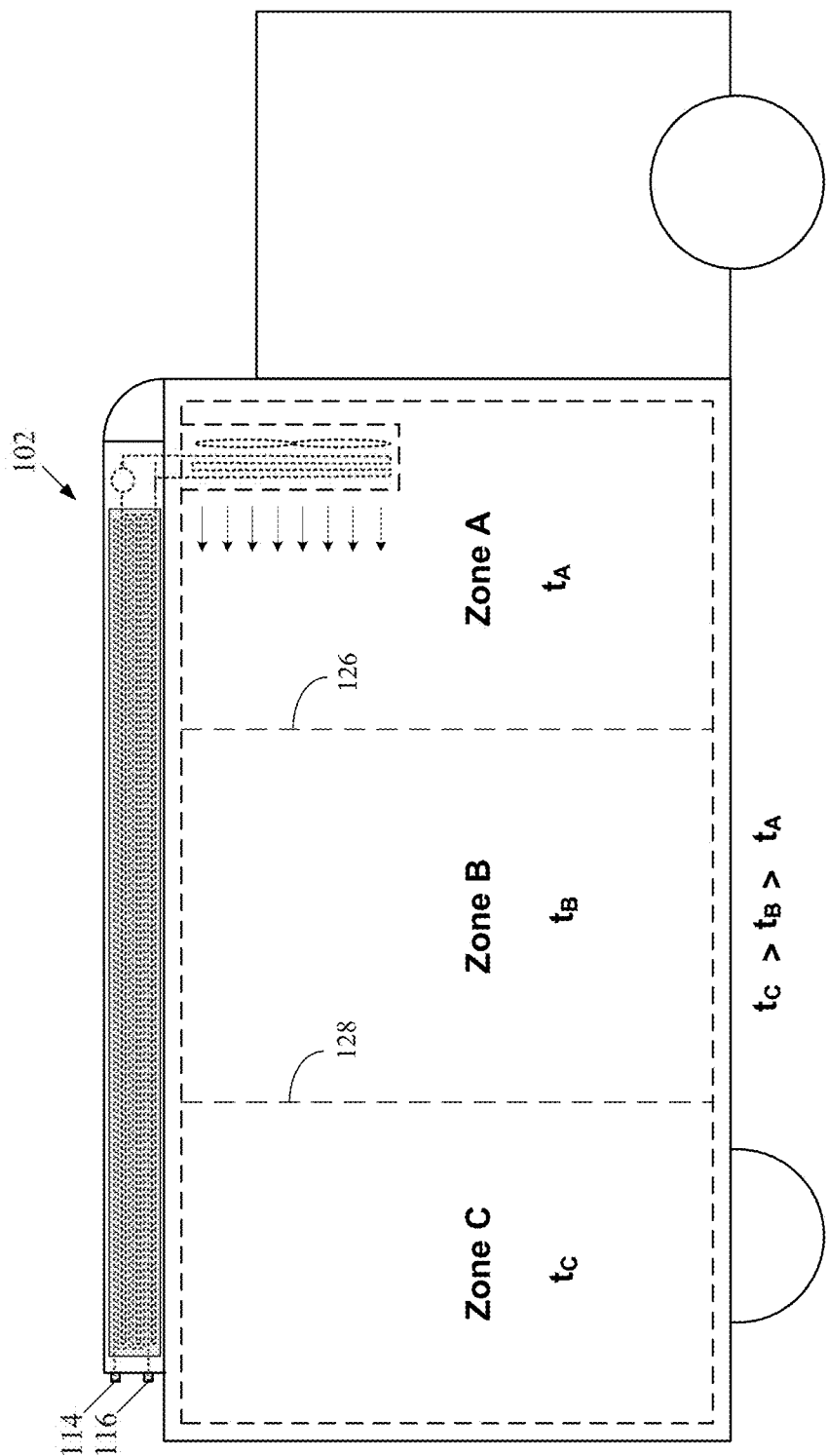
FIG. 5 is a schematic view of another embodiment of a transportation vehicle for transporting items within a cargo area similar to that of FIG. 4 but having multiple temperature zones that are cooled by a thermal battery system in accordance with one or more aspects and features of the invention.

FIG. 5 is a schematic view of a variation of the transportation vehicle shown in FIG. 4. Specifically, FIG. 5 is a schematic view of another embodiment of a transportation vehicle for transporting items within a cargo area similar to that of FIG. 4 but having multiple temperature zones that are cooled by the thermal battery system. In this embodiment of FIG. 5, the cargo area is divided into three areas that are partitioned by dividers 126,128 such that three different temperature zones A,B,C are established with a gradient of temperatures $t_A$, $t_B$, and $t_C$, wherein $t_C > t_B > t_A$. The dividers preferably comprise uninsulated walls with strip-curtain doors. Each temperature that is maintained preferably is at or above the applicable minimum required temperature of any food safety regulation or other rule.

Figure 6:
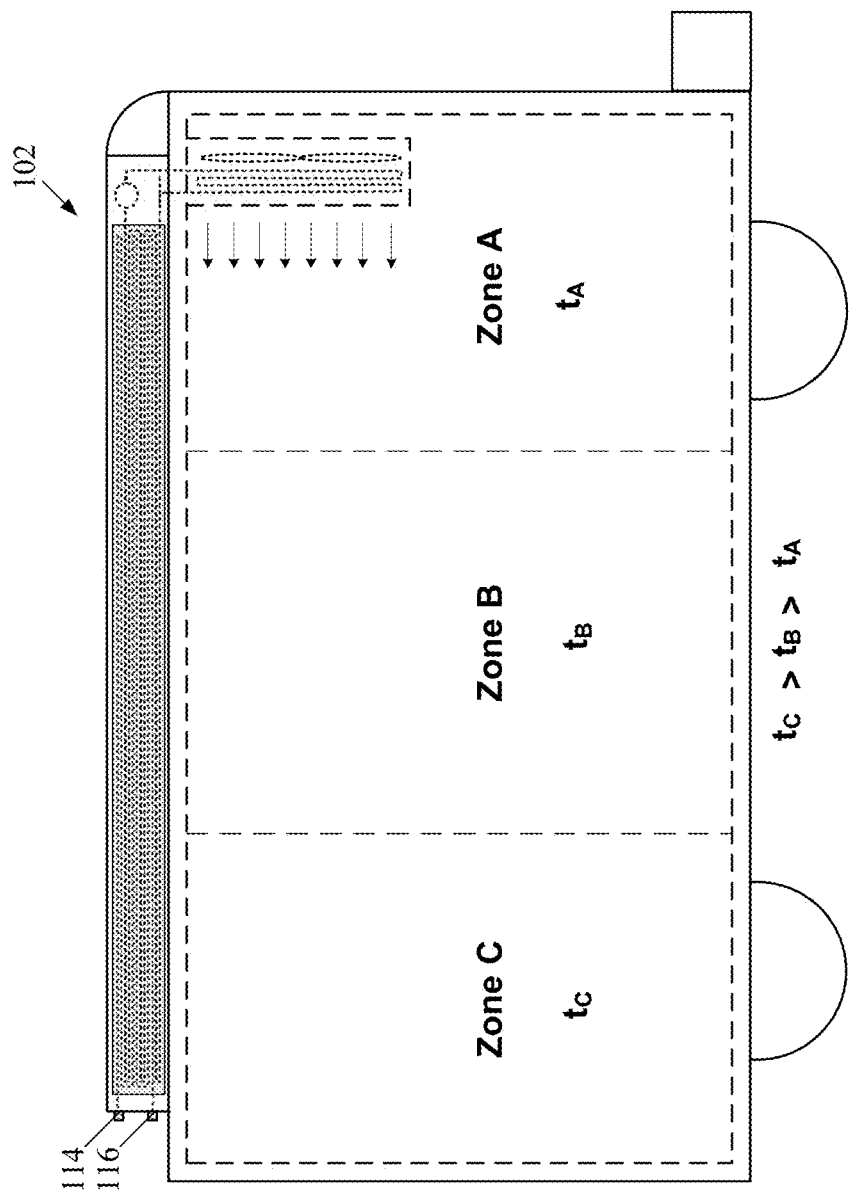
FIG. 6 is a schematic view of an embodiment of a transportation trailer for transporting items within a cargo area having multiple temperature zones that are cooled by a thermal battery system similar to that of FIG. 5 in accordance with one or more aspects and features of the invention.

FIG. 6 is a schematic view of an embodiment of a transportation trailer for transporting items within a cargo area having multiple temperature zones that are cooled by a thermal battery system similar to that of FIG. 5 in accordance with one or more aspects and features of the invention.

Figure 7:
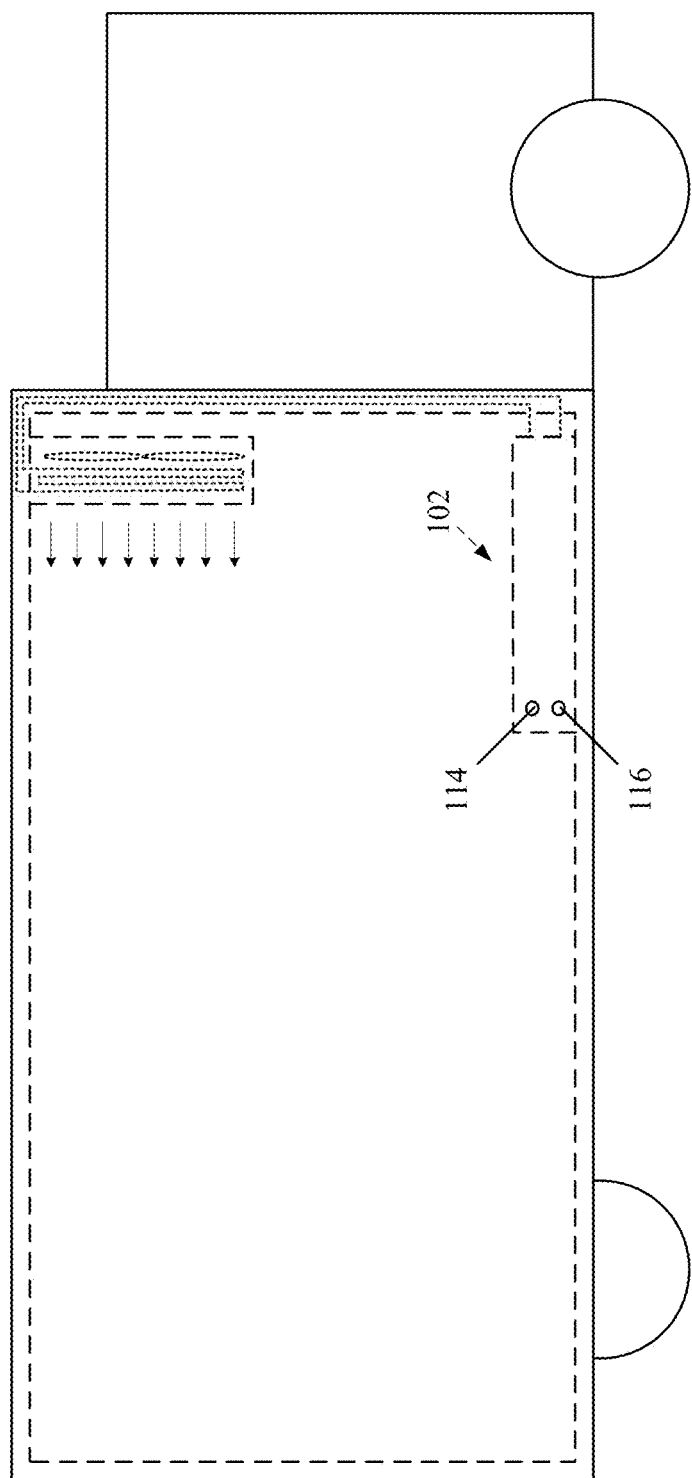
FIG. 7 is a schematic view of another embodiment of a transportation vehicle for transporting items within a cargo area having a temperature that is maintained by a thermal battery system in accordance with one or more aspects and features of the invention.

FIG. 7 is a schematic view of another embodiment of a transportation vehicle for transporting items within a cargo area having a temperature that is maintained by a thermal battery system in accordance with one or more aspects and features of the invention. The second heat exchanger embedded in the PCM of the tank is the same as in earlier described embodiments but, for clarity, is not shown in FIG. 7. Unlike previously disclosed embodiments of the drawings, the thermal battery system in this embodiment is located on a portion of the floor of the cargo area. Furthermore, the external ports 114,116 of the thermal battery system extend through a side wall of the cargo compartment to an exterior of the cargo compartment for connection with a thermal charger.

Figure 8:
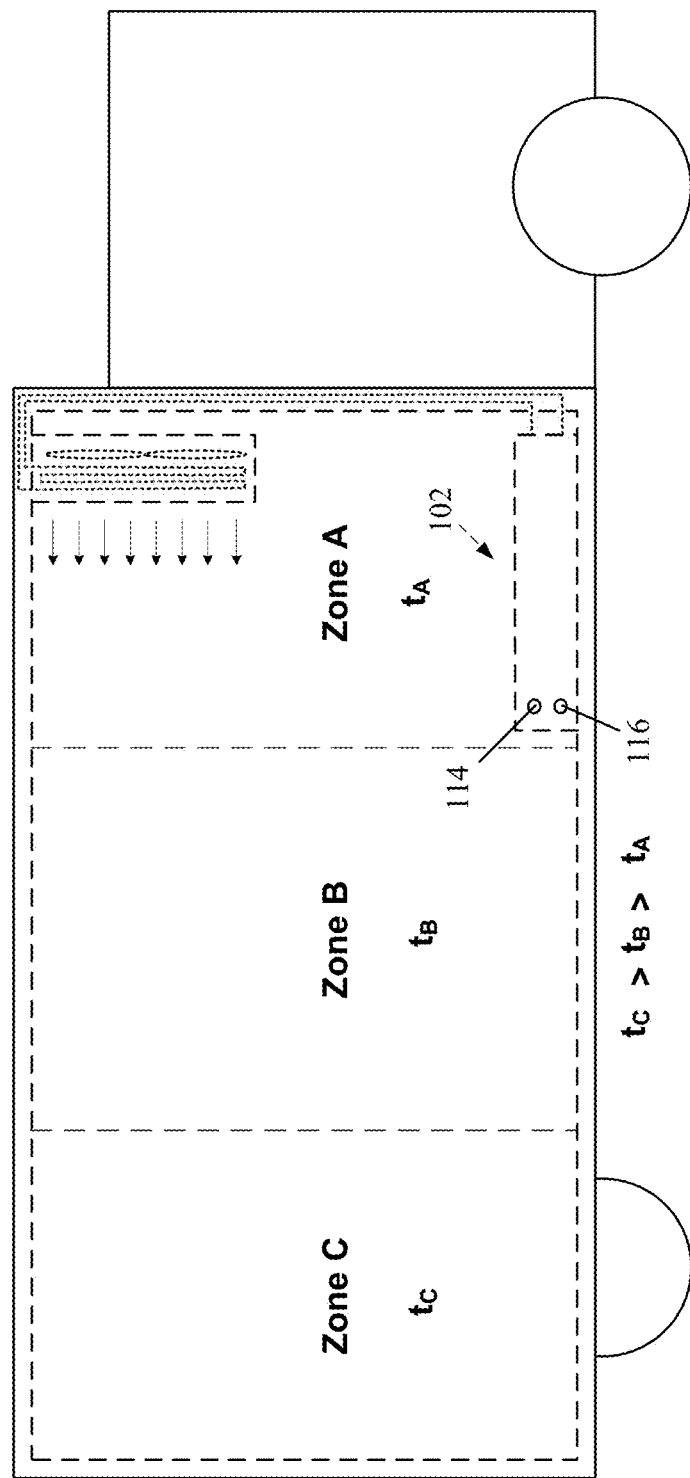
FIG. 8 is a schematic view of another embodiment of a transportation vehicle for transporting items within a cargo area similar to that of FIG. 7 but having multiple temperature zones that are cooled by a thermal battery system in accordance with one or more aspects and features of the invention.

FIG. 8 is a schematic view of another embodiment of a transportation vehicle for transporting items within a cargo area similar to that of FIG. 7 but having multiple temperature zones that are cooled by the thermal battery system. The second heat exchanger embedded in the PCM of the tank is the same as in earlier described embodiments but, for clarity, is not shown in FIG. 8. In this embodiment of FIG. 8, the cargo area is divided into three areas that are partitioned by dividers such that three different temperature zones A,B,C are established with a gradient of temperatures $t_A$, $t_B$, and $t_C$, wherein $t_C > t_B > t_A$. The dividers preferably comprise uninsulated walls with strip-curtain doors. Each temperature that is maintained preferably is at or above the applicable minimum required temperature of any food safety regulation or other rule.

Figure 9:
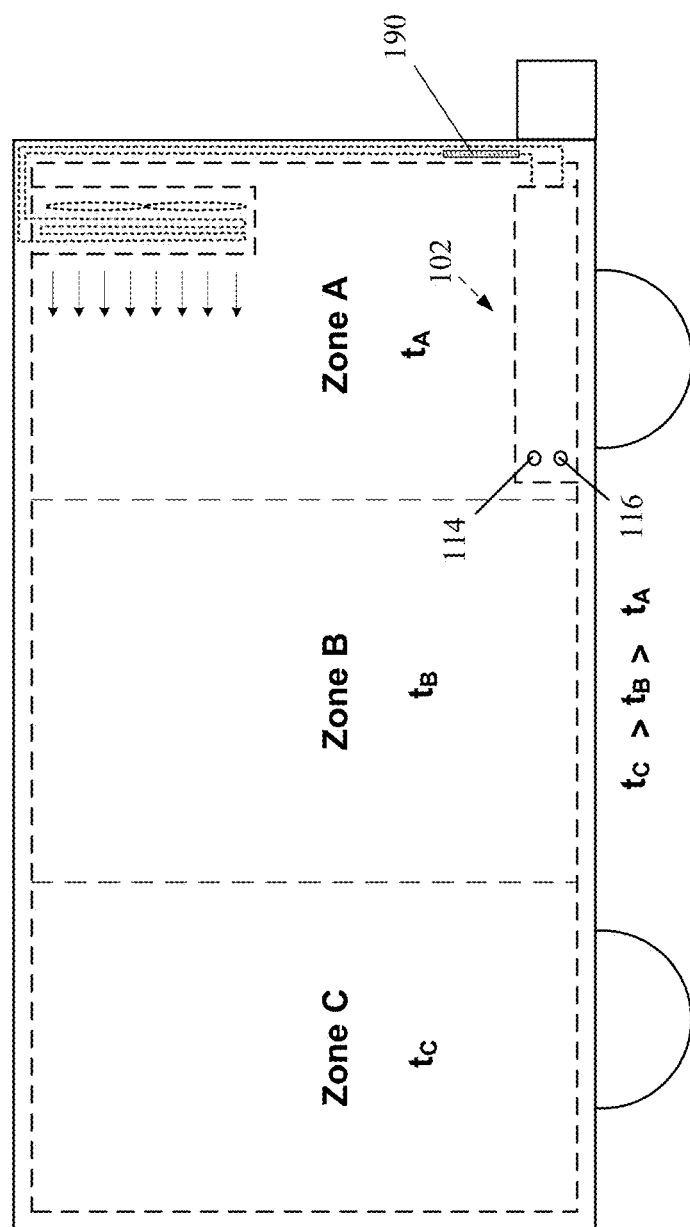
FIG. 9 is a schematic view of an embodiment of a transportation trailer for transporting items within a cargo area having multiple temperature zones that are cooled by a thermal battery system similar to that of FIG. 8 in accordance with one or more aspects and features of the invention.

FIG. 9 is a schematic view of an embodiment of a transportation trailer for transporting items within a cargo area having multiple temperature zones that are cooled by a thermal battery system similar to that of FIG. 8 in accordance with one or more aspects and features of the invention. The second heat exchanger embedded in the PCM of the tank is the same as in earlier described embodiments but, for clarity, is not shown in FIG. 9. In this embodiment of FIG. 9, the closed-loop circuit (shown in blue) preferably includes inline resistive heaters that are activated for purposes of defrosting piping of the closed-loop circuit if and when needed.

Figure 10:
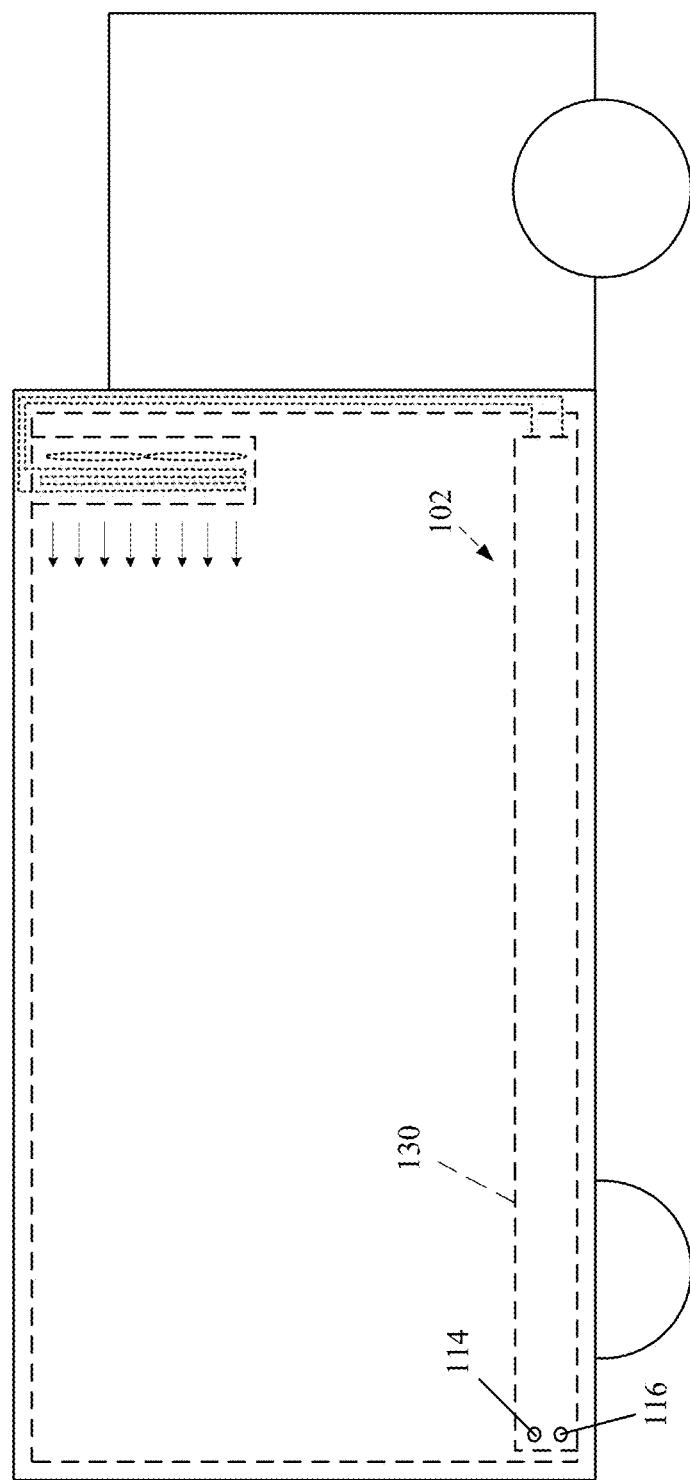
FIG. 10 is a schematic view of another embodiment of a transportation vehicle for transporting items within a cargo area having a temperature that is maintained by a thermal battery system in accordance with one or more aspects and features of the invention.

FIG. 10 is a schematic view of another embodiment of a transportation vehicle for transporting items within a cargo area having a temperature that is maintained by a thermal battery system in accordance with one or more aspects and features of the invention. The second heat exchanger embedded in the PCM of the tank is the same as in earlier described embodiments but, for clarity, is not shown in FIG. 10. In this embodiment of FIG. 10, and unlike previously disclosed embodiments of the drawings, the thermal battery system is located along the entire floor of the cargo compartment and may include a flooring surface 130 serving as the floor of the cargo area for supporting items placed in the cargo area for storage or transport.

Figure 11:
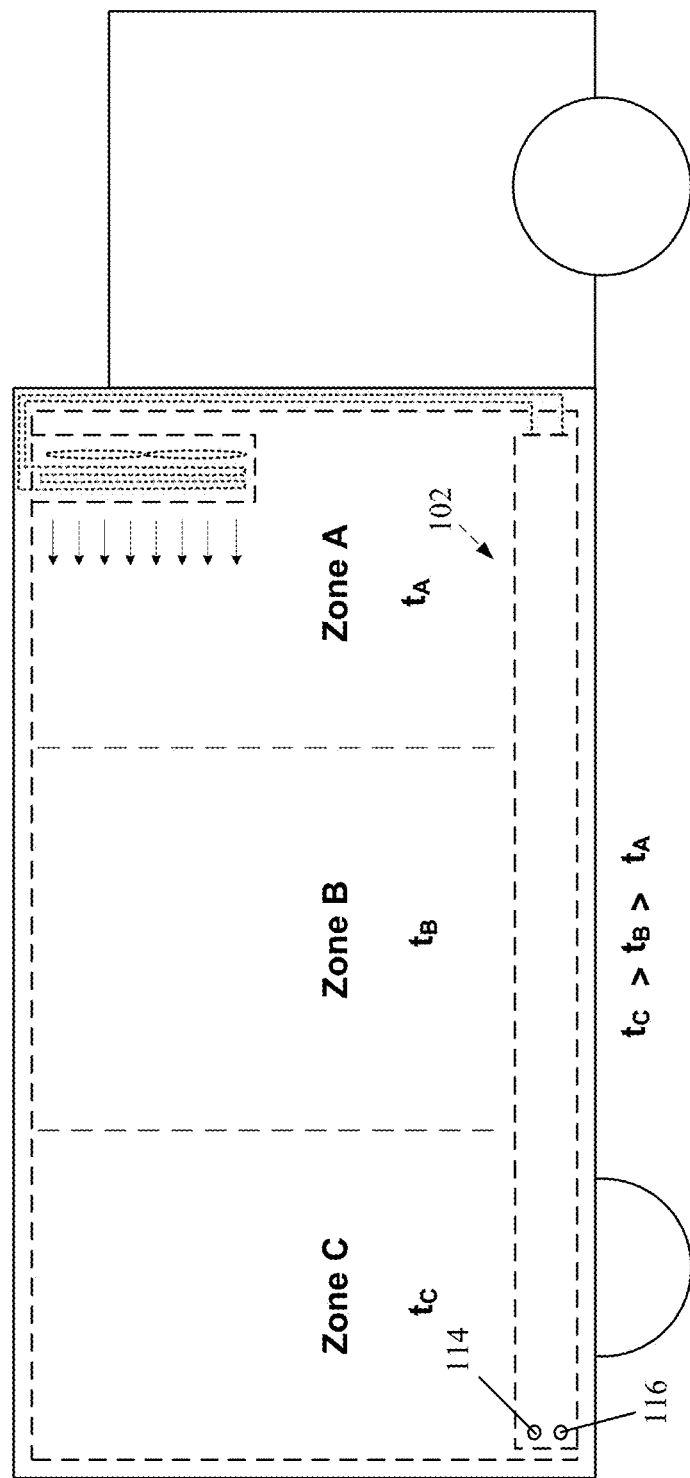
FIG. 11 is a schematic view of another embodiment of a transportation vehicle for transporting items within a cargo area similar to that of FIG. 10 but having multiple temperature zones that are cooled by a thermal battery system in accordance with one or more aspects and features of the invention.

FIG. 11 is a schematic view of another embodiment of a transportation vehicle for transporting items within a cargo area similar to that of FIG. 10 but having multiple temperature zones that are cooled by the thermal battery system. The second heat exchanger embedded in the PCM of the tank is the same as in earlier described embodiments but, for clarity, is not shown in FIG. 11. In this embodiment of FIG. 11, the cargo area is divided into three areas that are partitioned by dividers such that three different temperature zones A,B,C are established with a gradient of temperatures $t_A$, $t_B$, and $t_C$, wherein $t_C > t_B > t_A$ (i.e., the temperature in zone A is cooler than in zone B, and the temperature in zone B is cooler than in zone C). The dividers preferably comprise uninsulated walls with strip-curtain doors. Each temperature that is maintained preferably is at or above the applicable minimum required temperature of any food safety regulation or other rule.

Figure 12:
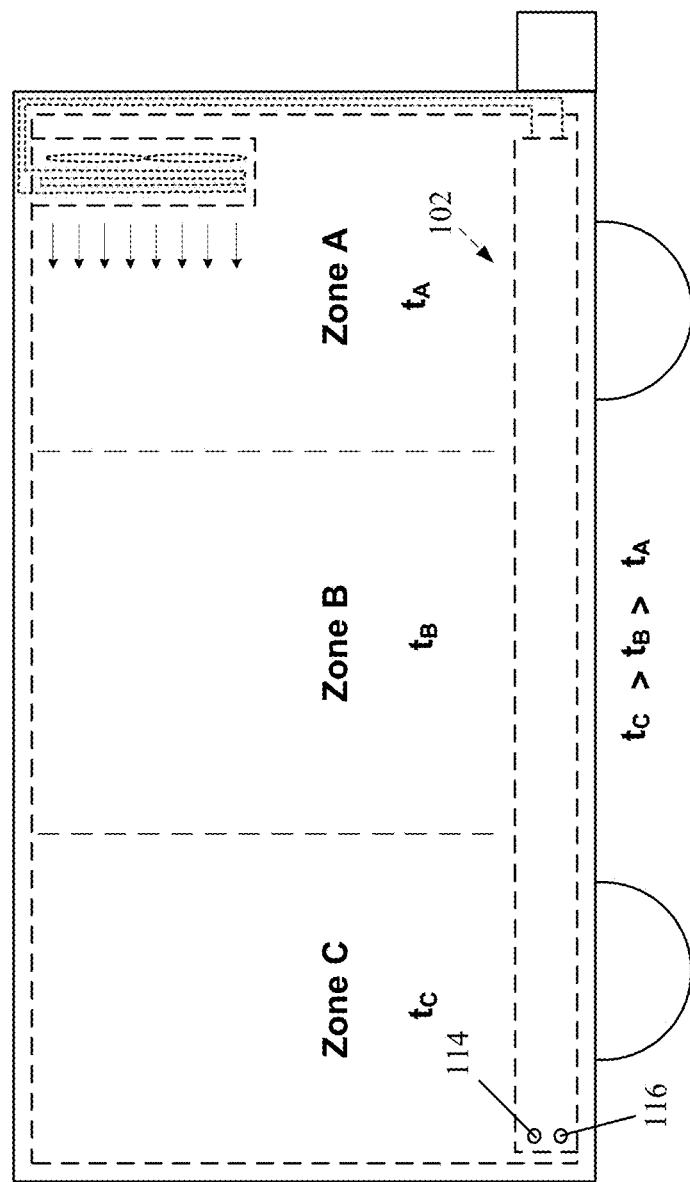
FIG. 12 is a schematic view of an embodiment of a transportation trailer for transporting items within a cargo area having multiple temperature zones that are cooled by a thermal battery system similar to that of FIG. 11 in accordance with one or more aspects and features of the invention.

FIG. 12 is a schematic view of an embodiment of a transportation trailer for transporting items within a cargo area having multiple temperature zones that are cooled by a thermal battery system similar to that of FIG. 11 in accordance with one or more aspects and features of the invention. The second heat exchanger embedded in the PCM of the tank is the same as in earlier described embodiments but, for clarity, is not shown in FIG. 12. In this embodiment of FIG. 12, the cargo area is divided into three areas that are partitioned by dividers such that three different temperature zones A,B,C are established with a gradient of temperatures $t_A$, $t_B$, and $t_C$, wherein $t_C > t_B > t_A$ (i.e., the temperature in zone A is cooler than in zone B, and the temperature in zone B is cooler than in zone C). The dividers preferably comprise uninsulated walls with strip-curtain doors. Each temperature that is maintained preferably is at or above the applicable minimum required temperature of any food safety regulation or other rule.

Figure 13:
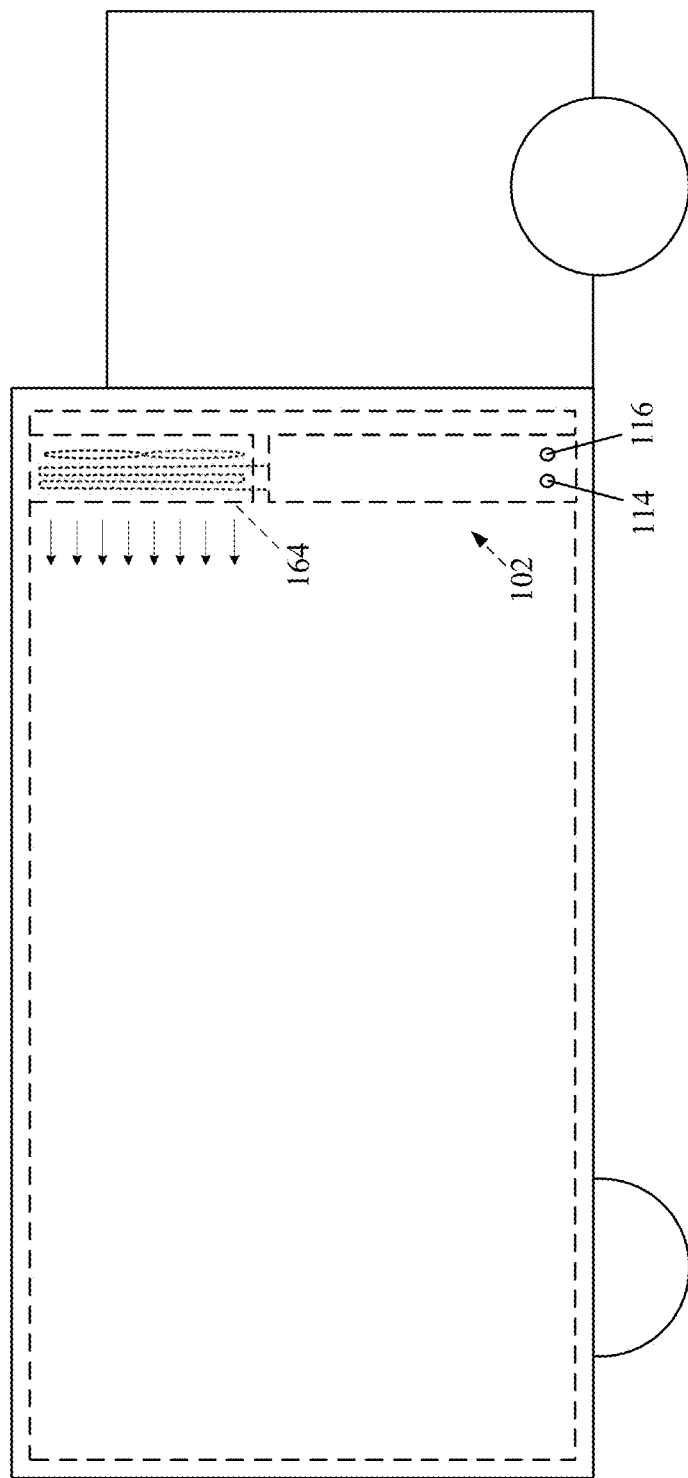
FIG. 13 is a schematic view of another embodiment of a transportation vehicle for transporting items within a cargo area having a temperature that is maintained by a thermal battery system in accordance with one or more aspects and features of the invention.

FIG. 13 is a schematic view of another embodiment of a transportation vehicle for transporting items within a cargo area having a temperature that is maintained by a thermal battery system in accordance with one or more aspects and features of the invention. The second heat exchanger embedded in the PCM of the tank is the same as in earlier described embodiments but, for clarity, is not shown in FIG. 13. In this embodiment of FIG. 13, and unlike previously disclosed embodiments of the drawings, the thermal battery system is vertically oriented within the cargo area and aligned below the cooling unit 164.

Figure 14:
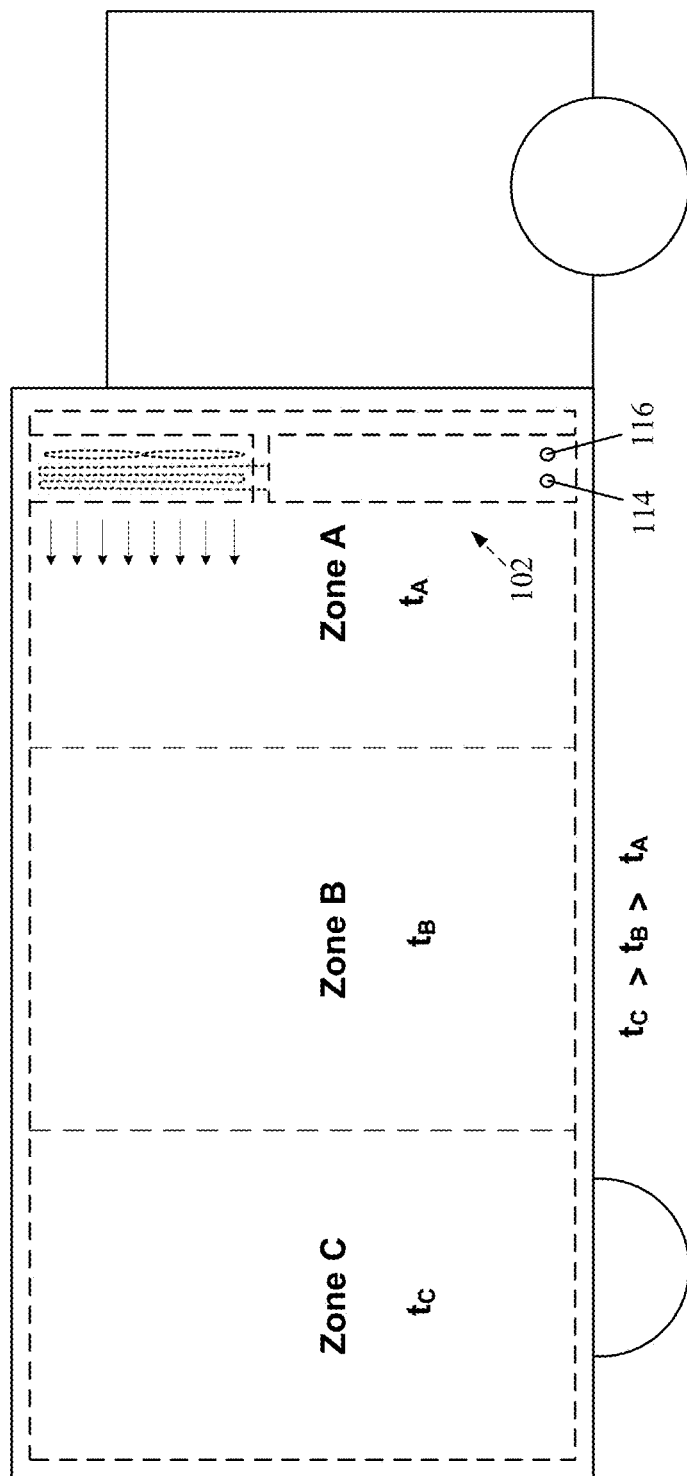
FIG. 14 is a schematic view of another embodiment of a transportation vehicle for transporting items within a cargo area similar to that of FIG. 13 but having multiple temperature zones that are cooled by a thermal battery system in accordance with one or more aspects and features of the invention.

FIG. 14 is a schematic view of another embodiment of a transportation vehicle for transporting items within a cargo area similar to that of FIG. 13 but having multiple temperature zones that are cooled by a thermal battery system in accordance with one or more aspects and features of the invention. The second heat exchanger embedded in the PCM of the tank is the same as in earlier described embodiments but, for clarity, is not shown in FIG. 14. In this embodiment of FIG. 14, the cargo area is divided into three areas that are partitioned by dividers such that three different temperature zones A,B,C are established with a gradient of temperatures $t_A$, $t_B$, and $t_C$, wherein $t_C > t_B > t_A$. The dividers preferably comprise uninsulated walls with strip-curtain doors. Each temperature that is maintained preferably is at or above the applicable minimum required temperature of any food safety regulation or other rule.

Figure 15:
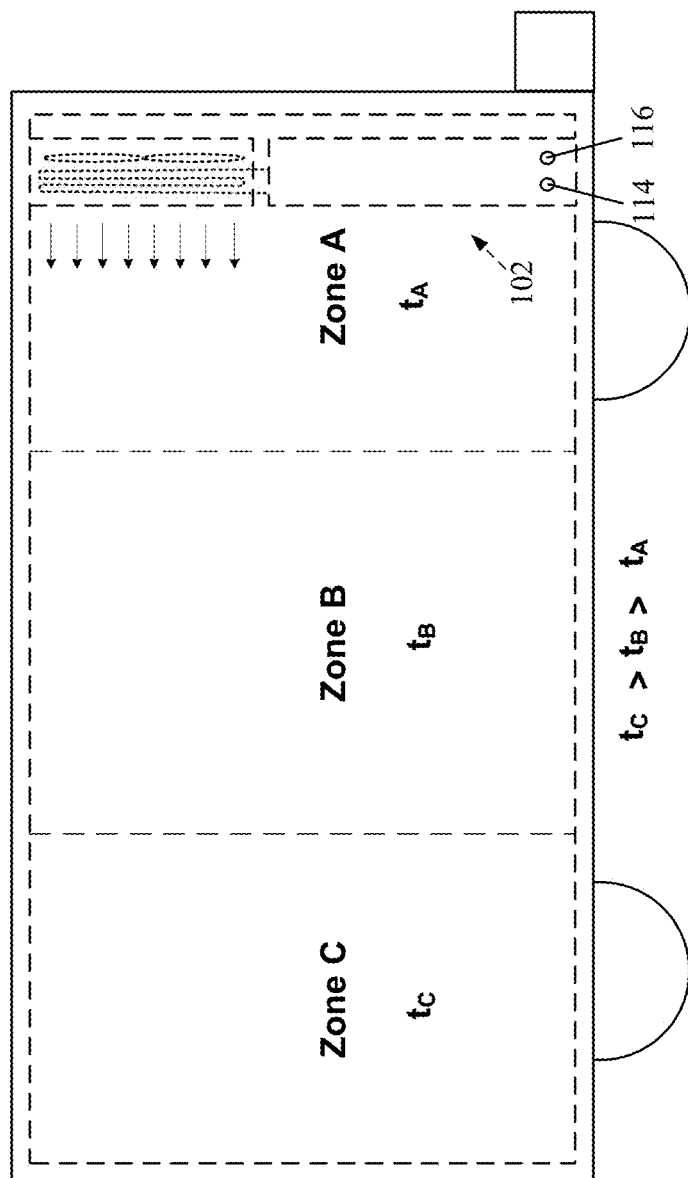
FIG. 15 is a schematic view of an embodiment of a transportation trailer for transporting items within a cargo area having multiple temperature zones that are cooled by a thermal battery system similar to that of FIG. 14 in accordance with one or more aspects and features of the invention.

FIG. 15 is a schematic view of an embodiment of a transportation trailer for transporting items within a cargo area having multiple temperature zones that are cooled by a thermal battery system similar to that of FIG. 14 in accordance with one or more aspects and features of the invention. The second heat exchanger embedded in the PCM of the tank is the same as in earlier described embodiments but, for clarity, is not shown in FIG. 15. In this embodiment of FIG. 15, the cargo area is divided into three areas that are partitioned by dividers such that three different temperature zones A,B,C are established with a gradient of temperatures $t_A$, $t_B$, and $t_C$, wherein $t_C > t_B > t_A$. The dividers preferably comprise uninsulated walls with strip-curtain doors. Each temperature that is maintained preferably is at or above the applicable minimum required temperature of any food safety regulation or other rule.

Figure 16:
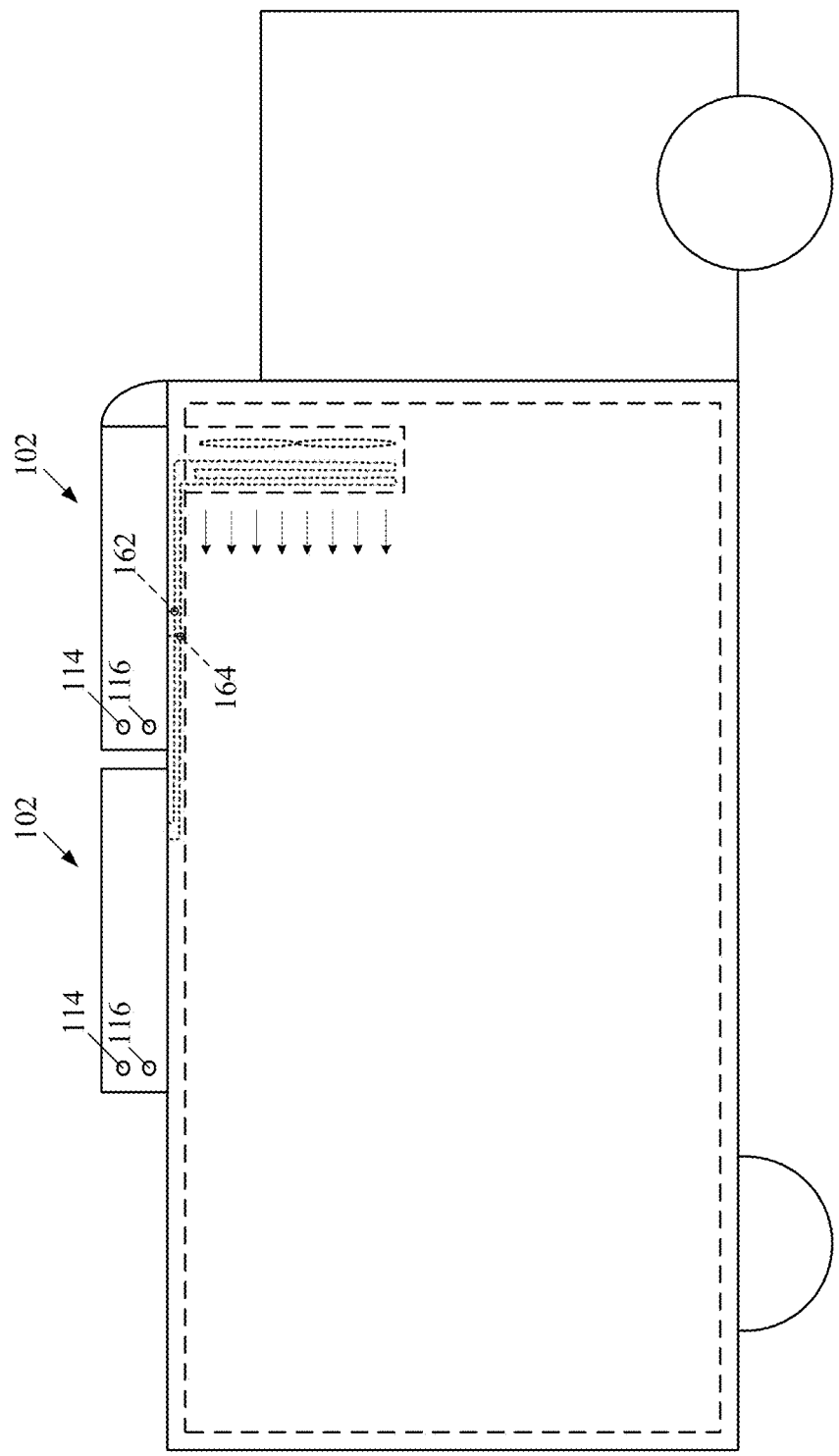
FIG. 16 is a schematic view of another embodiment of a transportation vehicle for transporting items within a cargo area having a temperature that is maintained by a combination of thermal battery systems in accordance with one or more aspects and features of the invention.

FIG. 16 is a schematic view of another embodiment of a transportation vehicle for transporting items within a cargo area having a temperature that is maintained by a combination of thermal battery systems in accordance with one or more aspects and features of the invention. Each respective second heat exchanger embedded in the PCM of a tank is the same as in earlier described embodiments but, for clarity, is not shown in FIG. 16. In this embodiment of FIG. 16, and unlike previously disclosed embodiments of the drawings, two thermal battery systems are utilized instead of one. Each respective second heat exchanger embedded in the PCM of a tank is the same as in earlier described embodiments but, for clarity, is not shown in FIG. 16. Moreover, the closed-loop circuit includes valves 160,162 by which the cooling unit is connected to one of the two thermal battery systems. The valves preferably are automatically controlled such that a switch between the thermal battery systems is made as the one in current use nears the end of its operational effectiveness, with the other serving as a secondary, auxiliary, or backup thermal battery system.

Figure 17:
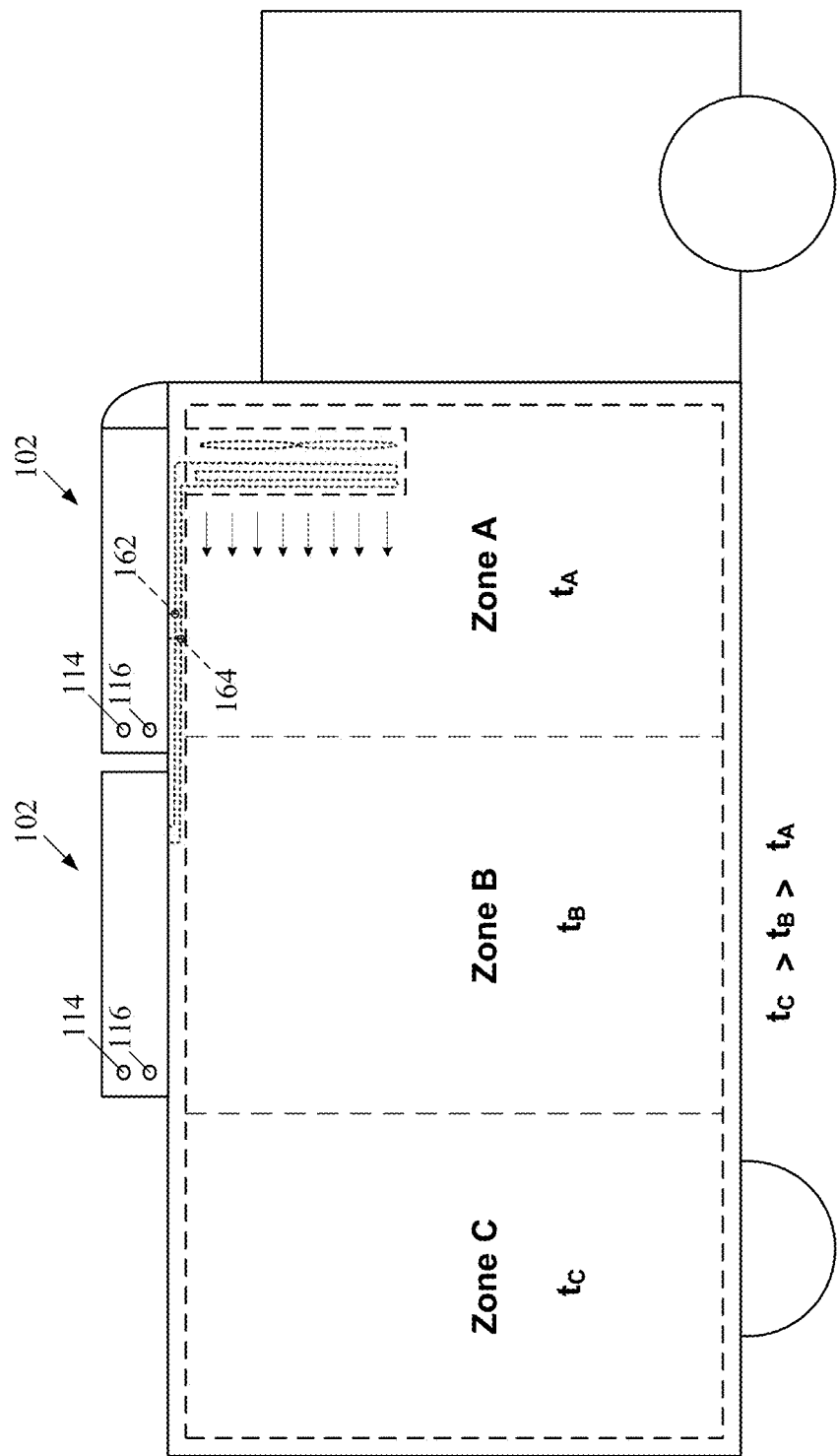
FIG. 17 is a schematic view of another embodiment of a transportation vehicle for transporting items within a cargo area similar to that of FIG. 16 but having multiple temperature zones that are cooled by the combination of thermal battery systems in accordance with one or more aspects and features of the invention.

FIG. 17 is a schematic view of another embodiment of a transportation vehicle for transporting items within a cargo area that is cooled by two thermal battery systems similar to that of FIG. 16. Each respective second heat exchanger embedded in the PCM of a tank is the same as in earlier described embodiments but, for clarity, is not shown in FIG. 17. In this embodiment of FIG. 17, the cargo area is divided into three areas that are partitioned by dividers such that three different temperature zones A,B,C are established with a gradient of temperatures $t_A$, $t_B$, and $t_C$, wherein $t_C > t_B > t_A$. The dividers preferably comprise uninsulated walls with strip-curtain doors. Each temperature that is maintained preferably is at or above the applicable minimum required temperature of any food safety regulation or other rule.

Figure 18:
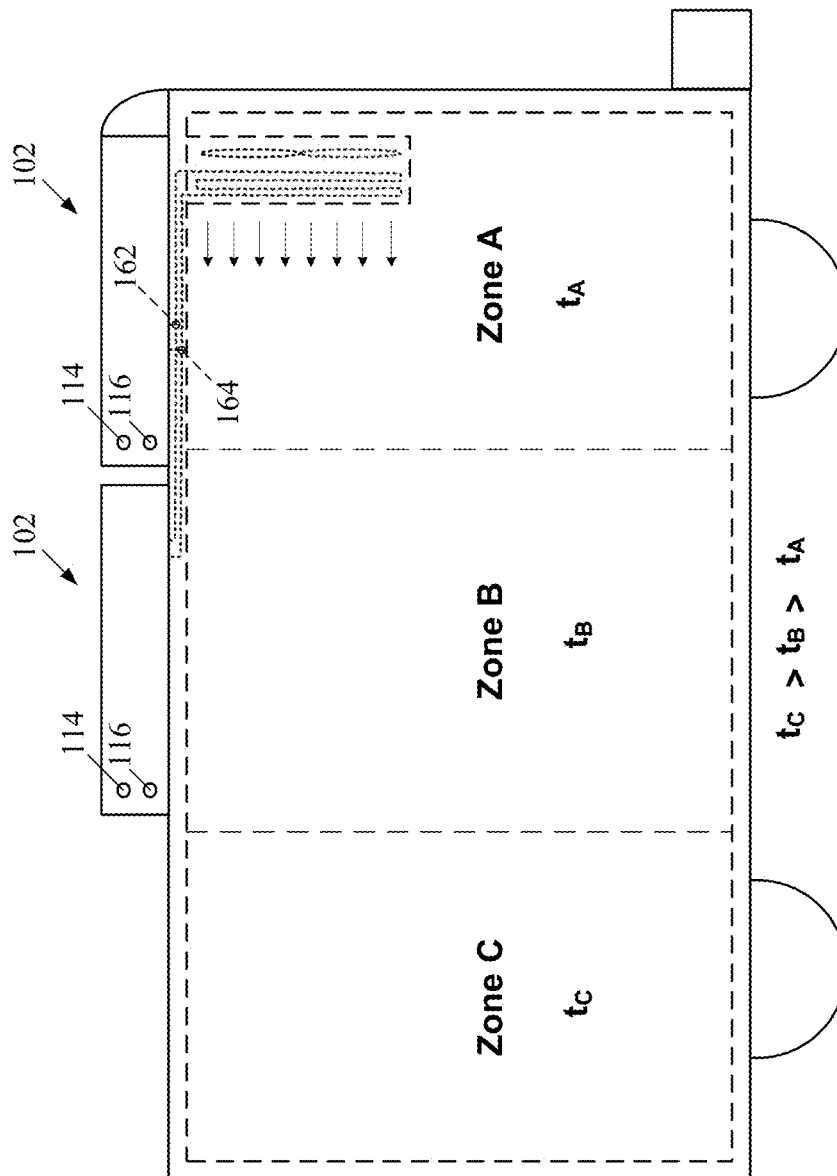
FIG. 18 is a schematic view of an embodiment of a transportation trailer for transporting items within a cargo area having multiple temperature zones that are cooled by the combination of thermal battery systems similar to that of FIG. 17 in accordance with one or more aspects and features of the invention.

FIG. 18 is a schematic view of an embodiment of a transportation trailer for transporting items within a cargo area having multiple temperature zones that are cooled by thermal battery systems similar to that of FIG. 17. Each respective second heat exchanger embedded in the PCM of a tank is the same as in earlier described embodiments but, for clarity, is not shown in FIG. 18. In this embodiment of FIG. 18, the cargo area is divided into three areas that are partitioned by dividers such that three different temperature zones A,B,C are established with a gradient of temperatures $t_A$, $t_B$, and $t_C$, wherein $t_C > t_B > t_A$. The dividers preferably comprise uninsulated walls with strip-curtain doors. Each temperature that is maintained preferably is at or above the applicable minimum required temperature of any food safety regulation or other rule.

Figure 19:
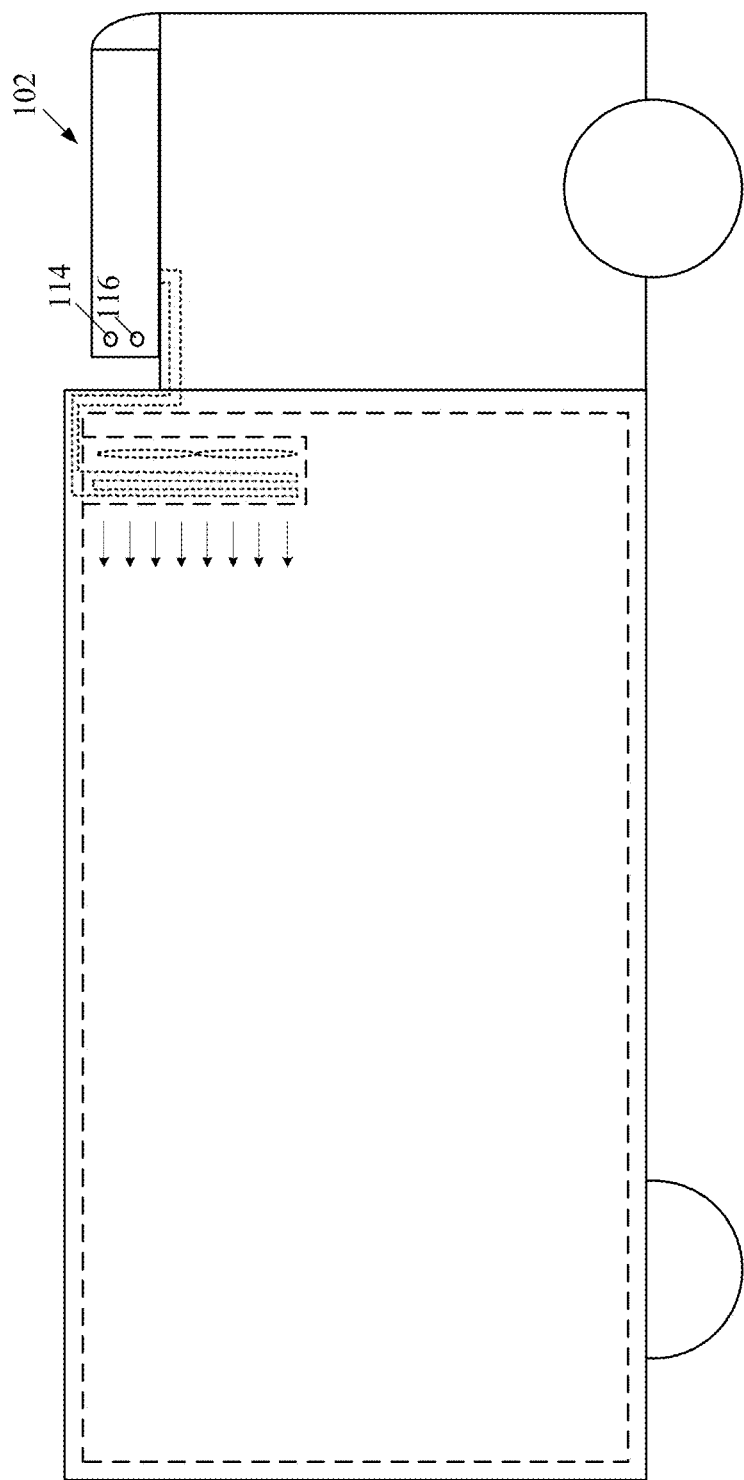
FIG. 19 is a schematic view of another embodiment of a transportation vehicle for transporting items within a cargo area having a temperature that is maintained by a thermal battery system in accordance with one or more aspects and features of the invention.

FIG. 19 is a schematic view of another embodiment of a transportation vehicle for transporting items within a cargo area having a temperature that is maintained by a thermal battery system in accordance with one or more aspects and features of the invention. The second heat exchanger embedded in the PCM of the tank is the same as in earlier described embodiments of the drawings but, for clarity, is not shown in FIG. 19. In this embodiment of FIG. 19, the thermal battery system 102 is located on the roof of the cab and is not located above, below, or within the cargo compartment.

Figure 20:
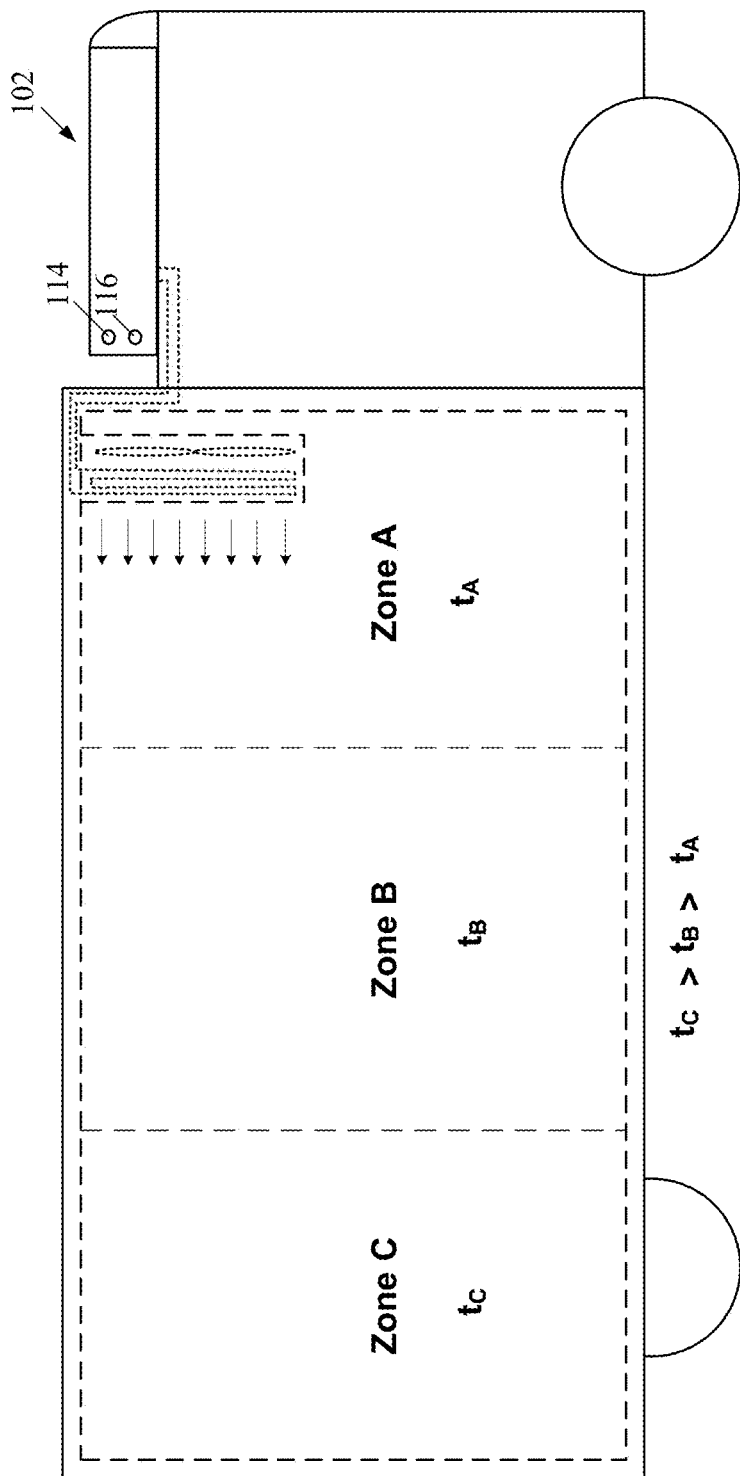
FIG. 20 is a schematic view of another embodiment of a transportation vehicle for transporting items within a cargo area similar to that of FIG. 19 but having multiple temperature zones that are cooled by a thermal battery system in accordance with one or more aspects and features of the invention.

FIG. 20 is a schematic view of another embodiment of a transportation vehicle for transporting items within a cargo area similar to that of FIG. 19 but having multiple temperature zones that are cooled by a thermal battery system in accordance with one or more aspects and features of the invention. The second heat exchanger embedded in the PCM of the tank is the same as in earlier described embodiments of the drawings but, for clarity, is not shown in FIG. 20. In this embodiment of FIG. 20, the cargo area is divided into three areas that are partitioned by dividers such that three different temperature zones A,B,C are established with a gradient of temperatures $t_A$, $t_B$, and $t_C$, wherein $t_C > t_B > t_A$. The dividers preferably comprise uninsulated walls with strip-curtain doors. Each temperature that is maintained preferably is at or above the applicable minimum required temperature of any food safety regulation or other rule.

Figure 21:
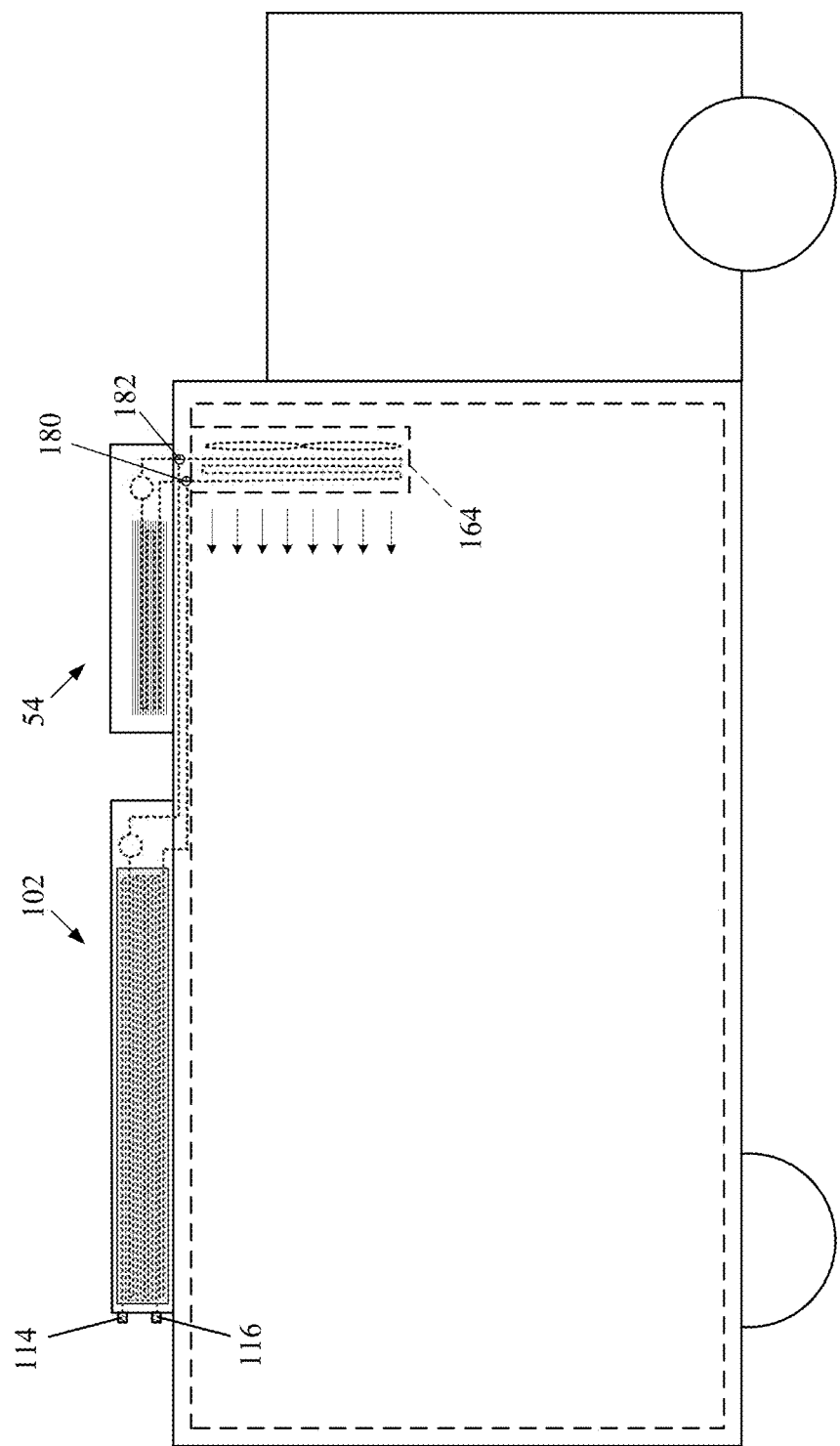
FIG. 21 is a schematic view of an embodiment of a transportation vehicle for transporting items within a cargo area having a temperature that is alternatively maintained by a thermal battery system or a refrigeration unit in accordance with one or more aspects and features of the invention, which cooling is mutually exclusive of one another.
Figure 21A:
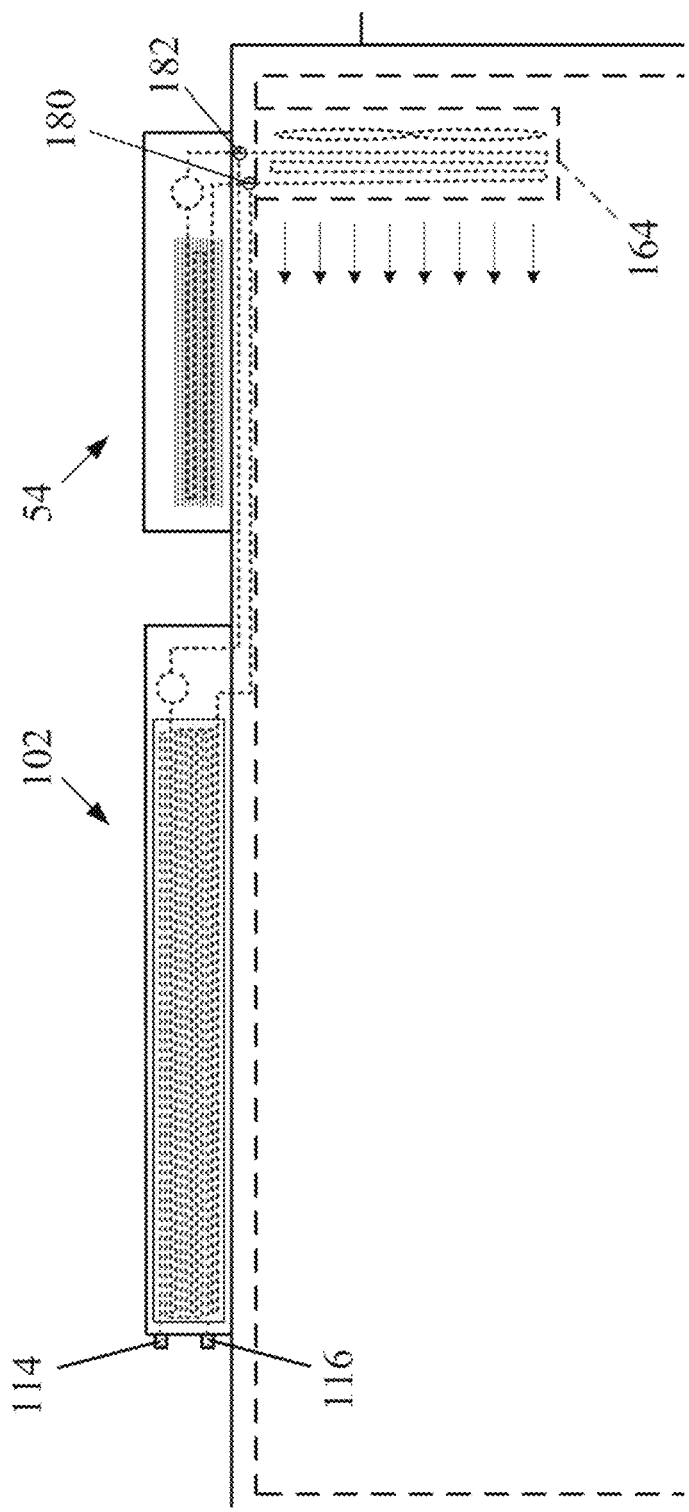
FIG. 21A is an enlarged view of a portion of the transportation vehicle of FIG. 21.

FIG. 21 is a schematic view of an embodiment of a transportation vehicle for transporting items within a cargo area having a temperature that is alternatively maintained by a thermal battery system 102 or a refrigeration unit 54 in accordance with one or more aspects and features of the invention. FIG. 21A is an enlarged view of a portion of the transportation vehicle of FIG. 21.

In the embodiment of FIG. 21, the closed-loop circuit includes valves 180,182 by which the cooling unit 164 is connected either to the thermal battery system 102 or to the refrigeration unit 54 for cooling. The valves preferably are automatically controlled such that a switch is made as the one in current use nears the end of its operational effectiveness or becomes inoperable, with the other serving as a secondary, auxiliary, or backup energy source for cooling of the cargo area.

Figure 22:
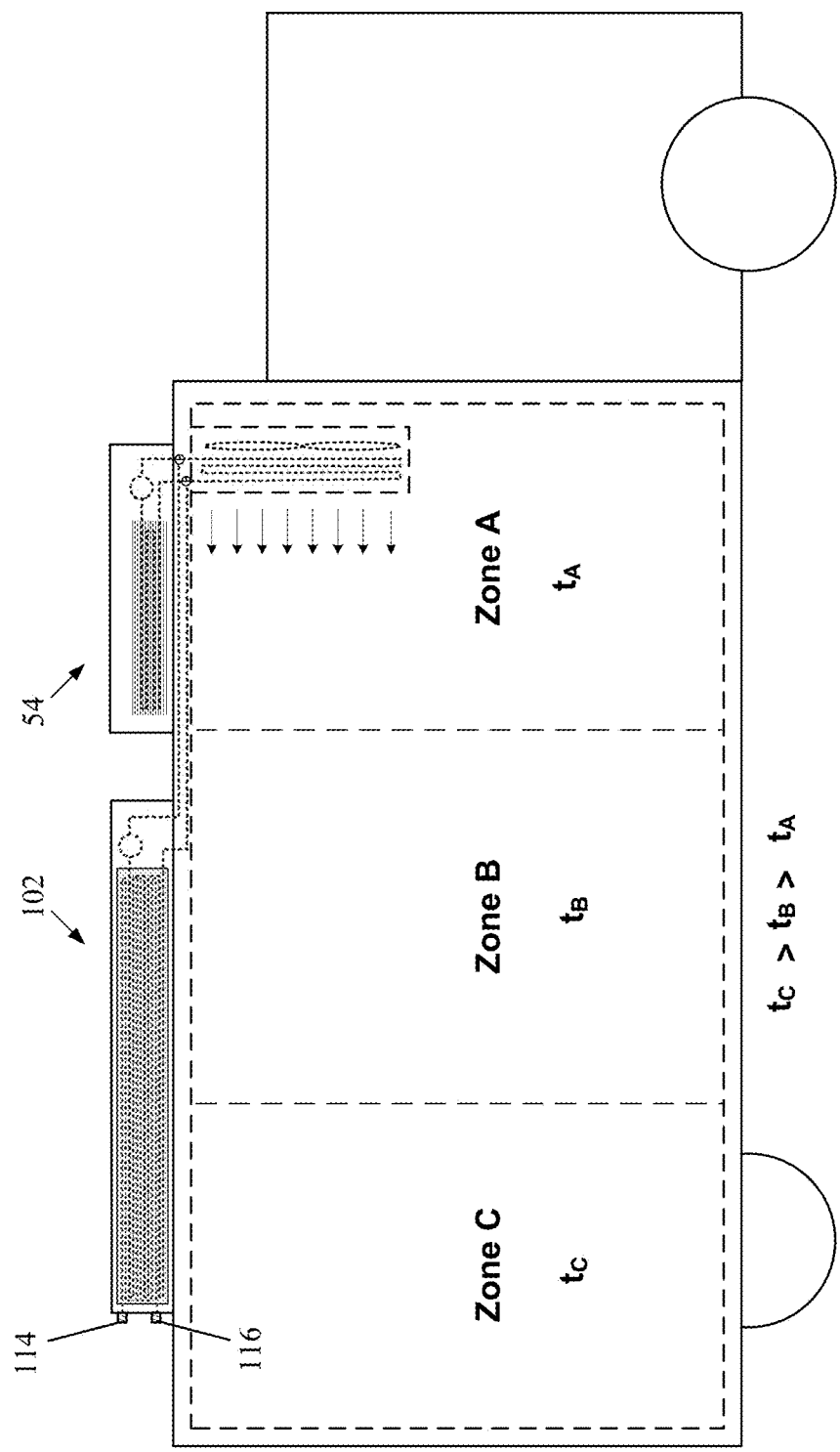
FIG. 22 is a schematic view of another embodiment of a transportation vehicle for transporting items within a cargo area similar to that of FIG. 21 but having multiple temperature zones that are alternatively cooled by a thermal battery system or a refrigeration unit in accordance with one or more aspects and features of the invention.

FIG. 22 is a schematic view of another embodiment of a transportation vehicle for transporting items within a cargo area that is alternatively cooled by either a thermal battery system 102 or a refrigeration unit 54 similar to that of FIG. 21 but having multiple temperature zones. In the embodiment of FIG. 22, the cargo area is divided into three areas that are partitioned by dividers such that three different temperature zones A,B,C are established with a gradient of temperatures $t_A$, $t_B$, and $t_C$, wherein $t_C > t_B > t_A$. The dividers preferably comprise uninsulated walls with strip-curtain doors. Each temperature that is maintained preferably is at or above the applicable minimum required temperature of any food safety regulation or other rule.

Figure 23:
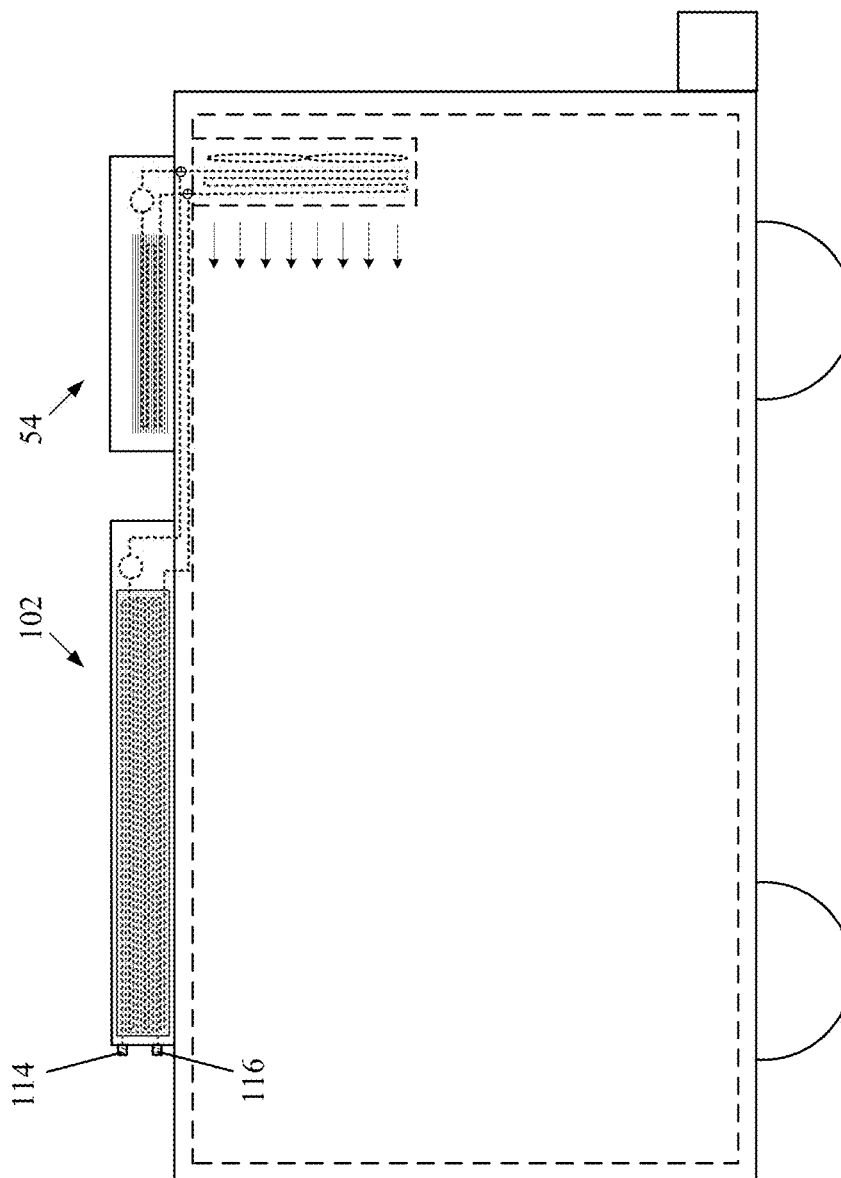
FIG. 23 is a schematic view of an embodiment of a transportation trailer for transporting items within a cargo area that is alternatively cooled by either a thermal battery system or a refrigeration unit in accordance with one or more aspects and features of the invention, which cooling is mutually exclusive of one another.

FIG. 23 is a schematic view of an embodiment of a transportation trailer for transporting items within a cargo area that is alternatively cooled by either a thermal battery system 102 or a refrigeration unit 54 similar to that of FIG. 21.

Figure 24:
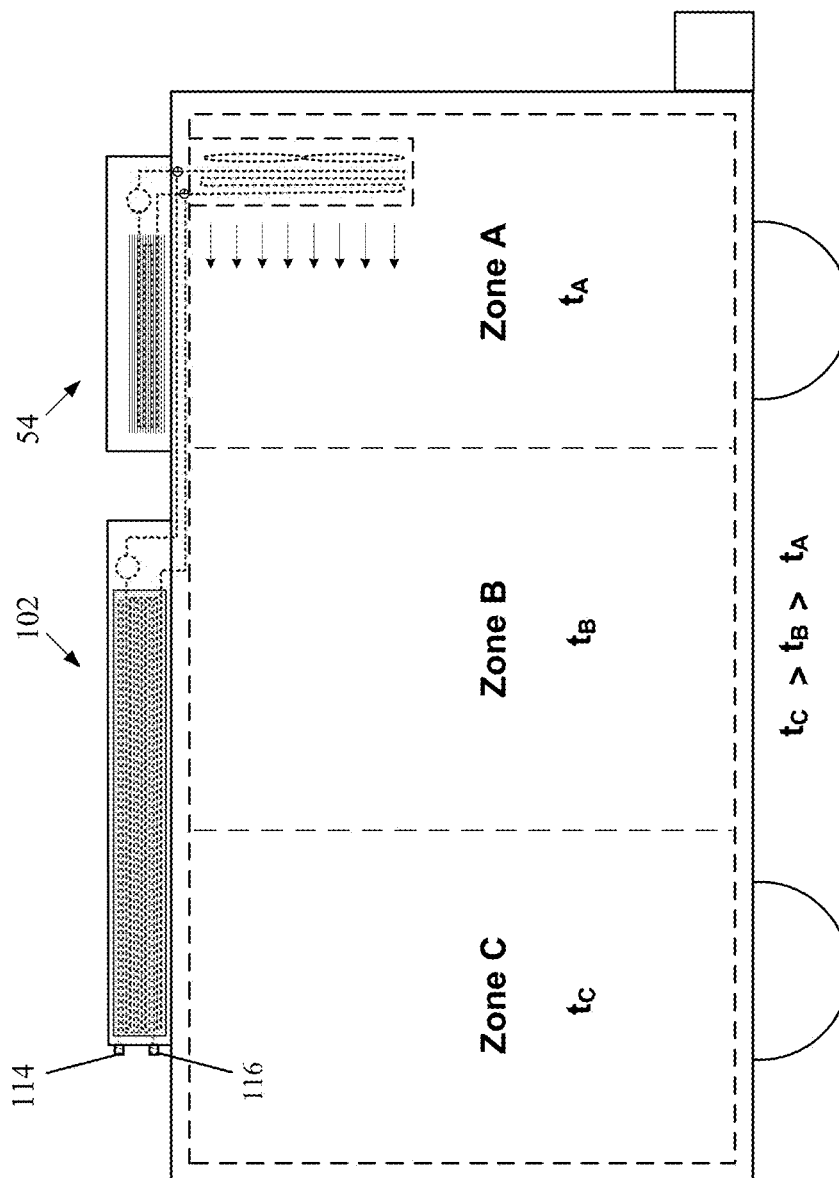
FIG. 24 is a schematic view of another embodiment of a transportation trailer for transporting items within a cargo area similar to that of FIG. 23 but having multiple temperature zones that are alternatively cooled by a thermal battery system or a refrigeration unit in accordance with one or more aspects and features of the invention.

FIG. 24 is a schematic view of an embodiment of a transportation trailer for transporting items within a cargo area having multiple temperature zones that is alternatively cooled by either a thermal battery system 102 or a refrigeration unit 54 similar to that of FIG. 22. In this embodiment of FIG. 24, the cargo area is divided into three areas that are partitioned by dividers such that three different temperature zones A,B,C are established with a gradient of temperatures $t_A$, $t_B$, and $t_C$, wherein $t_C > t_B > t_A$. The dividers preferably comprise uninsulated walls with strip-curtain doors. Each temperature that is maintained preferably is at or above the applicable minimum required temperature of any food safety regulation or other rule.

Figure 25:
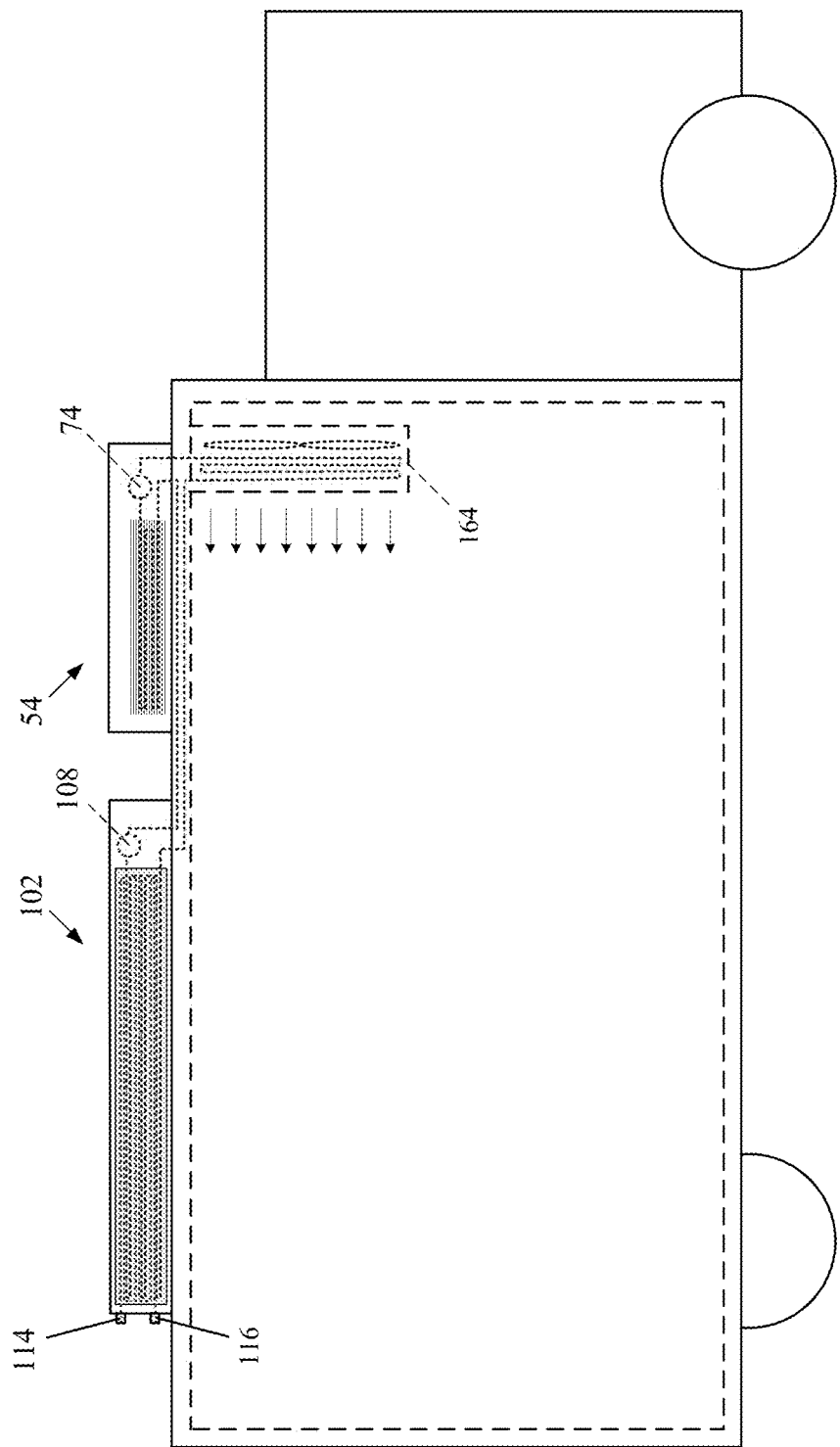
FIG. 25 is a schematic view of an embodiment of a transportation vehicle for transporting items within a cargo area having a temperature that is maintained by a thermal battery system arranged in series with a refrigeration unit in accordance with one or more aspects and features of the invention.

FIG. 25 is a schematic view of an embodiment of a transportation vehicle for transporting items within a cargo area having a temperature that is maintained by a thermal battery system 102 arranged in series with a refrigeration unit 54 in accordance with one or more aspects and features of the invention. In this embodiment, the PCM is charged by an external source through external ports 114,116 as in the above-described embodiments of the drawings. Unlike these prior embodiments, in the embodiment of FIG. 25, a refrigeration unit 54 is included and arranged in the closed-loop circuit connecting the PCM of the thermal battery system 102 and the cooling unit 164. The thermal battery system may include an internal pump 108 for fluid flow through this closed-loop circuit; the refrigeration unit 54 may include an internal pump 74 for fluid flow through this closed-loop circuit; or both, as shown in FIG. 25.

In the embodiment of FIG. 25, the refrigeration unit 54 preferably is located upstream of the thermal battery system 102 and is utilized as an alternative to an external cooling source for charging the PCM of the thermal battery system 102. In such implementation, the refrigeration unit 54 functions as a charging unit for the PCM. It is believed that operational efficiencies may be gained by slowly charging the PCM of the thermal battery system 102 over time using the refrigeration unit 54, and then using the thermal battery system 102 for cooling of the cargo area via the cooling unit 164 rather than using the refrigeration unit 54 for directly cooling of the cargo area via the cooling unit 164.

In a variation of this embodiment, the refrigeration unit 54 is located downstream of the thermal battery system 102 and is utilized for cooling the interior cargo area via the cooling unit 164, either in combination with the thermal battery system 102, or by itself when the thermal battery system 102 is in need of charging and no longer operational for cooling the interior cargo area via the cooling unit 164.

Figure 26:
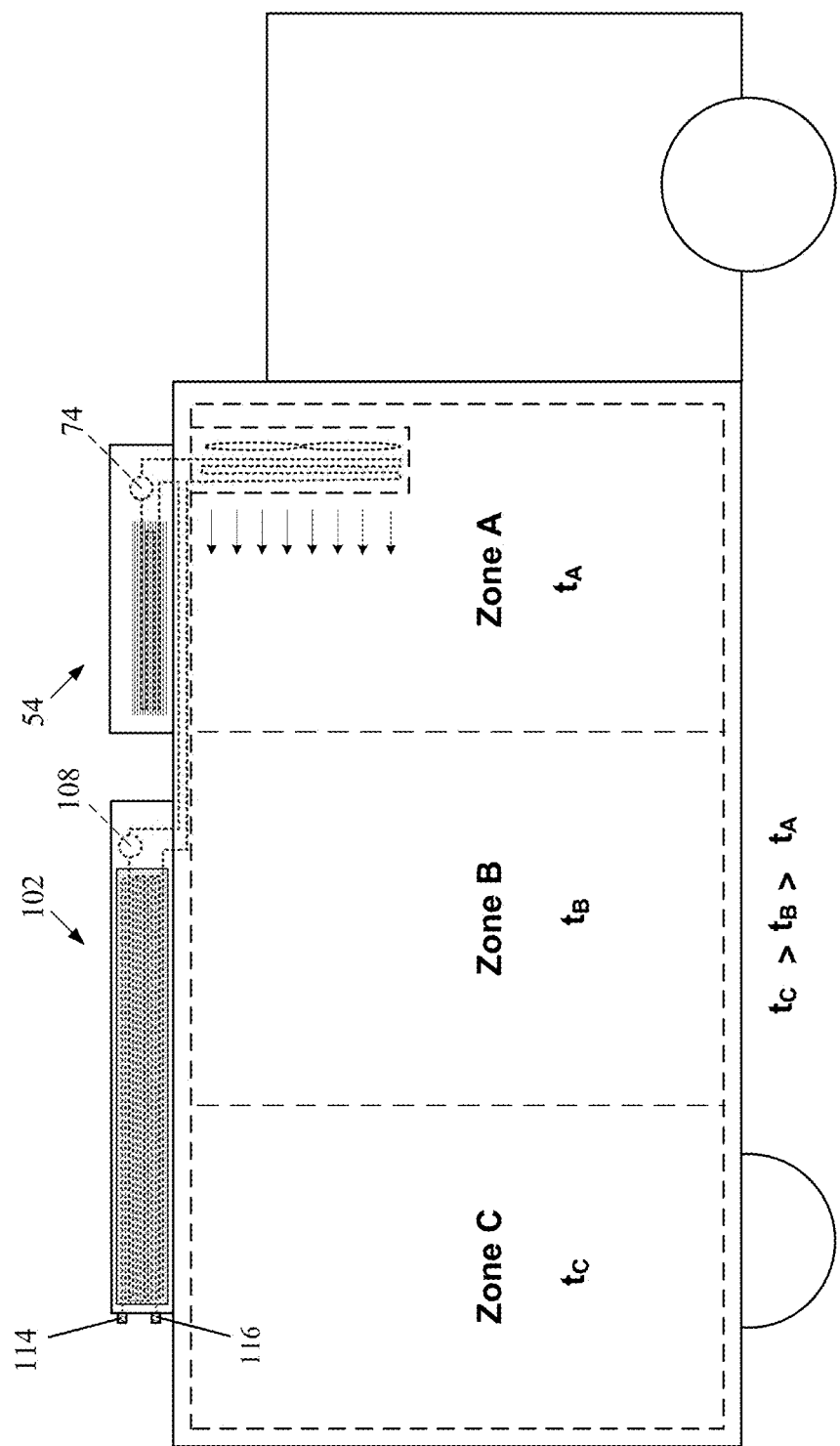
FIG. 26 is a schematic view of another embodiment of a transportation vehicle for transporting items within a cargo area similar to that of FIG. 25 but having multiple temperature zones that are cooled by a thermal battery system arranged in series with a refrigeration unit in accordance with one or more aspects and features of the invention.

FIG. 26 is a schematic view of another embodiment of a transportation vehicle for transporting items within a cargo area similar to that of FIG. 25 but having multiple temperature zones that are cooled by the thermal battery system 102 arranged in series with a refrigeration unit 54. In the embodiment of FIG. 26, the cargo area is divided into three areas that are partitioned by dividers such that three different temperature zones A,B,C are established with a gradient of temperatures $t_A$, $t_B$, and $t_C$, wherein $t_C > t_B > t_A$. The dividers preferably comprise uninsulated walls with strip-curtain doors. Each temperature that is maintained preferably is at or above the applicable minimum required temperature of any food safety regulation or other rule.

Figure 27:
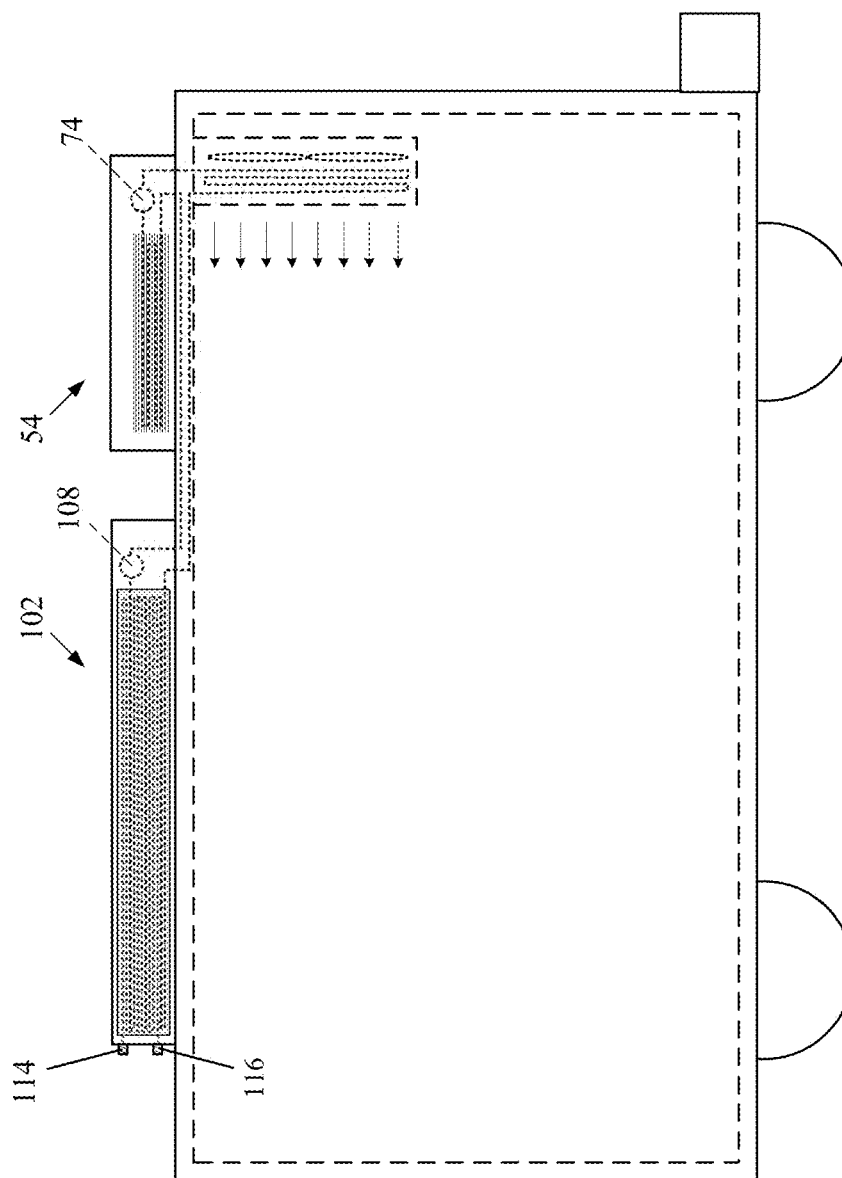
FIG. 27 is a schematic view of an embodiment of a transportation trailer for transporting items within a cargo area that is cooled by a thermal battery system arranged in series with a refrigeration unit in accordance with one or more aspects and features of the invention.

FIG. 27 is a schematic view of an embodiment of a transportation trailer for transporting items within a cargo area that is cooled by a thermal battery system 102 arranged in series with a refrigeration unit 54 in accordance with one or more aspects and features of the invention. In this embodiment, like in the embodiment of FIG. 25, the PCM is charged by an external source through external ports 114,116, and a cooling unit such as a refrigeration unit 54 is included and arranged in the closed loop connecting the PCM of the thermal battery system 102 and the cooling unit 164. The thermal battery system may include an internal pump 108 for fluid flow through this closed loop; the refrigeration unit 54 may include an internal pump 74 for fluid flow through this closed loop; or both, as shown in FIG. 27.

In the embodiment of FIG. 27, the refrigeration unit 54 preferably is located upstream of the thermal battery system 102 and is utilized as an alternative charging unit to an external cooling source for charging the PCM of the thermal battery system 102. It is believed that operational efficiencies may be gained by slowly charging the PCM of the thermal battery system 102 over time using the refrigeration unit 54, and then using the thermal battery system 102 for cooling of the cargo area via the cooling unit 164 rather than using the refrigeration unit 54 for direct cooling of the cargo area via the cooling unit 164.

In a variation of this embodiment, the refrigeration unit 54 is located downstream of the thermal battery system 102 and may be utilized for cooling the interior cargo area via the cooling unit 164 either in combination with the thermal battery system 102, or by itself when the thermal battery system 102 is in need of charging and no longer operational for cooling the interior cargo area via the cooling unit 164.

Figure 28:
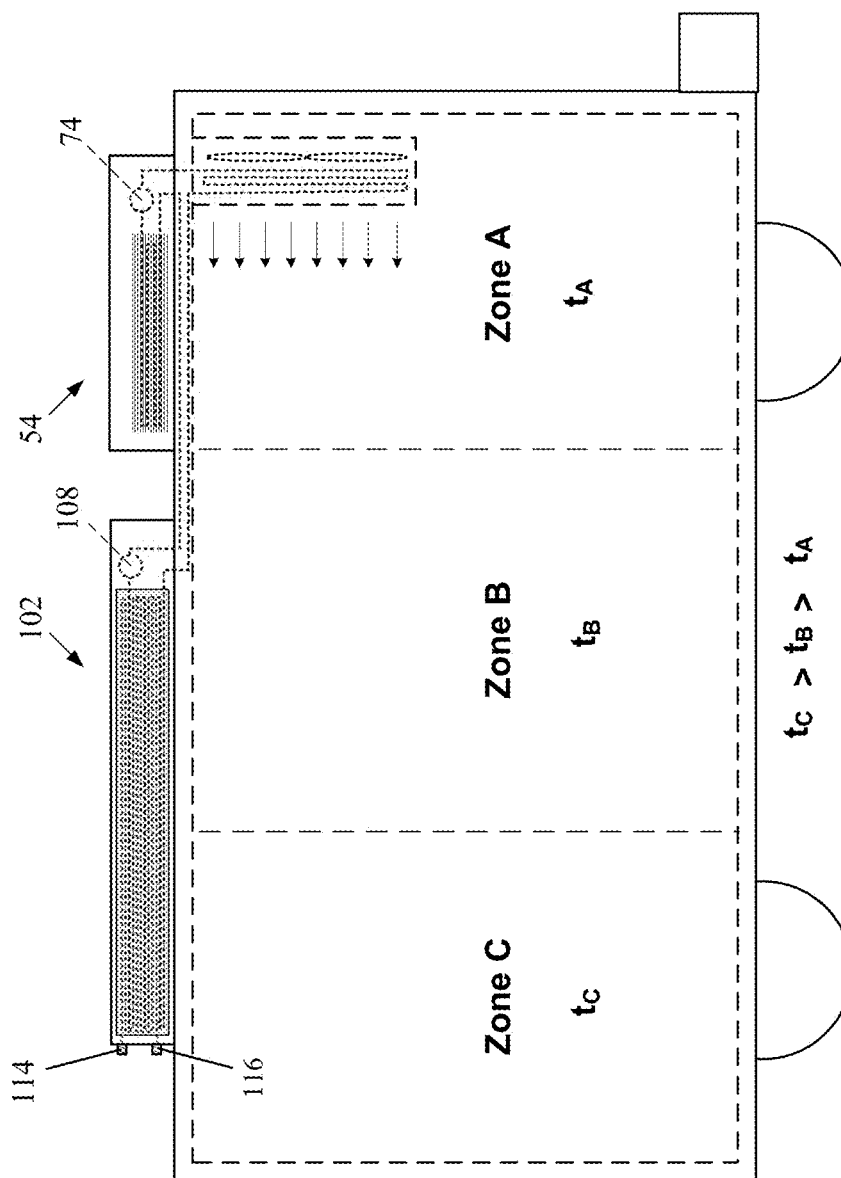
FIG. 28 is a schematic view of another embodiment of a transportation trailer for transporting items within a cargo area similar to that of FIG. 27 but having multiple temperature zones that are cooled by a thermal battery system arranged in series with a refrigeration unit in accordance with one or more aspects and features of the invention.

FIG. 28 is a schematic view of another embodiment of a transportation trailer for transporting items within a cargo area similar to that of FIG. 27 but having multiple temperature zones that are cooled by the thermal battery system 102 arranged in series with a refrigeration unit 54. In the embodiment of FIG. 28, the cargo area is divided into three areas that are partitioned by dividers such that three different temperature zones A,B,C are established with a gradient of temperatures $t_A$, $t_B$, and $t_C$, wherein $t_C > t_B > t_A$. The dividers preferably comprise uninsulated walls with strip-curtain doors. Each temperature that is maintained preferably is at or above the applicable minimum required temperature of any food safety regulation or other rule.

FIG. 29 is a perspective view of an embodiment of a transportation trailer 30 for transporting items within a cargo area that is cooled by a thermal battery system arranged in combination with a charging unit in accordance with one or more aspects and features of the invention. FIG. 30 is another perspective view of the transportation trailer 30 of FIG. 29.

A portion of the trailer 30 is cut away at 33 in FIG. 29 in order to show an arrangement 35 of a thermal battery system, charging unit, pump, and cooling unit in accordance with one or more embodiments of aspects and features of the present invention. The arrangement 35 is located at a rear end of the trailer 30 and external ports 114,116 are provided in a rear wall of the trailer 30 for hookup of an external cooling source to the thermal battery system.

FIG. 31 is a perspective view of the arrangement 35, and FIG. 32 is another perspective view of the arrangement 35. The arrangement 35 comprises thermal battery system 102, charging unit 154, pump 118, and cooling unit 164.

The arrangement 35 also comprises fluid conduits that interconnect these components, including a fluid conduit 142 that interconnects the thermal battery system 102 with the cooling unit 164; a fluid conduit 144 that interconnects the cooling unit 164 with charging unit 154; and a fluid conduit 146 that interconnects the charging unit 154 with the pump 118 and the thermal battery system 102.

Additionally, the cooling unit 164 comprises a blower for circulating air through a vent, generally indicated at 40 in FIG. 31. The charging until 154 comprises an arrangement of heat exchanger modules comprising blades or fins that are generally indicated at 42 in FIG. 31.

Figure 33:
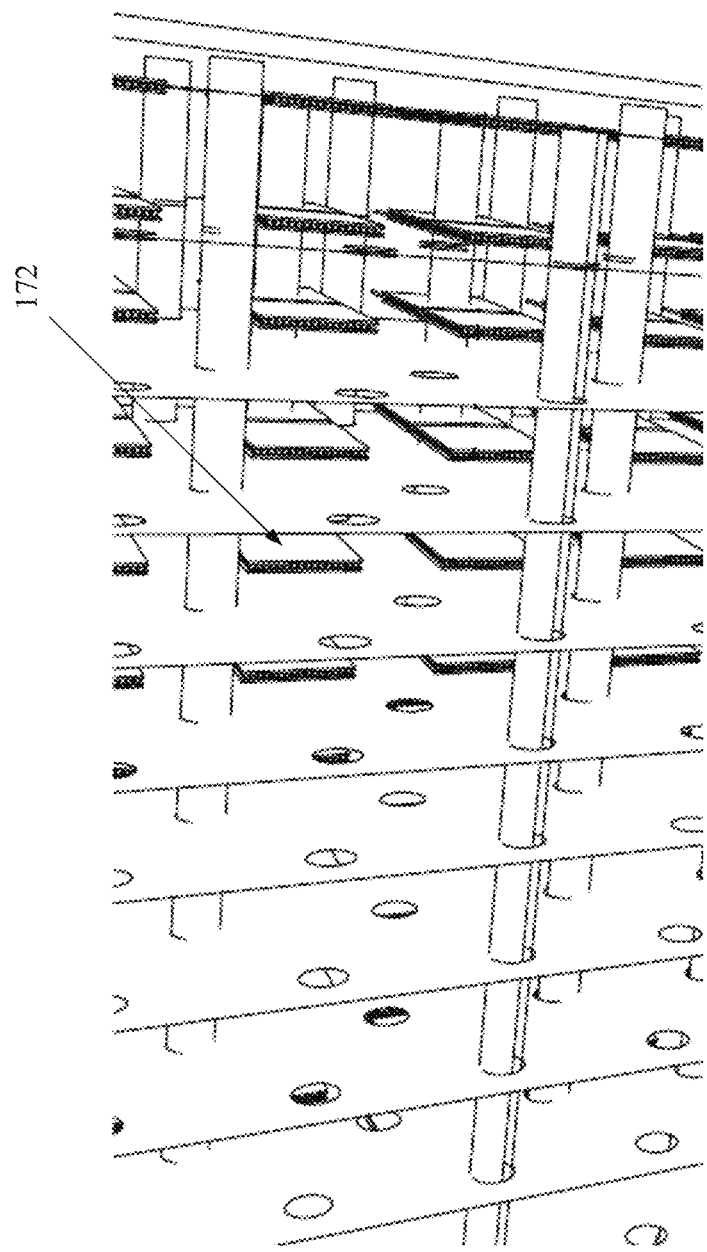
FIG. 33 is a perspective view of a heat exchanger of a charging unit for charging PCM by cooling the PCM.

FIG. 33 is a partial perspective view of a heat exchanger of a charging unit for charging PCM by cooling the PCM. Each module comprises a plurality of thermoelectric cooling elements, one of which is indicated in FIG. 33 by callout 172. Each of the cooling elements 172 utilizes the Peltier effect for cooling of the fins and fluid passed therethrough. Such cooling elements are well known and may be referred to as thermoelectric heat pumps or solid-state active heat pumps. In this respect, a charging unit having cooling elements 172 may be referred to as a thermoelectric cooler (TEC) system.

Figures 34, 35:
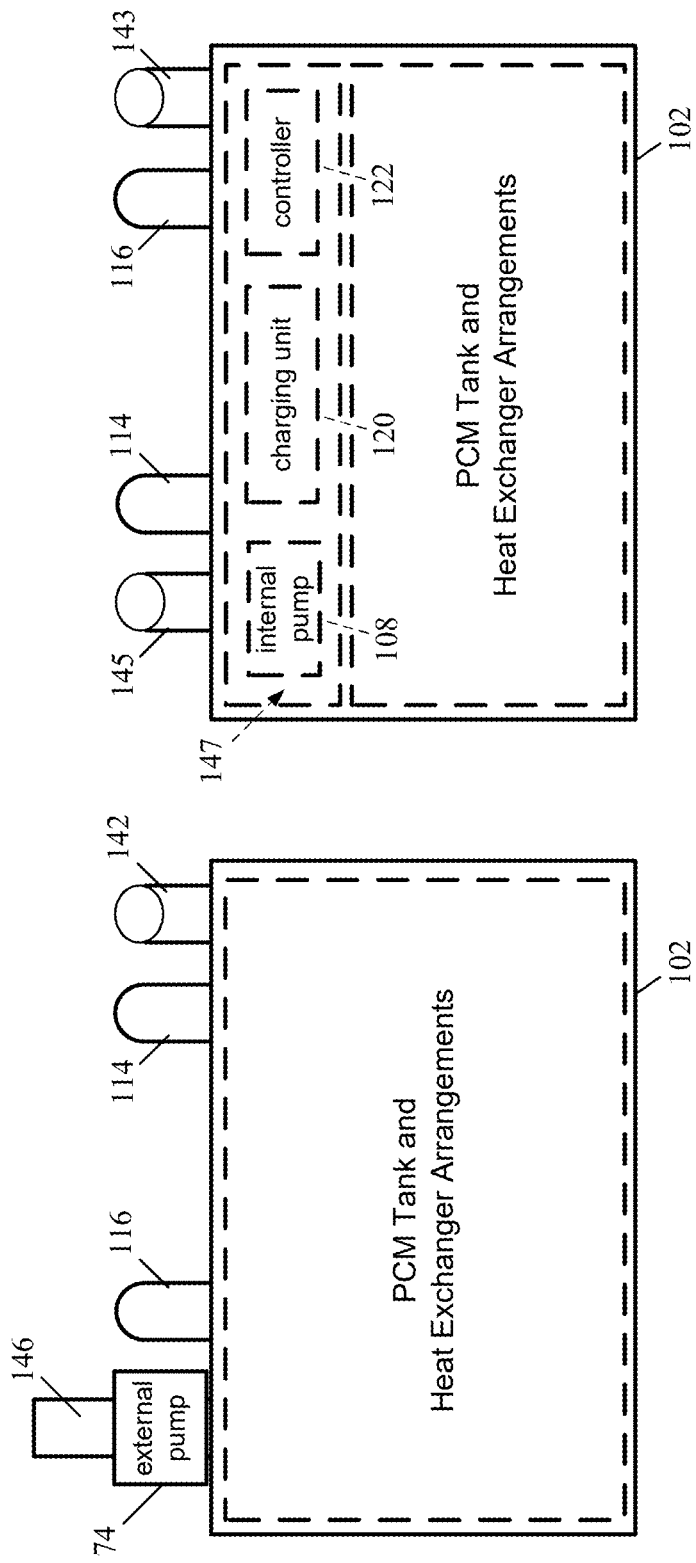
FIG. 34 is a schematic view of the thermal battery system in the arrangement of FIG. 31.
FIG. 35 is a schematic view of another thermal battery system in an arrangement similar to that of FIG. 31 for use with embodiments of transportation vehicles and trailers in accordance with one or more aspects and features of the invention.

FIG. 34 is a schematic view of the thermal battery system 102 in the arrangement of FIG. 31. External ports 114,116—one being an inlet and the other an outlet—provide interconnection between a first heat exchanger embedded in the PCM of the tank of the thermal battery system 102 and an external cooling source. Fluid connection 142 interconnects a second heat exchanger embedded in the PCM of the tank of the thermal battery system 102 and the cooling unit 164. Fluid connection 146 interconnects the external pump 74 and the charging unit 154, and the pump 74 is connected to the second heat exchanger embedded in the PCM of the tank of the thermal battery system 102 thereby interconnecting the second heat exchanger and the fluid conduit 146. In an alternative arrangement that omits a charging unit 154, fluid connection 146 interconnects the external pump 74 to the cooling unit 164 rather than to the charging unit 154. Each fluid conduit may be piping, a hose, or other conventional component providing a fluid passageway between its ends for fluid flow therethrough.

FIG. 35 is a schematic view of another thermal battery system 102 in an arrangement similar to that of FIG. 31 for use with embodiments of transportation vehicles and trailers in accordance with one or more aspects and features of the invention. External ports 114,116—one being an inlet and the other an outlet—provide interconnection between a first heat exchanger embedded in the PCM of the tank of the thermal battery system 102 and an external cooling source, as in the thermal battery system 102 of FIG. 34.

Unlike the thermal battery system 102 of FIG. 34, the thermal battery system 102 in FIG. 35 is shown to include an internal pump 108, and internal charging unit 120, and a controller 122 comprising, for example, a microcontroller or other circuitry, for operating the internal pump 108 and charging unit 120.

In a first arrangement including the thermal battery system 102 of FIG. 35, both fluid conduits 143,145 may interconnect the thermal battery system 102 with a cooling unit, one fluid conduit being an inlet and the other fluid conduit being an outlet with respect to the thermal battery system 102. Internally, fluid passageways are defined within the thermal battery system 102 that interconnect the internal pump 108, charging unit 120, second heat exchanger embedded in the PCM, and fluid conduits 143,145 so as to create a closed-loop circuit 147 with the cooling unit. The internal pump 108 preferably creates the fluid flow through this closed-loop circuit. Furthermore, the internal charging unit 120 selectively charges the PCM or aids in cooling of the cargo area via the cooling unit, depending on the given fluid flow through the closed-loop circuit, the operation of which preferably is controlled by the controller 122.

In an alternative arrangement including the thermal battery system 102 of FIG. 35, an external pump is provided and fluid conduits 143 interconnect the thermal battery system 102 with the external pump. One or more other fluid conduits and components then interconnect the external pump and the cooling unit. Fluid conduit 145 similarly interconnects the thermal battery system 102 to the cooling unit, whether directly or through one or more other components and fluid conduits. Regardless, one of the fluid conduits 143,145 serves as an inlet and the other as an outlet to the thermal battery system which collectively interconnects the thermal battery system 102.

Internally, fluid passageways are defined within the thermal battery system 102 that interconnect whether directly or indirectly through one or more components and fluid passageways the fluid conduits 143,145 and the second heat exchanger embedded in the PCM so as to create a closed-loop circuit that includes the second heat exchanger and the cooling unit. The internal pump 108 and charging unit 120 preferably are not part of this closed-loop circuit but, instead, form a different closed-loop circuit with a third heat exchanger embedded in the PCM of the tank of the thermal battery system 102 for "onboard" charging of the PCM within the thermal battery system 102 itself, the operation of which is controlled by the controller 122. The internal pump 108 in such scenario may be battery powered using an internal battery or may be electrically powered by a battery of the vehicle or trailer, or by the electrical system of the vehicle which, in turn, may be powered by a combustion engine or a battery of an electric vehicle.

Figure 36:
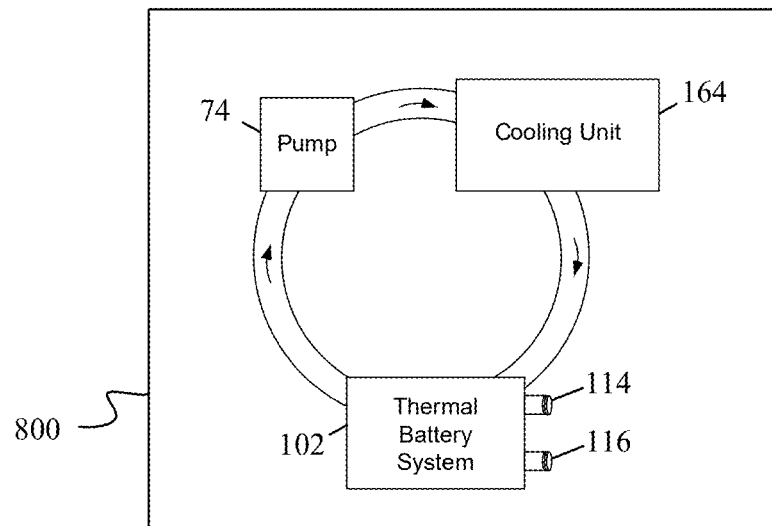
FIG. 36 is a schematic illustration of a closed-loop circuit used in embodiments of transportation vehicles and trailers in accordance with one or more aspects and features of the invention.

FIG. 36 is a schematic illustration of a closed-loop circuit used in embodiments of transportation vehicles and trailers, of which apparatus 800 is representative, in accordance with one or more aspects and features of the invention. The circuit shown is defined by fluid conduits interconnecting main components comprising a pump, a cooling unit, and a thermal battery. It will be appreciated that the fluid flow within the closed-loop circuit may be opposite to that shown. This closed-loop circuit is representative, for example, of the closed-loop circuit created by the arrangement shown in FIG. 3.

Figure 37:
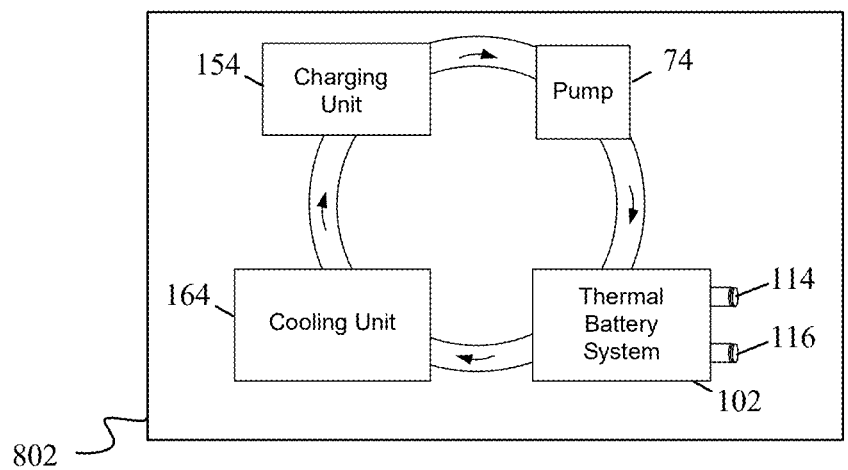
FIG. 37 is a schematic illustration of another closed-loop circuit used in embodiments of transportation vehicles and trailers in accordance with one or more aspects and features of the invention.

FIG. 37 is a schematic illustration of another closed-loop circuit used in embodiments of transportation vehicles and trailers, of which apparatus 802 is representative, in accordance with one or more aspects and features of the invention. The circuit shown is defined by fluid conduits interconnecting main components comprising a pump, a thermal battery, a cooling unit, and a charging unit. It will be appreciated that the fluid flow within the closed-loop circuit may be opposite to that shown. This closed-loop circuit is representative, for example, of the closed-loop circuit created by the arrangement shown in FIG. 31 and FIG. 32.

Figure 38:
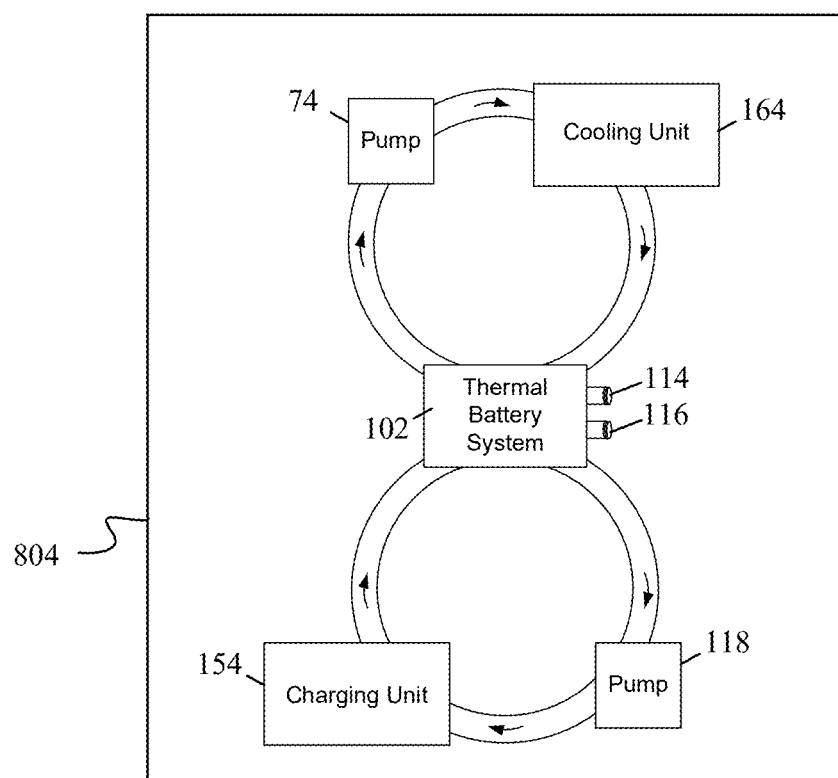
FIG. 38 is a schematic illustration of two closed-loop circuits used in combination in embodiments of transportation vehicles and trailers in accordance with one or more aspects and features of the invention.

FIG. 38 is a schematic illustration of first and second closed-loop circuits used in combination in embodiments of transportation vehicles and trailers, of which apparatus 804 is representative, in accordance with one or more aspects and features of the invention. The first circuit shown is defined by fluid conduits interconnecting main components comprising a pump, a cooling unit, and a thermal battery system, and specifically, a first heat exchanger of the thermal battery system. The second circuit shown is defined by fluid conduits interconnecting main components comprising a pump, a charging unit, and the thermal battery system, and specifically, a second heat exchanger of the thermal battery system. It will be appreciated that the fluid flow within one or both of the two illustrated closed-loop circuits may be opposite to that shown.

Figure 39:
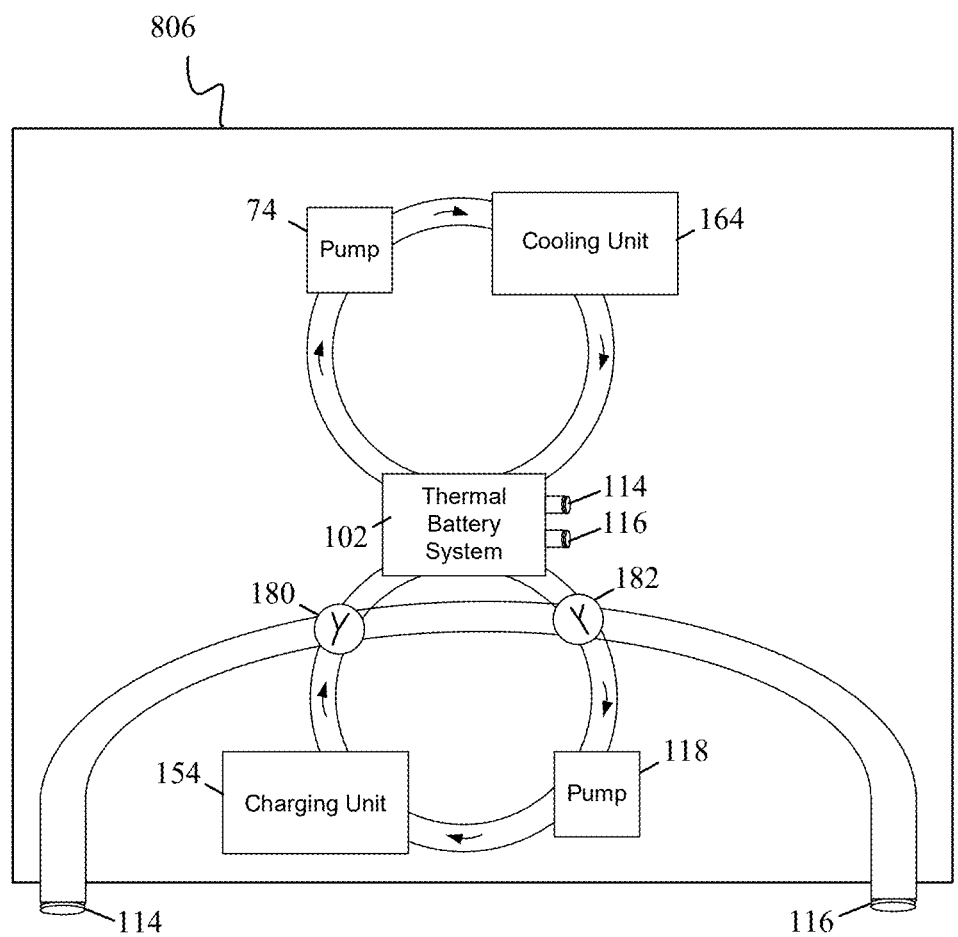
FIG. 39 is a schematic illustration of another arrangement of closed-loop circuits used in embodiments of transportation vehicles and trailers in accordance with one or more aspects and features of the invention.

FIG. 39 is a schematic illustration of another arrangement of closed-loop circuits used in embodiments of transportation vehicles and trailers, of which apparatus 806 is representative, in accordance with one or more aspects and features of the invention. In the arrangement of FIG. 39, valves and branching fluid passageways to external ports 114,116 are included in the second closed-loop circuit for interconnecting an external cooling source to the second closed-loop circuit for external charging of the PCM via the second heat exchanger of the thermal battery system 102. It will be appreciated that the valves 180,182 enable mutually exclusive charging with respect to external charging using an external charging source and charging performed using charging unit 154, whether located on the vehicle or trailer, or within the thermal battery system 102 itself for "onboard" charging.

Figure 40:
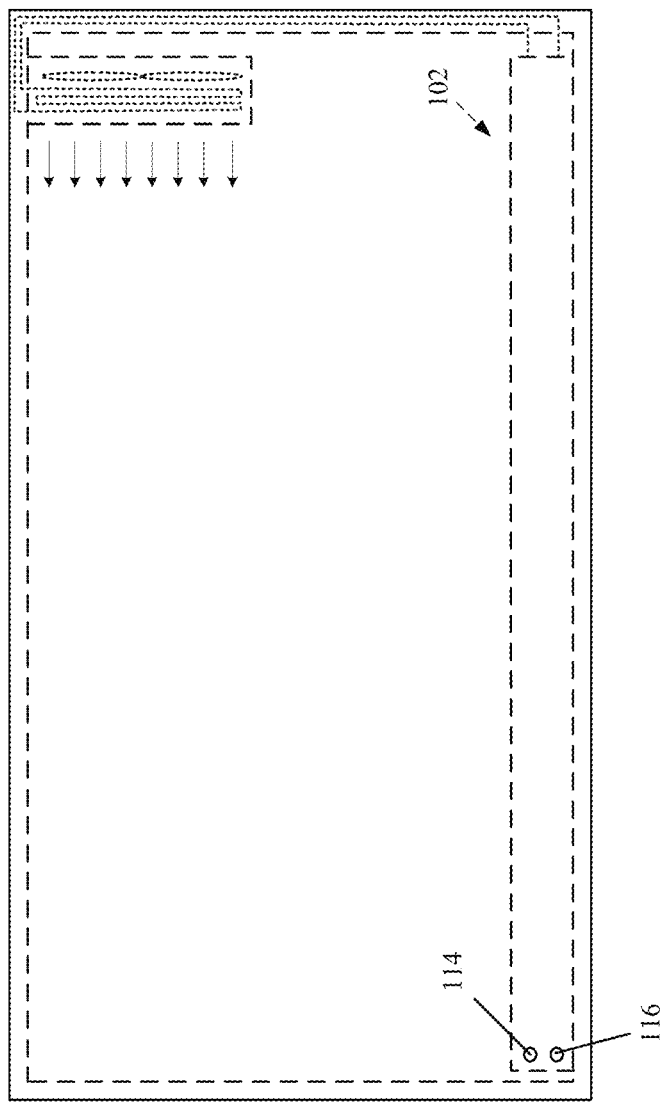
FIG. 40 is a schematic view of an embodiment of a stationary cooler for storing items within a cargo area that is cooled by a thermal battery system in accordance with one or more aspects and features of the invention.

FIG. 40 is a schematic view of an embodiment of a stationary cooler for storing items within a cargo area having a temperature that is maintained by a thermal battery system 102 in accordance with one or more aspects and features of the invention. In this embodiment of FIG. 41, the thermal battery system 102 is located along the entire floor of the cargo compartment and may include a flooring surface serving as the floor of the cargo area for supporting items placed in the cargo area for storage. Like in earlier embodiments of the drawings, ports 114,116 are provided for charging of the PCM of the thermal battery system; however, for clarity the second heat exchanger embedded in the PCM of the tank of the thermal battery system is omitted for clarity of illustration.

Figure 41:
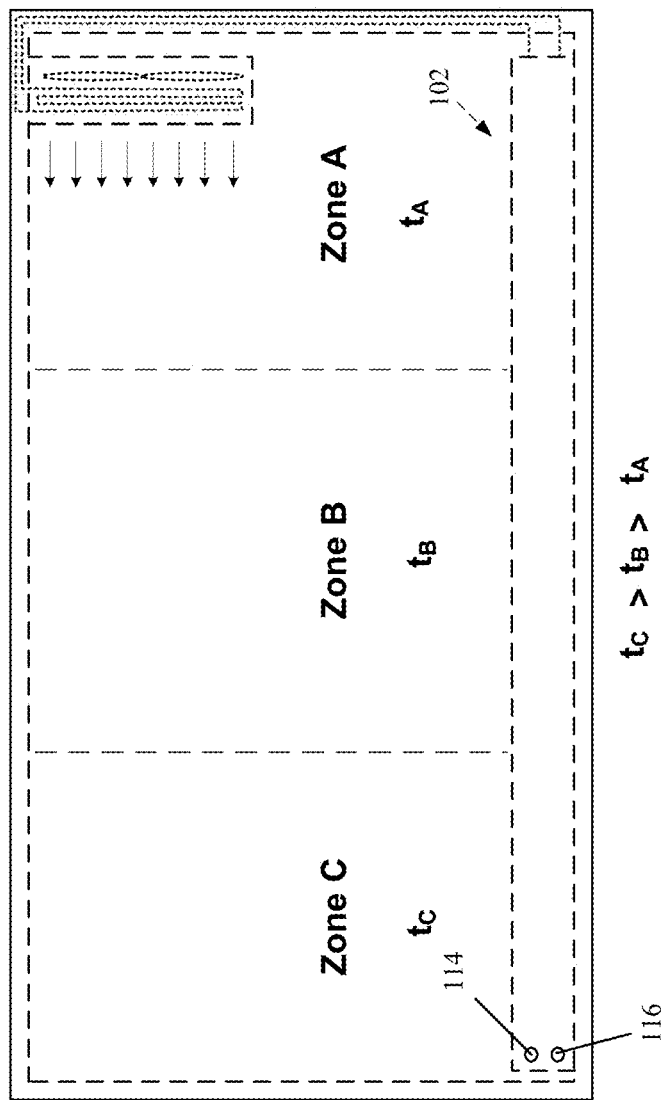
FIG. 41 is a schematic view of another embodiment of a storage cooler for storing items within a cargo area similar to that of FIG. 40 but having multiple temperature zones that are cooled by a thermal battery system in accordance with one or more aspects and features of the invention.

FIG. 41 is a schematic view of a variation of the embodiment of the stationary cooler of FIG. 40. In this embodiment of FIG. 45, the cargo area is divided into three areas that are partitioned by dividers such that three different temperature zones A,B,C are established with a gradient of temperatures $t_A$, $t_B$, and $t_C$, wherein $t_C > t_B > t_A$. The dividers preferably comprise uninsulated walls with strip-curtain doors. Each temperature that is maintained preferably is at or above the applicable minimum required temperature of any food safety regulation or other rule.

Additional embodiments of apparatus for transporting and storing items, each in accordance with one or more aspects and features of the invention, are disclosed in Appendix A, which is incorporated herein by reference.

Figure 46:
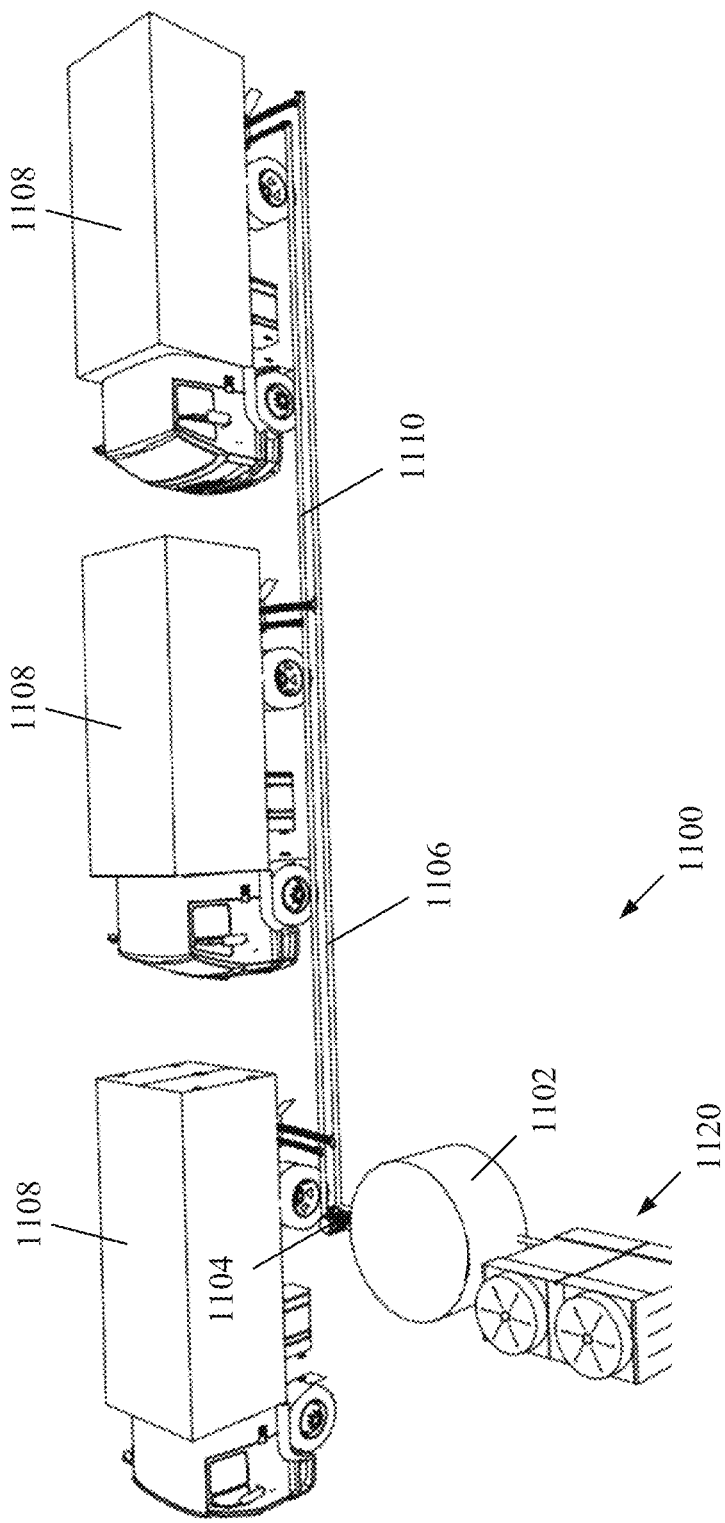
FIG. 46 is a perspective view of apparatus for the simultaneous charging of thermal batteries of multiple vehicles.

With reference to FIG. 46, this drawing shows a perspective view of apparatus 100 for the simultaneous charging of thermal batteries of multiple vehicles 1108. The apparatus 1100 comprises a thermal charger 1102 (which itself is essentially a large thermal battery or thermal reservoir), a pump 1104, and fluid conduits 1106,1110 in the form of pipes and connectors, for fluid flow from the thermal charger 1102 to the vehicles 1108 via fluid conduit 1106, and for fluid flow from the vehicles 1108 to the thermal charger 1102 via fluid conduit 1110. The thermal charger 1102 used for the simultaneous charging of the thermal batteries of the vehicles 1108 may sometimes be referred to herein as a "thermal energy reservoir" or even a thermal "supercharger".

Figure 47:
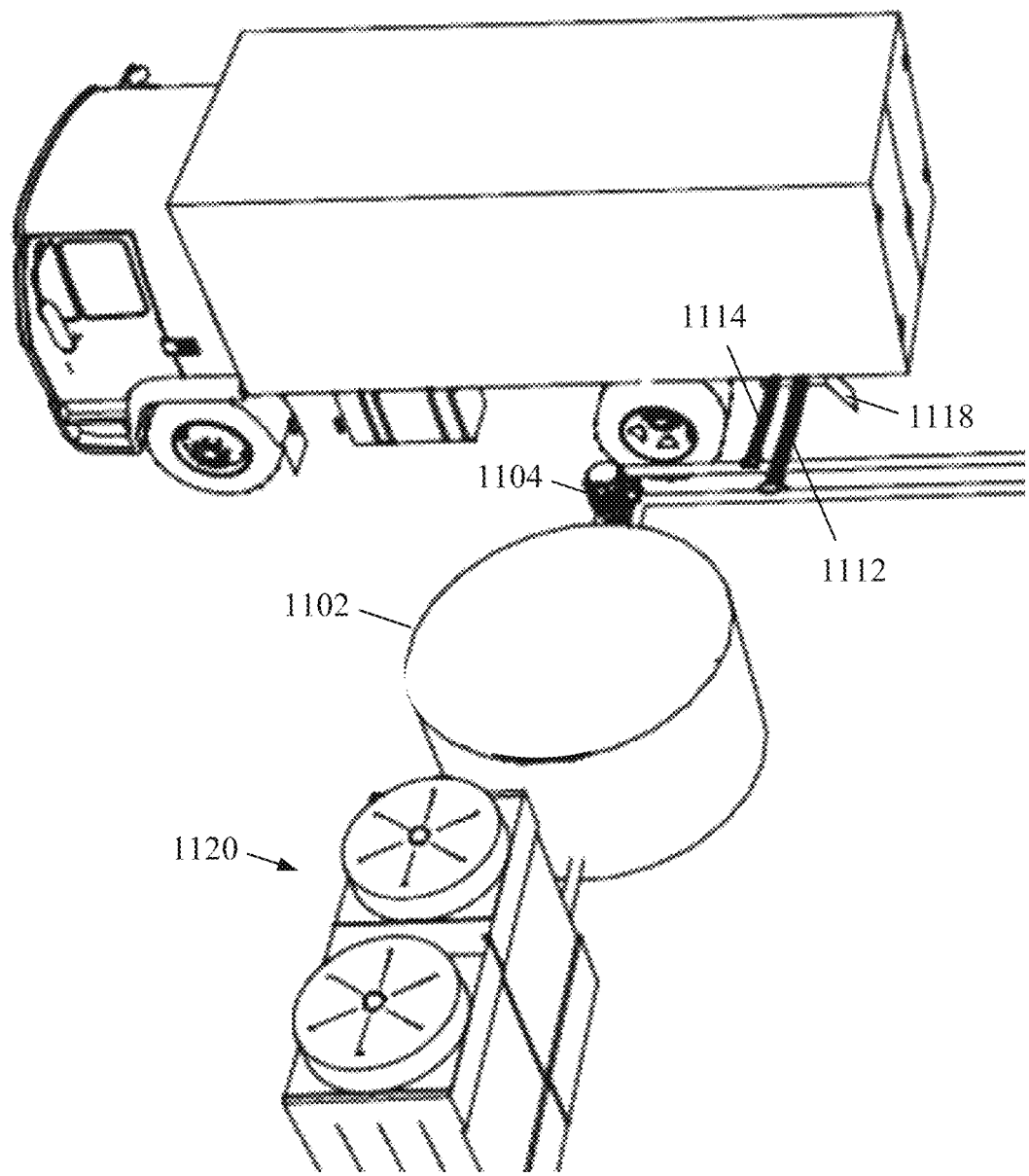
FIG. 47 is a perspective view of the apparatus for charging a thermal battery of a first vehicle of the multiple vehicles of FIG. 46.
Figure 49:
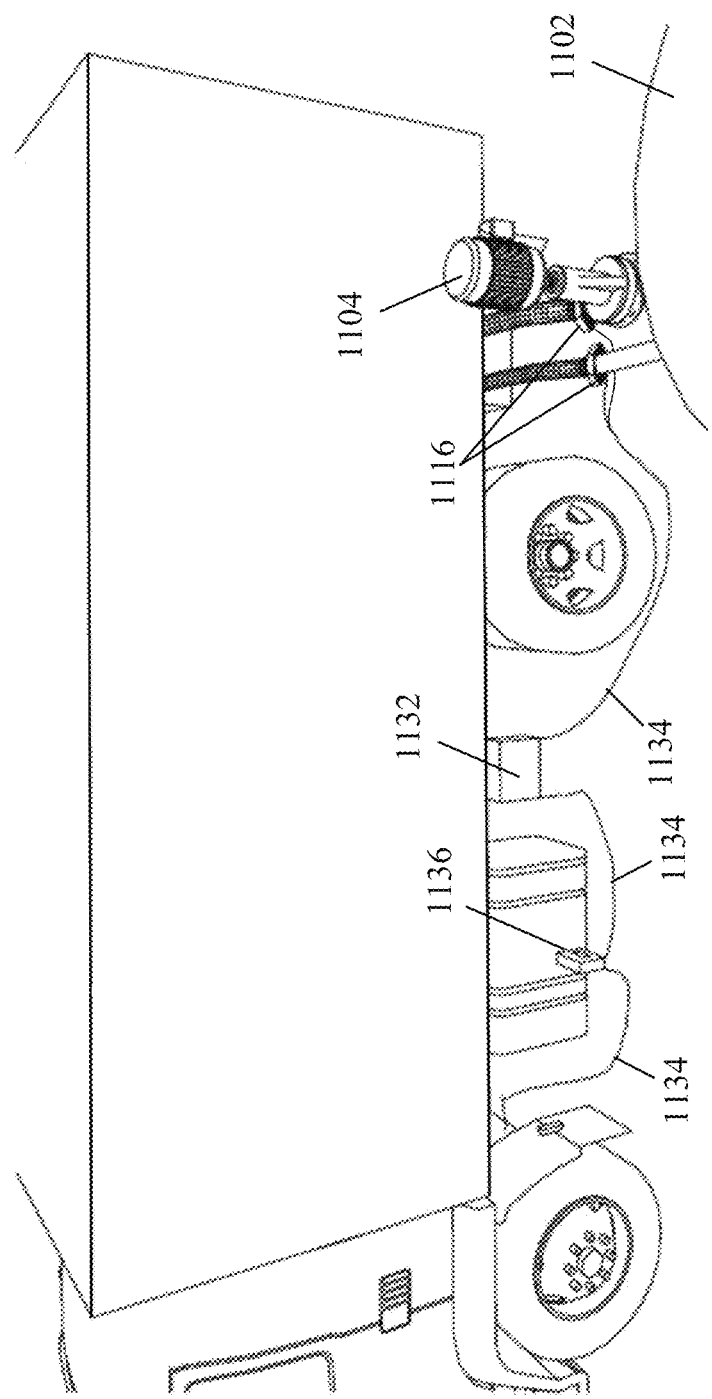
FIG. 49 is a perspective view of the charging of a thermal battery of a vehicle wherein the vehicle includes safety devices relating to the charging.

FIG. 47 is a perspective view of the apparatus 1100 shown charging a thermal battery of a first vehicle of the multiple vehicles 1108 of FIG. 46. Fluid conduit 1106 includes a branch 1112 (e.g., hoses) for fluid flow to the charging circuit of the thermal battery of the vehicle, and fluid conduit 1110 includes a branch 1114 for fluid flow from the charging circuit of the thermal battery of the vehicle. Each branch 1112,1114 includes at a distal end thereof a dry disconnect coupling 1116 (see FIG. 49) for fluid-tight connection with a corresponding coupling of the charging circuit of the vehicle. The vehicle couplings for the charging circuit preferably are located inside a compartment that is accessible by a hinged door panel 1118. The interior of the compartment 1118 optionally is heated to minimize or avoid icing of the couplings.

Figure 48:
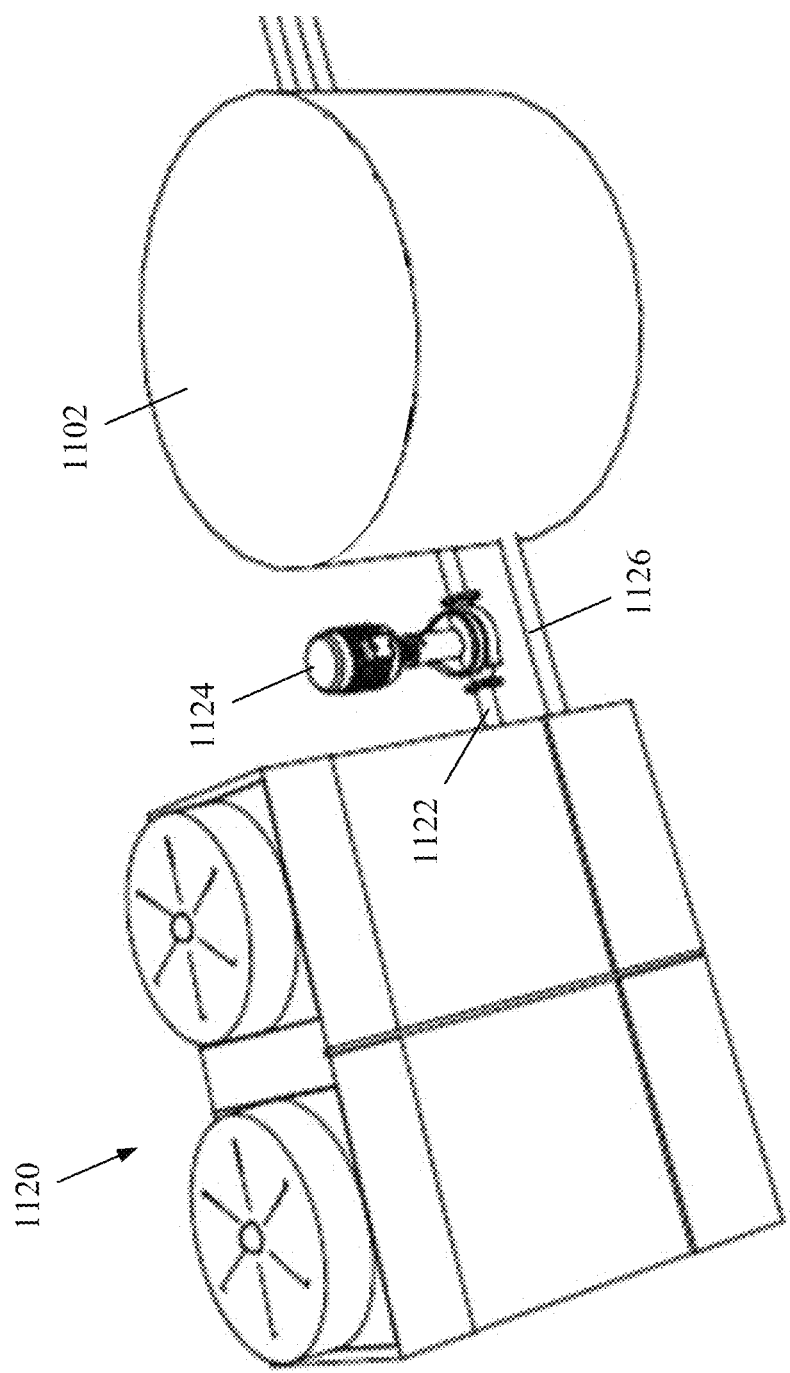
FIG. 48 is a perspective view of part of the apparatus of FIG. 46.

As shown in FIG. 46 and FIG. 47, the apparatus 1100 also comprises a cooling source in the form of an industrial chiller 1120, which is used to charge the thermal charger 1102. As seen in greater detail in FIG. 48, a fluid conduit 1122 interconnects the chiller 1120 for fluid flow from the chiller 1120 to the charging circuit of the thermal charger 1102. A pump 1124 is provided for driving fluid flow within the closed loop between and including the chiller 1120 and the thermal charger 1102. Another fluid conduit 1126 interconnects the thermal charger 1102 and the chiller 1120 for fluid flow from the thermal charger 1102 to the chiller 1120.

The thermal charger 1102 preferably comprises a thermal battery that is much larger than the thermal batteries of the vehicles such that the thermal charger 1102 is well suited to simultaneously charge each of the thermal batteries of the vehicles.

Additionally, it will be understood that each thermal battery preferably comprises at least two separate and independent fluid circuits: one for charging the thermal battery; and one for discharging the thermal battery. Charging may be accomplished by either heating or cooling the phase change material of the thermal battery, depending on whether the thermal battery is to be used in heating or cooling; and discharging then is accomplished by doing the opposite to the phase change material. Each circuit preferably is isolated from the other circuit, and the charging circuit is coupled with a charging source to create a first closed loop and the discharging circuit is coupled with a load to create a second closed loop. The thermal batteries are therefore sometimes referred to as "dual-loop heat exchangers". The charging closed loop furthermore may be part of and internal to the thermal battery, as described in the incorporated disclosures.

Features of the invention include safety devices related to the charging of the thermal batteries of the vehicles. In this respect, and with reference to FIG. 49, which illustrates a perspective view of the charging of a thermal battery of a vehicle including such safety devices relating to the charging, one such safety device comprises a safety switch located onboard the vehicle and located, for example, in compartment 1132, which detects whether the charging circuit is coupled at dry disconnects 1116 to the branches 1112,1114 of the fluid conduits 1106,1110 of the apparatus 1100. This is represented by wiring 1134, but it further understood that sensors for detecting the coupling can alternatively wirelessly communicate with the electronic switch in compartment 1132. The electronic switch, in turn, preferably communicates by wiring 1134 with the engine control unit of the vehicle for enabling or disabling ignition of the engine, whereby the engine may not be started while a coupling is detected. The electronic switch preferably communicates by way of CAN communications but, alternatively, the electronic switch may be hardwired to preclude ignition.

In alternative configurations, the electronic switch may in like manner preclude engagement of the transmission of the vehicle to preclude movement rather than ignition. The electronic safety switch further may implement passive measures rather than such active measures by generating a visual or auditory alert. For example, wiring 1134 also may connect the electronic safety switch with a visual or audio alarm via an operator interface 1136 for signaling an operator of the connection of the couplings. The operator interface 1136 alternatively may be located inside of the cab, such as on the dash of the vehicle, and communications between the operator interface 1136 and the electronic safety switch in compartment 1132 may be wireless.

Figure 50:
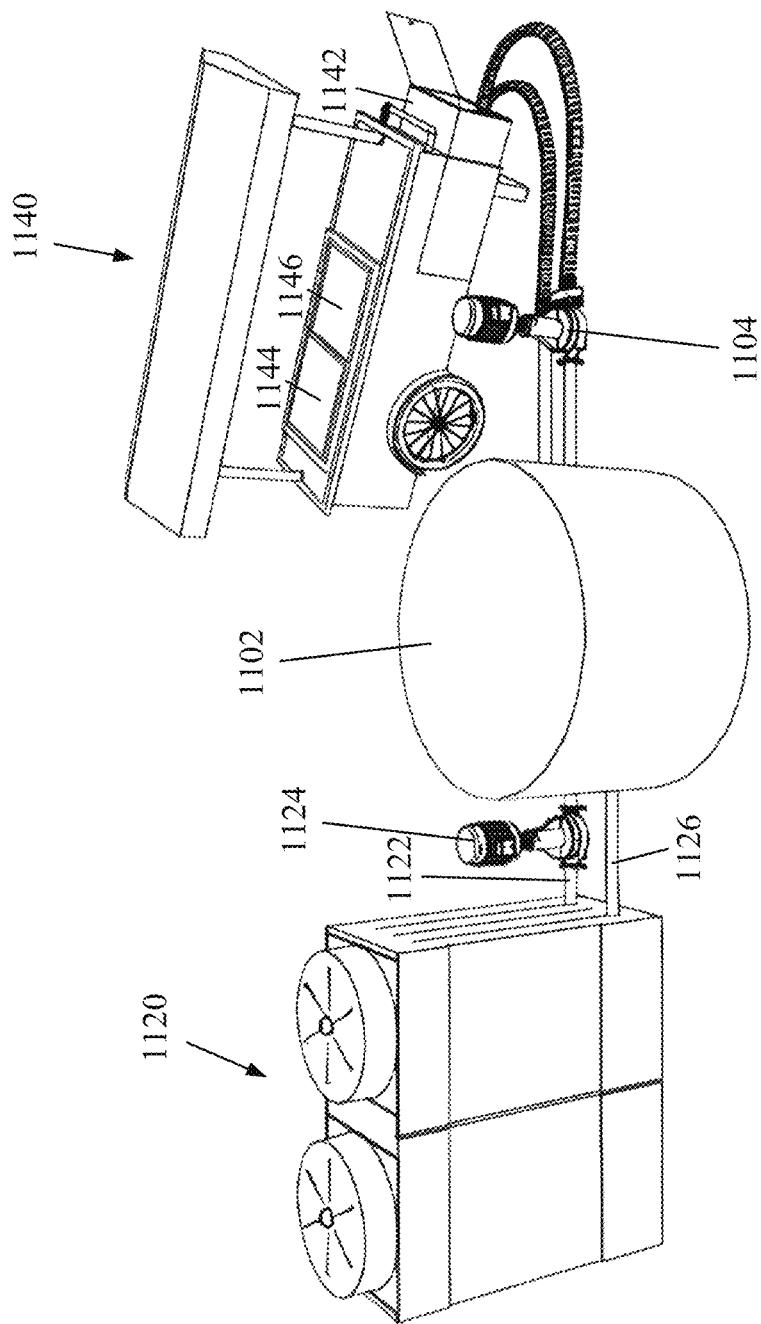
FIG. 50 is a perspective view of apparatus for charging a thermal battery of a cart.

FIG. 50 is a perspective view of apparatus 1100 for charging a thermal battery of a cart 1140 via couplings in compartment 1142, which also preferably is heated to minimize or avoid frosting or freezing over of the couplings. The cart is shown to include two different compartments 1144, 1146 in which different temperatures/different temperature zones may be maintained by the thermal battery of the cart 1140, in accordance with the incorporated disclosures.

Figure 51:
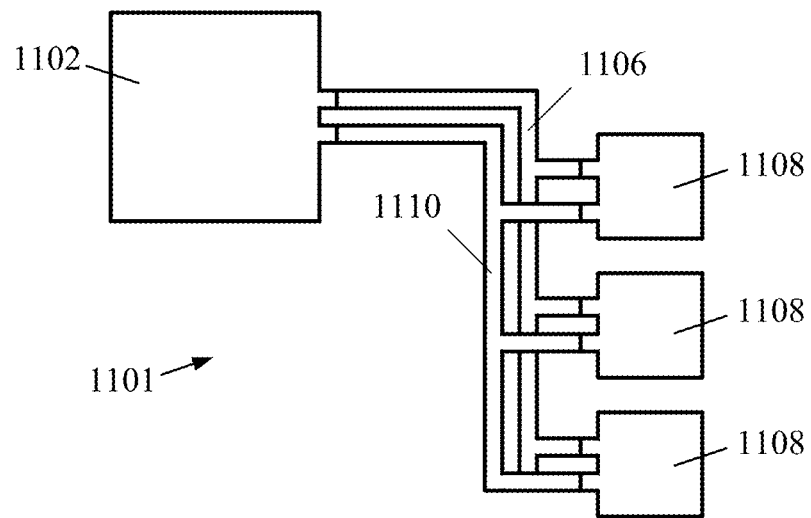
FIG. 51 is a schematic illustration of the arrangement for closed-loop simultaneous charging of thermal batteries of the vehicles that is shown in FIG. 46.
Figure 52:
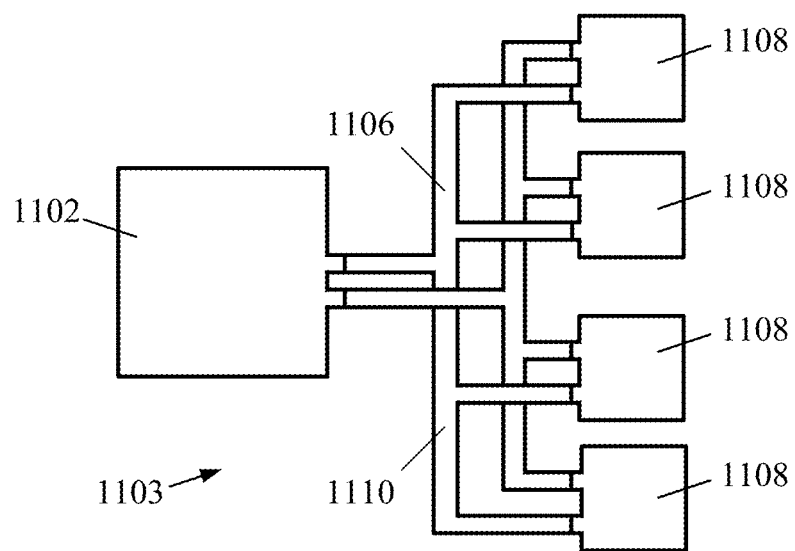
FIG. 52 is a schematic illustration of an alternative arrangement for closed-loop simultaneous charging of thermal batteries of vehicles of FIG. 46.

FIG. 51 is a schematic illustration of the arrangement 1101 for closed-loop simultaneous charging of thermal batteries of the vehicles that is shown in FIG. 46. In contrast, FIG. 52 is a schematic illustration of an alternative arrangement 1103 for closed-loop simultaneous charging of thermal batteries of vehicles of FIG. 46. Of note, the thermal charger 1102 is located at an end of the line (fluid conduits 1106, 1110) in FIG. 51 and is located at a middle of the line in FIG. 52 relative to the locations of the vehicles 1108 along the line.

It is believed that by charging the thermal charger with an industrial chiller and then using the thermal charger to simultaneously charge thermal batteries of vehicles, greater efficiencies are achieved over using an industrial chiller to simultaneously charge the thermal batteries of the vehicles. Indeed, it is believed that a smaller industrial chiller can be used in accordance with aspects and features of the present invention, and/or that the simultaneously charging of thermal batteries of vehicles may be accomplished up to an order of magnitude quicker in accordance with aspects and features of the present invention over using a large industrial chiller to charge the thermal batteries of the vehicles.

Of additional note in connection with the preferred embodiments of the invention disclosed in FIGS. 46-52:

The couplings preferably comprise quick disconnect with dry break connectors. The dry break connectors may have an electric safety switch like a proximity switch to detect connections.

A PID control circuit preferably interfaces all thermals connections including quick disconnect to prevent driver error, whether wired or wireless. The circuit will disable the truck from going into gear if a connection is detected. There is a manual override where an operator can acknowledge disconnection. The PID loop also has e-STOP switches at multiple locations in case of emergency. Thermal battery reservoir has visual ready indicator to signal readiness for charging.

PCM tanks of the thermal batteries of the vehicles preferably are insulated with standard foam insulation and then insulated with optional vacuum-insulated panels. On larger tanks a baffle is preferably inserted to prevent sloshing.

Connections and/or hoses have an insulated cover to go over dry disconnect fitting to prevent frost or icing from occurring. The covers may also be heated, especially in humid environments.

Hoses have a safety breakaway to prevent spillage if a driver forgets to disconnect the hoses.

A pump can be positioned at each charging circuit for a thermal battery and controlled to provide independent charging of each thermal battery.

Based on the foregoing description, it will be readily understood by those persons skilled in the art that the invention has broad utility and application. Many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention.

For example, the cooling unit is shown in each embodiment of the drawings on a particular end of the cargo compartment. In alternative embodiments, the cooling unit may be located on the opposite end of the cargo compartment or in a location in-between the opposite ends of the cargo compartment on a side of the cargo compartment.

For another example, while the foregoing embodiments relate to cooling, heating of the cargo area may be accomplished utilize the present invention by utilizing a PCM with a phase change temperature that is higher than that desired in the cargo area and charging the PCM to a temperate at or above such phase change temperature. In such context the cooling unit is representative of a heating unit and charging units would add heat to the PCM rather than remove heat from the PCM during charging. Indeed, even the electrical cooling elements can be rearranged to be electrical heating elements for heating rather than cooling the fluid passing through the heat exchangers in the above disclosed embodiments.

Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. A transportation vessel having walls defining a cargo storage area for receiving and maintaining items at one or more temperatures, comprising:
    (a) a storage area heat exchanger located onboard the transportation vessel in air communication with the cargo storage area of the transportation vessel;
    (b) a thermal battery system comprising a thermal battery located underneath the cargo storage area and a flooring surface serving as a floor of the cargo storage area for supporting items placed in the cargo storage area, the thermal battery comprising
        (i) a tank containing a phase change material (PCM),
        (ii) a first heat exchangers comprising a first heat exchange circuit embedded in the PCM for discharging the PCM, and
        (iii) a second heat exchanger comprising a second heat exchange circuit embedded with the first heat exchanger circuit in the PCM for charging the PCM;
    (c) a first plurality of fluid conduits located onboard the transportation vessel and defining fluid passageways interconnecting in fluid communication the cargo storage area heat exchanger and the first PCM-embedded heat exchanger;
    (d) a pump located onboard the transportation vessel and arranged in fluid communication with the first plurality of fluid conduits and configured to create a fluid flow through the first plurality of fluid conduits between the cargo storage area heat exchanger and the first PCM-embedded heat exchanger;
    (e) a pair of external ports located exterior to the cargo storage area in a said wall of the transportation vessel and configured for connecting to an external charging source for charging the PCM of the thermal battery system; and
    (f) a second plurality of fluid conduits located onboard the transportation vessel and defining fluid passageways interconnecting in fluid communication the external ports and the second PCM-embedded heat exchanger;
    (g) wherein the first PCM-embedded heat exchanger, pump, storage area heat exchanger, and the first plurality of fluid conduits are part of a first closed-loop circuit located onboard the transportation vessel for transferring heat between the cargo storage area and the thermal battery system; and
    (h) wherein the second PCM-embedded heat exchanger, external ports, and the second plurality of fluid conduits located onboard the transportation vessel are not part of the first closed-loop circuit.

* * * * *